United States Patent
Islam et al.

(10) Patent No.: US 6,714,342 B2
(45) Date of Patent: Mar. 30, 2004

(54) LOW-NOISE DISTRIBUTED RAMAN AMPLIFIER USING BI-DIRECTIONAL PUMPING USING MULTIPLE RAMAN ORDERS

(75) Inventors: Mohammed N. Islam, Allen, TX (US); Michael Freeman, Canton, MI (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 10/335,808

(22) Filed: Jan. 2, 2003

(65) Prior Publication Data

US 2003/0133179 A1 Jul. 17, 2003

Related U.S. Application Data

(62) Division of application No. 09/760,201, filed on Jan. 12, 2001, now Pat. No. 6,631,025.
(60) Provisional application No. 60/175,786, filed on Jan. 12, 2000.

(51) Int. Cl.[7] .............................. H01S 3/30; G02B 6/28
(52) U.S. Cl. .............. 359/334; 359/341.3; 359/341.31; 359/341
(58) Field of Search .................... 359/334, 341.3, 359/341.31, 341.32, 341

(56) References Cited

U.S. PATENT DOCUMENTS

| | | | |
|---|---|---|---|
| 4,063,106 A | 12/1977 | Ashkin et al. | 307/88.3 |
| 4,685,107 A | 8/1987 | Kafka et al. | 372/6 |
| 4,740,974 A | 4/1988 | Byron | 372/3 |
| 4,831,616 A | 5/1989 | Huber | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,039,199 A | 8/1991 | Mollenauer et al. | 359/334 |
| 5,050,183 A | 9/1991 | Duling, III | 372/94 |
| 5,058,974 A | 10/1991 | Mollenauer | 385/27 |
| 5,078,464 A | 1/1992 | Islam | 385/122 |
| 5,101,456 A | 3/1992 | Islam | 385/27 |
| 5,107,360 A | 4/1992 | Huber | 359/124 |
| 5,115,488 A | 5/1992 | Islam et al. | 385/129 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |

(List continued on next page.)

FOREIGN PATENT DOCUMENTS

| | | | | |
|---|---|---|---|---|
| EP | 0421675 A2 | 9/1990 | | H04B/10/16 |
| EP | 0903876 A1 | 3/1999 | | H04B/10/17 |
| EP | 0936761 A1 | 8/1999 | | H04B/10/18 |
| EP | 1 180 860 A1 | 2/2001 | | H04B/10/17 |
| WO | WO 98/20587 | 5/1988 | | H01S/3/30 |
| WO | 96/16612 A1 | 6/1996 | | A61F/2/08 |
| WO | 99/49580 A2 | 9/1999 | | |
| WO | 99/62407 A1 | 12/1999 | | A61B/17/04 |
| WO | 99/66607 A2 | 12/1999 | | |

OTHER PUBLICATIONS

Sun et al, Bell Labs Technical Journal, Mar. 1999, pp. 187–205.*
Boran, K.C.; Electronic Letters, vol. 27, #9, pp. 756–757, Apr. 25, 1991; abstract only herewith.*

(List continued on next page.)

*Primary Examiner*—Nelson Moskowitz
(74) *Attorney, Agent, or Firm*—Baker Botts L.L.P.

(57) ABSTRACT

A Raman amplifier assembly includes a Raman amplifier configured to receive a signal from a signal source. The signal travels in an upstream direction in the Raman amplifier. A first pump source is coupled to the Raman amplifier. The first pump source produces a first pump beam that travels in a downstream direction and is counter-propagating relative to the signal. A second pump source is coupled to the Raman amplifier and produces a second pump beam that travels in the upstream direction. The second pump source has an average relative intensity noise of less than −80 dB/Hz.

49 Claims, 52 Drawing Sheets

U.S. PATENT DOCUMENTS

| | | | |
|---|---|---|---|
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,191,628 A * | 3/1993 | Byron | 305/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/6 |
| 5,224,194 A | 6/1993 | Islam | 385/122 |
| 5,225,925 A | 7/1993 | Grubb et al. | 359/341 |
| 5,226,049 A | 7/1993 | Grubb | 372/6 |
| 5,243,609 A | 9/1993 | Huber | 372/9 |
| 5,251,642 A | 10/1993 | Handlos | 128/774 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A | 3/1994 | Huber | 385/37 |
| 5,301,054 A | 4/1994 | Huber et al. | 359/132 |
| 5,321,543 A | 6/1994 | Huber | 359/187 |
| 5,321,707 A | 6/1994 | Huber | 372/6 |
| 5,323,404 A | 6/1994 | Grubb | 372/6 |
| 5,331,449 A | 7/1994 | Huber et al. | 359/125 |
| 5,359,612 A | 10/1994 | Dennis et al. | 372/18 |
| 5,369,519 A | 11/1994 | Islam | 359/173 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,485,536 A | 1/1996 | Islam | 385/31 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Tamura et al. | 372/6 |
| 5,521,738 A | 5/1996 | Froberg et al. | 359/184 |
| 5,530,710 A | 6/1996 | Grubb | 372/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A | 4/1997 | Grubb et al. | 372/3 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,664,036 A | 9/1997 | Islam | 385/31 |
| 5,673,280 A | 9/1997 | Grubb et al. | 372/3 |
| 5,673,281 A | 9/1997 | Byer | 372/3 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni et al. | 359/341 |
| 5,778,014 A | 7/1998 | Islam | 372/6 |
| 5,796,909 A | 8/1998 | Islam | 385/147 |
| 5,798,855 A | 8/1998 | Alexander et al. | 359/177 |
| 5,825,520 A | 10/1998 | Huber | 359/130 |
| 5,838,700 A | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A | 1/1999 | Jabr | 359/341 |
| 5,880,866 A | 3/1999 | Stolen | 359/138 |
| 5,883,736 A * | 3/1999 | Oshima et al. | 359/341 |
| 5,887,093 A | 3/1999 | Hansen et al. | 385/27 |
| 5,920,423 A | 7/1999 | Grubb et al. | 359/341 |
| 6,043,927 A | 3/2000 | Islam | 359/332 |
| 6,052,393 A | 4/2000 | Islam | 372/6 |
| 6,101,024 A | 8/2000 | Islam et al. | 359/334 |
| 6,147,794 A * | 11/2000 | Stentz | 359/334 |
| 6,163,636 A * | 12/2000 | Stentz et al. | 385/2 X |
| 6,181,464 B1 * | 1/2001 | Kidorf et al. | 359/334 |
| 6,239,902 B1 | 5/2001 | Islam et al. | 359/334 |
| 6,239,903 B1 | 5/2001 | Islam et al. | 359/337 |
| 6,263,139 B1 * | 7/2001 | Kawakami et al. | 385/123 |
| 6,335,820 B1 | 1/2002 | Islam | 359/334 |
| 6,356,383 B1 | 3/2002 | Cornwell, Jr. et al. | 359/334 |
| 6,356,384 B1 | 3/2002 | Islam | 359/334 |
| 6,359,725 B1 * | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/334 |
| 6,437,906 B1 | 8/2002 | Di Pasquale et al. | 359/337.2 |
| 6,574,037 B2 * | 6/2003 | Islam et al. | 359/334 |

OTHER PUBLICATIONS

Sun, Y. et al., "80nm Ultra–Wideband Erbium–Doped Silica Fibre Amplifier" Electronics Letters, vol. 33, No. 23, pp. 1965–1967, Nov. 6, 1997.

Wysocki, P.F. et al., "Broad–Band Erbium–Doped Fiber Amplifier Flatened Beyond 40nm Using Long–Period Grating Filter," IEEE Photonics, vol. 9, No. 10, pp. 1343–1345, Oct. 10, 1997.

Liaw, S–K et al., "Passive Gain–Equilized Wide–Band Erbium–Doped Fiber Amplifier Using Samarium–Doped Fiber," IEEE Photonics Technology: Letters, vol. 8, No. 7, pp. 879–881, Jul. 7, 1996.

Yamada, M. et al., "A Low–Noise and Gain–Flattened Amplifier Composed of a Silica–Based and a FluorideBased Er3+–Doped Fiber Amplifier in a Cascade Configuration," IEEE Photonics Letters, vol. 8, No. 5, pp. 620–622, May 1996.

Ma, M.X. et al., "240–km Repeater Spacing in a 5280–km WDM System Experiment Using 8x2.5 Gb/s NRZ Transmission," IEEE Photonics Technology Letters, vol. 10, No. 6, pp. 893–895, Jun. 1998.

Masuda, H. et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Masuda, H. et al, "Wide–Band and Gain Flatened Hybrid Fiber Amplifier Consisting of an EDFA and a Multiwavelength Pumped Raman Amplifier," IEEE Photonics Technology Letters, vol. 11, No. 6, pp. 647–649, Jun. 1999.

Kawai, S. et al., "Ultra–Wide, 75nm 3dB Gain–Band Optical Amplifier Utilising Gain–Flattened Erbium–Doped Fluoride Fibre Amplifier and Discrete Raman Amplification," Electronic Letters, vol. 34, No. 9, pp. 897–898, Apr. 30, 1998.

Kawai, S. et al., "Ultrawide, 75nm 3db Gain–Band Optical Amplifier Using Erbium–Doped Fluoride Fiber and Raman Fiber," OFC Technical Digest, 1998.

Kidorf, H. et al., "Pump Interactions in a 100nm Bandwidth Raman Amplifier," IEEE Electronics Tecyhnology Letters, vol. 11, No. 5, pp. 530–532, May 1999.

Ono, H. et al., "Gain–Flattened ER3+–Doped Fiber Amplifier for a WDM Signal in the 1.57–1.60–$\mu$m Wavelength Region," IEEE Photonics Technology Letters, vol. 9, No. 5, pp. 596–598, May 1997.

Hansen, P.B. et al., "529km Unrepeatered Transmission at 2.488 Gbit/s Using Dispersion Compensation Forward Error Correction, and Remote Post– and Pre–Amplifiers Pumped By Diode–Pumped Raman Lasers," IEEE Electronics Letters Online No. 19951043, Jul. 7, 1998.

Guy, M.J. et al., "Lossless Transmission of 2ps Pulses Over 45km of Standard Fibre at 1.3$\mu$m Using Distributed Raman Amplification," Electronics Letters, vol. 34, No. 8, pp. 793–794, Apr. 6, 1998.

Dianov, E.M. et al., "Highly Efficient 1.3$\mu$m Raman Fibre Amplifier," Electronics Letters, vol. 34, No. 7, pp. 669–670, Apr. 2, 1998.

Chernikov, S.V. et al., "Ramam Fibre Laser Operating at 1.24$\mu$m," Electronics Letters, vol. 34, No. 7, pp. 680–681, Apr. 2, 1998.

Masuda, M. et al., "Wideband, Gain–Flattened, Erbium–Doped Fibre Amplifiers with 3dB Bandwidths of >50nm," Electronics Letters, vol. 33, No. 12, pp. 1070–1072, Jun. 5, 1997.

Yang, F.S. et al., "Demonstration of Two–Pump Fibre Optical Parametric Amplification," Electronics Letters, vol. 33, No. 21, pp. 1812–1813, Oct. 9, 1997.

Kawai, S. et al., "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Pashcotta, R. et al., "Ytterbium–Doped Fiber Amplifiers," IEEE Journal of Quantum Electronics, vol. 33, No. 7, pp. 1049–1056, Jul. 1997.

Grubb, S.G. et al., "Fiber Raman Lasers Emit at Many Wavelengths," Laser Focus World, pp. 127–134, Feb. 1996.

Mollenauer, L.F. et al., "Dispersion–Managed Solitons for Terrestrial Transmission," Optical Society of America, 1999.

Hansen, S.L. et al., "Gain Limit in Erbium–Doped Amplifiers Due to Internal Rayleigh Backscattering," IEEE Photonics Technology Letters, vol. 4, No. 6, pp. 559–561, Jun. 1992.

Spirit, D.M. et al., "Systems Aspects of Raman Fibre Amplifiers," Optical Amplifiers for Communication, vol. 137, Pt. J, No. 4, pp. 221–224, Aug. 1990.

Mollenauer, L.F. et al., "Soliton Propagation in Long Fibers with Periodically Compensated Loss," IEEE Journal of Quantum Electronics, vol. QE–22, No. 1, pp. 157–173, Jan. 1986.

Mahric, M.E. et al., "Cancellation of Stimulated–Raman–Scattering Cross Talk in Wavelength–Division–Multiplexed Optical Communication Systems by Series or Parallel Techniques," Optical Society of America, vol. 15, No. 3, pp. 958–963, 1998.

Hansen, P.B. et al., "Rayleigh Scattering Limitations in Distributed Raman Pre–Amplifiers," IEEE Photonics Technology Letters, vol. 10, No. 1, pp. 159–161, Jan. 1998.

Ikeda, M., "Stimulated Raman Amplification Characteristics in Long Span Single–Mode Silica Fibers," Optics Communications, vol. 39, No. 3, pp. 148–152, 1981.

Solbach, K. et al., "Performance Degradation Due to Stimulated Raman Scattering in Wavelength–Division–Multiplexed Optical–Fibre Systems," Electronics Letters, vol. 19, No. 6, pp. 641–643, Aug. 4, 1983.

Grandpierre, A.G. et al., "Theory of Stimulated Raman Scattering Cancellation of Wavelength–Division–Multiplexed Systems via Spectral Inversion," IEEE Photonics Technology Letters, vol. 11, No. 10, pp. 1271–1273, Oct. 1999.

Chinn, S.R. "Analysis of Counter–Pumped Small–Signal Fibre Raman Amplifiers," Electronics Letters, vol. 33, No. 7, pp. 607–608, Mar. 27, 1997.

Stolen, R.H. et al., "Raman Gain in Glass Optical Waveguides," Appl. Phys. Lett., vol. 22, No. 6, pp. 276–278, Mar. 15, 1973.

Stolen, R.H. et al., "Development of the Stimulated Raman Spectrum in Single–Mode Silica Fibers," Optical Society of America, vol. 1, No. 4, pp. 662–667, Aug. 1984.

Nissov, M. et al., "100 Gb/s (10x10Gb/s) WDM Transmission Over 7200 km Using Distributed Raman Amplification," Center for Broadband Telecommunications, pp. 9–12, Not Dated.

Patent Abstracts of Japan, vol. 1997, No. 11 & JP 09197452A (NEC Corp.), (Jul. 3, 1997) abstract.

* cited by examiner

Raman Cascade Frequencies for Various Pump Wavelengths

|  |  | Peak Raman Gain: | 1.32E+13 THz |
|---|---|---|---|
|  |  | Speed of light: | 3.00E+17 nm/s |

| wavelength (nm) | Δλ | wavelength (nm) | Δλ |
|---|---|---|---|
| 1060.00 | 51.86 | 1110.00 | 57.00 |
| 1111.86 | 57.19 | 1167.00 | 63.17 |
| 1169.05 | 63.39 | 1230.16 | 70.40 |
| 1232.44 | 70.66 | 1300.56 | 78.94 |
| 1303.11 | 79.26 | 1379.50 | 89.14 |
| 1382.37 | 89.53 | 1468.64 | 101.46 |
| 1471.90 | 101.93 | 1570.10 | 116.52 |
| 1573.82 | 117.09 | 1686.62 | 135.20 |

| wavelength (nm) | Δλ | wavelength (nm) | Δλ |
|---|---|---|---|
| 1070.00 | 52.86 | 1117.00 | 57.74 |
| 1122.86 | 58.36 | 1174.74 | 64.03 |
| 1181.22 | 64.76 | 1238.77 | 71.41 |
| 1245.98 | 72.27 | 1310.18 | 80.15 |
| 1318.25 | 81.17 | 1390.33 | 90.59 |
| 1399.42 | 91.82 | 1480.92 | 103.22 |
| 1491.25 | 104.72 | 1584.15 | 118.69 |
| 1595.97 | 120.54 | 1702.84 | 137.92 |

| wavelength (nm) | Δλ | wavelength (nm) | Δλ |
|---|---|---|---|
| 1080.00 | 53.88 | 1120.00 | 58.05 |
| 1133.88 | 59.54 | 1178.05 | 64.40 |
| 1193.42 | 66.14 | 1242.46 | 71.85 |
| 1259.56 | 73.90 | 1314.31 | 80.67 |
| 1333.47 | 83.11 | 1394.98 | 91.22 |
| 1416.58 | 94.16 | 1486.20 | 103.99 |
| 1510.74 | 107.57 | 1590.19 | 119.63 |
| 1618.32 | 124.07 | 1709.82 | 139.10 |

| wavelength (nm) | Δλ | wavelength (nm) | Δλ |
|---|---|---|---|
| 1090.00 | 54.91 | 1130.00 | 59.12 |
| 1144.91 | 60.74 | 1189.12 | 65.65 |
| 1205.65 | 67.54 | 1254.77 | 73.32 |
| 1273.19 | 75.56 | 1328.10 | 82.43 |
| 1348.74 | 85.09 | 1410.53 | 93.33 |
| 1433.83 | 96.55 | 1503.86 | 106.56 |
| 1530.38 | 110.49 | 1610.42 | 122.81 |
| 1640.87 | 127.69 | 1733.24 | 143.09 |

| wavelength (nm) | Δλ | wavelength (nm) | Δλ |
|---|---|---|---|
| 1100.00 | 55.95 | 1140.00 | 60.20 |
| 1155.95 | 61.94 | 1200.20 | 66.92 |
| 1217.89 | 68.96 | 1267.12 | 74.82 |
| 1286.85 | 77.24 | 1341.93 | 84.21 |
| 1364.09 | 87.10 | 1426.14 | 95.48 |
| 1451.19 | 98.98 | 1521.62 | 109.18 |
| 1550.17 | 113.47 | 1630.81 | 126.07 |
| 1663.64 | 131.40 | 1756.87 | 147.19 |

FIG. 2

Exemplary Wavelengths

| | |
|---|---|
| SIGNAL | ~ 1550 nm |
| nth ORDER | ~ 1450 nm |
| n - 1 ORDER | ~ 1365 nm |
| n - 2 ORDER | ~ 1287 nm |
| n - 3 ORDER | ~ 1218 nm |
| n - 4 ORDER | ~ 1155 nm |
| n - 5 ORDER | ~ 1100 nm |

| | | | |
|---:|---:|---:|---:|
| 2.0000 | 0.7342 | 0.7348 | 0.7338 |
| 4.0000 | 1.3614 | 1.3655 | 1.3589 |
| 6.0000 | 1.9085 | 1.9205 | 1.9009 |
| 8.0000 | 2.3931 | 2.4184 | 2.3769 |
| 10.0000 | 2.8278 | 2.8723 | 2.7989 |
| 12.0000 | 3.2217 | 3.2912 | 3.1758 |
| 14.0000 | 3.5814 | 3.6824 | 3.5141 |
| 16.0000 | 3.9124 | 4.0510 | 3.8190 |
| 18.0000 | 4.2188 | 4.4012 | 4.0945 |
| 20.0000 | 4.5040 | 4.7364 | 4.3439 |
| 22.0000 | 4.7705 | 5.0591 | 4.5700 |
| 24.0000 | 5.0208 | 5.3717 | 4.7750 |
| 26.0000 | 5.2568 | 5.6759 | 4.9608 |
| 28.0000 | 5.4801 | 5.9732 | 5.1292 |
| 30.0000 | 5.6920 | 6.2650 | 5.2815 |
| 32.0000 | 5.8938 | 6.5522 | 5.4191 |
| 34.0000 | 6.0865 | 6.8358 | 5.5430 |
| 36.0000 | 6.2710 | 7.1166 | 5.6544 |
| 38.0000 | 6.4483 | 7.3953 | 5.7540 |
| 40.0000 | 6.6190 | 7.6724 | 5.8428 |
| 42.0000 | 6.7837 | 7.9485 | 5.9216 |
| 44.0000 | 6.9432 | 8.2239 | 5.9910 |
| 46.0000 | 7.0979 | 8.4992 | 6.0517 |
| 48.0000 | 7.2483 | 8.7745 | 6.1043 |
| 50.0000 | 7.3949 | 9.0502 | 6.1495 |
| 52.0000 | 7.5381 | 9.3265 | 6.1877 |
| 54.0000 | 7.6783 | 9.6036 | 6.2195 |
| 56.0000 | 7.8158 | 9.8817 | 6.2453 |
| 58.0000 | 7.9511 | 10.1609 | 6.2655 |
| 60.0000 | 8.0842 | 10.4414 | 6.2807 |
| 62.0000 | 8.2357 | 10.7233 | 6.2912 |
| 64.0000 | 8.3457 | 11.0067 | 6.2925 |
| 66.0000 | 8.4744 | 11.2916 | 6.2947 |
| 68.0000 | 8.6021 | 11.5781 | 6.2984 |
| 70.0000 | 8.7290 | 11.8662 | 6.2936 |
| 72.0000 | 8.8552 | 12.1560 | 6.2863 |
| 74.0000 | 8.9810 | 12.4475 | 6.2760 |
| 76.0000 | 9.1065 | 12.7408 | 6.2634 |
| 78.0000 | 9.2319 | 13.0357 | 6.2486 |
| 80.0000 | 9.3573 | 13.3324 | 6.2320 |
| | ↑ | ↑ | ↑ |
| | BIDIRECTIONAL | BACKWARD | FORWARD |

FIG. 8

1. Distributed Raman Amps is S⁺ band

2. Hybrid Raman Amps in S$^+$ band

§ E. PUMP CONFIGURATIONS...

§ H: Lower power...
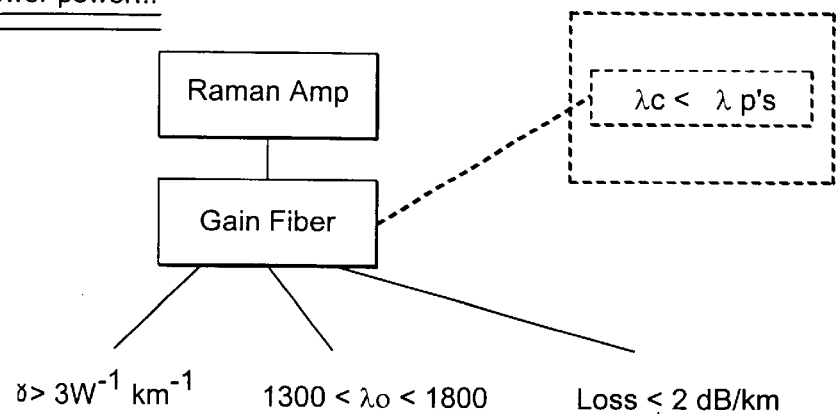
FIG. 49A
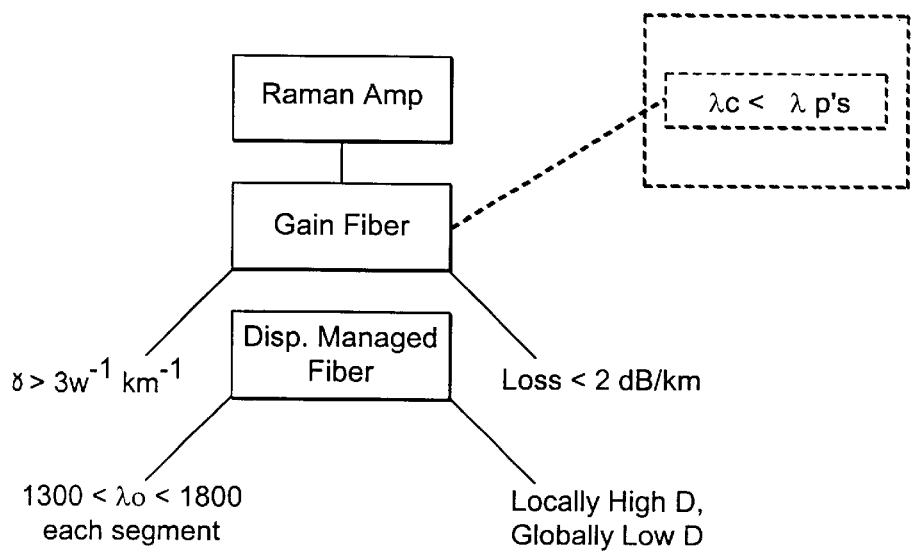
FIG. 49B
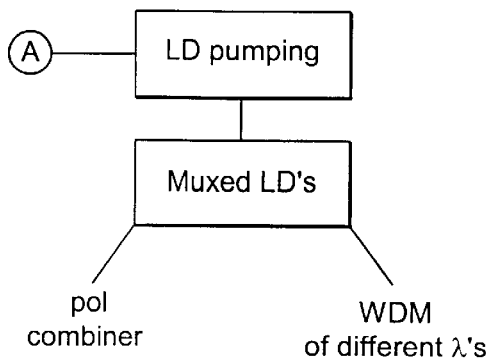 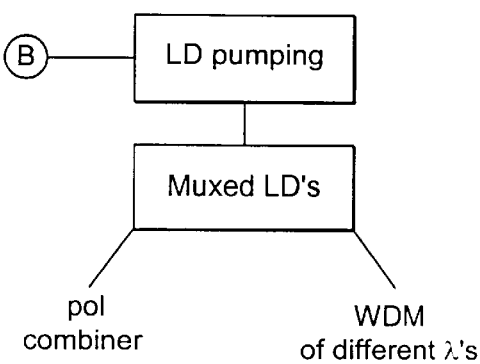
FIG. 49C                FIG. 49D §1 : U - DWDM Sytems...

LOW-NOISE DISTRIBUTED RAMAN AMPLIFIER USING BI-DIRECTIONAL PUMPING USING MULTIPLE RAMAN ORDERS

REFERENCE TO RELATED APPLICATIONS

This application is a divisional of U.S. patent application Ser. No. 09/760,201, filed Jan. 12, 2001 and entitled "LOW-NOISE DISTRIBUTED RAMAN AMPLIFIER USING BI-DIRECTIONAL PUMPING USING MULTIPLE RAMAN ORDERS," now U.S. Pat. No. 6,631,025 which is a continuation-in-part of U.S. Provisional Application Serial No. 60/175,786, filed Jan. 12, 2000.

BACKGROUND

1. Field of the Invention

This invention relates to low noise optical amplifiers for fiber optic transmission systems, and more particularly to low noise discrete, distributed and hybrid Raman amplifiers for broadband communication systems.

2. Description of Related Art

Stimulated Raman scattering is an important nonlinear process that turns optical fibers into amplifiers and tunable lasers. Raman gain results from the interaction of intense light with optical phonons in silica fibers, and Raman effect leads to a transfer of energy from one optical beam (the pump) to another optical beam (the signal). The signal is downshifted in frequency (or upshifted in wavelength) by an amount determined by vibrational modes of silica fibers. The Raman gain coefficient $g_r$ for the silica fibers is shown in FIG. 1. Notably, the Raman gain $g_r$ extends over a large frequency range (up to 40 THz) with a broad peak centered at 13.2 THz (corresponding to a wavelength of 440 cm$^{-1}$). This behavior over the large frequency range is due to the amorphous nature of the silica glass and enables the Raman effect to be used in broadband amplifiers. The Raman gain also depends on the composition of the fiber core and can vary with different dopant concentrations.

Raman amplification has some attractive features. First, Raman gain is a good candidate for upgrading existing fiber optic links because it is based on the interaction of pump light with optical phonons in the existing fibers. Second, there is no excessive loss in the absence of pump power, other than the loss of the fiber inserted—an important consideration for system reliability.

Cascading is the mechanism by which optical energy at the pump wavelength is transferred, through a series of nonlinear polarizations, to an optical signal at a longer wavelength. Each nonlinear polarization of the dielectric produces a molecular vibrational state corresponding to a wavelength that is offset from the wavelength of the light that produced the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. As an example, cascade Raman orders for different pump wavelengths are illustrated in FIG. 2. Because the Raman gain profile has a peak centered at 13.2 THz in silica fibers, one Raman order can be arranged to be separated from the previous order by 13.2 THz.

Cascading makes stimulated Raman scattering amplifiers very desirable. Raman amplification itself can be used to amplify multiple wavelengths (as in wavelength division multiplexing) or short optical pulses because the gain spectrum is very broad (a bandwidth of greater than 5 THz around the peak at 13.2 THz). Moreover, cascading enables Raman amplification over a wide range of different wavelengths. By varying the pump wavelength or by using cascaded orders of Raman gain, the gain can be provided over the entire telecommunications window between 1300 nm and 1600 nm.

Raman gain can be used in both discrete and distributed amplifiers. The main advantages of distributed Raman amplification are that the effective noise figure (NF) is improved and existing systems can be upgraded. Intuitively, the NF improves because the signal is continuously amplified and never gets too weak. The additional system margin allowed by distributed amplification can be used to upgrade the system speeds, increase the spacing between amplifiers or repeaters, or to handle the variability in fibers for installed systems. When using distributed amplification, the pump light can be counter-propagating to the signal direction. Simulations and experiments have shown the improvement in noise figure achieved using distributed amplification. For example, a calculation from first principles for a chain of optical amplifiers shows the improvement in signal-to-noise ratio (SNR) for more closely spaced amplifiers. The case of purely uniform amplification gives an improvement of about NF=2 dB compared with amplifiers spaced evenly every 21.7 km and an improvement of about NF=4 dB compared with amplifiers spaced evenly every 43.4 km (where NF (dB)=SNR$_{IN}$ (dB)–SNR$_{OUT}$ (dB)).

Experiments have also verified the improvement in NF performance for distributed amplification. For instance, experiments in a 514 km Raman amplifier chain have shown an improvement in noise performance of 2 dB compared with a similar amplifier chain using lumped EDFA's spaced roughly every 45 km. This is less than the ideal case because the pump light attenuates along the length of the fiber, leading to periodic but non-uniform amplification. In addition, a combination of distributed Raman amplification and EDFA's has been used to extend the repeater spacing to 240 km for a 5280 km WDM 8-channel system. The performance demonstrated in this experiment was comparable to that of a system of similar length and capacity using conventional EDFA's spaced by 80 km. Therefore, the additional NF margin from distributed amplification can be used to significantly increase the repeater spacing of long-haul transmission systems. Furthermore, a distributed Raman amplifier is tested in a 45 km length of transmission fiber that is pumped by two pumps at 1453 nm and 1495 nm. The resulting transparency gain bandwidth is 92 nm, and the Raman amplifier is shown to perform better than a lumped EDFA with a NF equal or higher than 5 dB.

Another use of hybrid or distributed amplifiers is to reduce nonlinearity impairments from four-wave mixing (4WM), and Raman gain tilt that become increasingly important as new bands are added and the channel count increases. One way of minimizing these nonlinearity impairments is to reduce the power per wavelength channel. This can be achieved without degradation of the signal-to-noise ratio at the receiver by using hybrid or distributed Raman amplification. In particular, distributed Raman amplification can be achieved by pumping the fiber composing the transmission line with a Raman oscillator or laser diodes directly. The pump light produces Raman gain for the signal using the inherent Raman gain in the transmission fiber. Since the gain is inherent to the transmission line, this provides a graceful means of upgrading even existing fiber-optic systems.

The power per channel can be reduced because distributed Raman amplification cancels or compensates for the loss in the fiber. Said another way, the distributed Raman gain has an effectively better noise figure than its discrete amplifier counterparts. The channel power can be lowered to the point that nonlinearities become insignificant. For example, in a typical transmission system at power of 0 dBm (1 mW) is used at OC-48 or 2.5 Gb/s and 6 dBm (4 mW) at OC-192 or 10 Gb/s per channel. With the addition of distributed amplification, OC-192 systems have been demonstrated in the laboratory with power per channel as low as −13 dBm (0.05 mW).

Distributed Raman amplification can also help in gain control or gain clamping, i.e., It is undesirable to have the gain level change when channels are added or dropped, such as when optical add/drop multiplexers are used. This gain clamping problem can be solved to a large extent by using distributed Raman amplification because the power per channel is significantly reduced. The lower power insures that there will be negligible gain or pump depletion. Therefore, the combination of lower power per channel and negligible gain depletion provides an effective gain clamping.

That nonlinear effects in fiber transmission systems can be avoided by use of distributed or hybrid Raman amplification has been illustrated in a number of recent experiments. Transmission in DSF around the zero-dispersion region in a single wavelength band has been demonstrated. Dense-WDM (DWDM) transmission of 32 channels with 50 GHz spacing and bit-rate of 10 Gb/s over 8×80 km has been demonstrated. Normally, DWDM systems in the neighborhood of the zero dispersion wavelength suffer from 4WM penalties. However, by lowering the channel power down to −13 dBm with the use of distributed Raman amplification, 4WM can be avoided and the results verify feasibility of DWDM transmission in DSF.

DWDM transmission near the zero dispersion wavelength without 4WM or other nonlinearity penalties in a single wavelength band has been demonstrated in multiple experiments: (a) 25-channel, 100 GHz spacing of 10 Gb/s channels, transmission over 8×83 km; (b) 49-channel, 50 GHz spacing of 10 Gb/s channels, transmission over 4×83 km. Significant improvements can be obtained at a pump power of only 440 mW in DSF by using hybrid Raman/erbium-doped fiber amplifiers.

Distributed Raman amplification can minimize nonlinear effects between WDM channels effectively in single band experiments (i.e., in the so-called "C-band" or conventional band between 1535 and 1565 nm).

One benefit of DRA's, such as reduction of the nonlinear effects among WDM signal channels, can increase the bandwidth utilization efficiency in WDM systems of some embodiments. Since 1996, when WDM systems were first commercially introduced, the number of wavelength channels has increased dramatically (FIG. 27). For example, state-of-the-art systems in 1999 have more than 100 wavelength channels. Given this rapid increase in channel count, the question is how to achieve the next decade increase in number of channels—or, ultra-dense-WDM (U-DWDM) systems. What are the key enabling technologies for systems of 1000 or more wavelength channels?

There are fundamental limitations to achieving 1000+ wavelength systems. First, as the density of channels increases, nonlinear interactions between channels—such as four-wave-mixing and Raman gain tilt—can limit the system performance. The second problem of U-DWDM systems is the transmitter complexity. For example, if temperature and frequency stabilized LD's are used as the light source, then as the density of channels increases, it can become increasingly more difficult to reduce the channel spacing. Moreover, as the number of channels increases, the footprint or physical size of the transmitter becomes increasingly large. A third challenge of U-DWDM systems is the filtering technology. Filters with high-contrast and narrow channel spacing are required to place many channels in close proximity to one-another.

One illustration of the fundamental fiber nonlinearity limits can be taken from a systems viewpoint. The parameters used in one study are: fiber link of 30 km, 1550 nm wavelength, loss of 0.2 dB/km, $A_{eff}=50$ $\mu m^2$, channel spacing of 10 GHz, for standard fiber chromatic dispersion of 16 ps/nm-km or for DS fiber a chromatic dispersion of 1 ps/nm-km. FIG. 28a shows the four-wave-mixing efficiency as a function of channel spacing at 1550 nm. The solid curve represents standard fiber, while the dashed curve represents DS fiber. The four-wave-mixing efficiency can be much higher in DS fiber because the phase-matching can be more readily achieved in low dispersion fiber. FIG. 28(b) shows the maximum power per channel versus the number of channels that ensures stimulated Raman scattering (SRS), carrier-induced phase modulation (CIP), stimulate Brillouin scattering (SBS), and four-photon mixing (FPM) degradations are below 1 dB for all channels. For standard or DS fiber, channel spacing on the order of 10 GHz can be problematic. For a number of channels approaching 1000, Raman gain tilt can be the first nonlinearity to affect the system, and the power per channel can approach ~0.01 mW/channel (−20 dBm) to avoid nonlinearities.

Hybrid amplifiers using DRA's can serve as an enabler for 1000+ wavelength systems. One benefit of DRA's can be better NF, which can be used to lower the signal amplitudes so that nonlinear interaction between channels can be reduced. Nonlinear effects can be avoided using DRA's. Despite operation near the zero dispersion wavelength, four-wave-mixing penalties can be avoided in 25–50 channel systems. The optical SNR improvement using DRA's can be 6.6 dB in DS fiber and 7 dB in standard fiber. The input channel power can be reduced by this many decibels and still maintain the system SNR.

Hybrid amplifiers can improve system with improved NF. This NF improvement can be used as additional system margin to extend the spacing between amplifiers, lower signal powers to avoid fiber nonlinearity or increase the system bit-rate. However, these experiments focus on using DRA's only in the so-called C-band (between 1530–1565 nm), where the discrete amplifier is an EDFA. Also, the experiments are made in DS fiber, where the zero dispersion wavelength coincides with about 1550 nm. One problem with implementing DRA's in this wavelength range is that it will prevent further expansion of new low-loss windows later on.

There is a need for low noise Raman amplifiers and broadband transmission systems. There is a further need for distributed, discrete and hybrid amplifiers with improved noise figures. Another need exists for optical amplifiers suitable for wavelengths of 1480 nm or less where the loss of the fiber increases.

SUMMARY OF THE INVENTION

An object of the present invention is to provide a Raman amplifier with an improved noise figure.

Another object of the present invention is to provide a Raman amplifier with bi-directional pumping and an improved noise figure.

Yet another object of the present invention is to provide a Raman amplifier with bi-directional pumping and an improved noise figure, where the bi-directional pumping is achieved by using a pump to amplify the signal in a counter-propagating manner.

A further object of the present invention is to provide a Raman amplifier that is bi-directionally pumped and includes at least a first and a second pump as well as at least one additional pump that co-propagates with the signal to amplify the first pump.

Yet a further object of the present invention is to provide a Raman amplifier with multiple orders of Raman pumps that are bi-directional, includes at least a first and a second pump and at least one additional pump that co-propagates with the signal to amplify the first pump.

Another object of the present invention is to provide a bi-directionally pumped Raman amplifier with pump modules that can be multi-wavelength Raman oscillators, single wavelength Raman oscillators, laser diode pumps and combinations thereof.

Still another object of the present invention is to provide a low noise distributed Raman amplifier with bi-directional pumping.

Yet another object of the present invention is to provide a low noise discrete Raman amplifier with bi-directional pumping.

Another object of the present invention is to provide a low noise hybrid Raman amplifier with bi-directional pumping.

These and other objects of the present invention are achieved in a Raman amplifier assembly. A Raman amplifier is configured to receive a signal from a signal source. The signal travels in an upstream direction in the Raman amplifier. A first pump source is coupled to the Raman amplifier. The first pump source produces a first pump beam that travels in a downstream direction and is counter-propagating relative to the signal. A second pump source is coupled to the Raman amplifier and produces a second pump beam that travels in the upstream direction. The second pump source has an average relative intensity noise of less than −80 dB/Hz.

In another embodiment of the present invention, a multi-stage Raman amplifier apparatus includes a Raman amplifier configured to receive a signal from a signal source. The signal travels in an upstream direction in the Raman amplifier. A first pump source is coupled to the first Raman amplifier. The first pump source produces a first pump beam in a downstream direction that is counter-propagating relative to the signal. A second pump source is coupled to the first Raman amplifier. The second pump source produces a second pump beam that travels in the upstream direction. A third pump source is coupled to a second Raman amplifier. The third pump source produces a third pump beam that travels in the downstream direction.

In another embodiment of the present invention, a Raman amplifier assembly includes an optical transmission line with a first port and a second port. At least a portion of the optical transmission line produces Raman gain. A first pump source produces a first pump beam. The first pump beam and a first signal of multiple wavelengths enter the first port and travel in a downstream direction from the first port to second port. A second pump source produces a second pump beam. The second pump beam and a second signal of multiple wavelengths enter the second port and travel in an upstream direction from the second port to the first port. At least a portion of the second pump beam pumps the first pump beam, and at least a portion of the first signal wavelengths have shorter wavelengths than the second signal wavelengths.

In another embodiment of the present invention, a Raman amplifier assembly includes a Raman amplifier configured to receive a signal from a signal source. The signal travels in an upstream direction in the Raman amplifier. A first pump source is coupled to the Raman amplifier. The first pump source produces a first pump beam that travels in a downstream direction and is counter-propagating relative to the signal source. A second pump source is coupled to the Raman amplifier and has an average relative intensity noise of less than −80 dB/Hz. The second pump source produces a second pump beam that travels in the upstream direction. The second pump beam has wavelengths that are shorter than wavelengths of the first pump beam.

In another embodiment of the present invention, a method of broadband amplification provides a Raman amplifier assembly that includes an optical transmission line with a first port and a second port. At least a portion of the optical transmission line produces Raman gain. The Raman amplifier assembly is pumped with at least a first pump beam and a second beam. At least a portion of the second pump beam pumps the first pump beam. A first signal of multiple wavelengths is introduced into the first port. A second signal of multiple wavelengths is introduced into the second port. The first and second signals are amplified.

In another embodiment of the present invention, a method of broadband amplification provides a first pump source, a second pump source with an average relative intensity noise of less than −80 dB/Hz and a Raman amplifier assembly. The Raman amplifier assembly includes an optical transmission line with a first port and a second port. At least a portion of the optical transmission line produces Raman gain. The Raman amplifier assembly is pumped at the first port with at least a first pump beam, and at the second port with a second pump beam. The second pump beam has wavelengths that are shorter than wavelengths of the first pump beam. A signal is introduced into the second port. The signal is amplified.

In another embodiment of the present invention, a Raman amplifier assembly includes a Raman amplifier configured to receive a signal from a signal source. The signal travels in an upstream direction in the Raman amplifier. A first pump source is coupled to the Raman amplifier and produces a first pump beam. The first pump beam travels in a downstream direction and is counter-propagating relative to the signal. The first pump source is substantially depolarized. A second pump source is coupled to the Raman amplifier and produces a second pump beam. The second pump beam travels in the upstream direction and pumps the first pump beam.

BRIEF DESCRIPTION OF THE FIGURES

FIG. 2 is a listing of Raman cascade order wavelengths for various pump wavelengths.

FIG. 3(*b*) is a graph illustrating pump profile as a function of fiber length with a single pump, such as from FIG. 3(*a*).

FIG. 3(*c*) is a graph illustrating the pump profile, such as for the FIG. 3(*a*) Raman amplifier, with two pumps that are counter-propagating.

FIG. 3(*d*) is a schematic diagram of an embodiment of a Raman amplifier with multiple Raman orders.

FIG. 8 is a table of the data from FIG. 7.

FIG. 49 is a block chart of various embodiments of Raman amplifiers.

DETAILED DESCRIPTION

Figure 1:
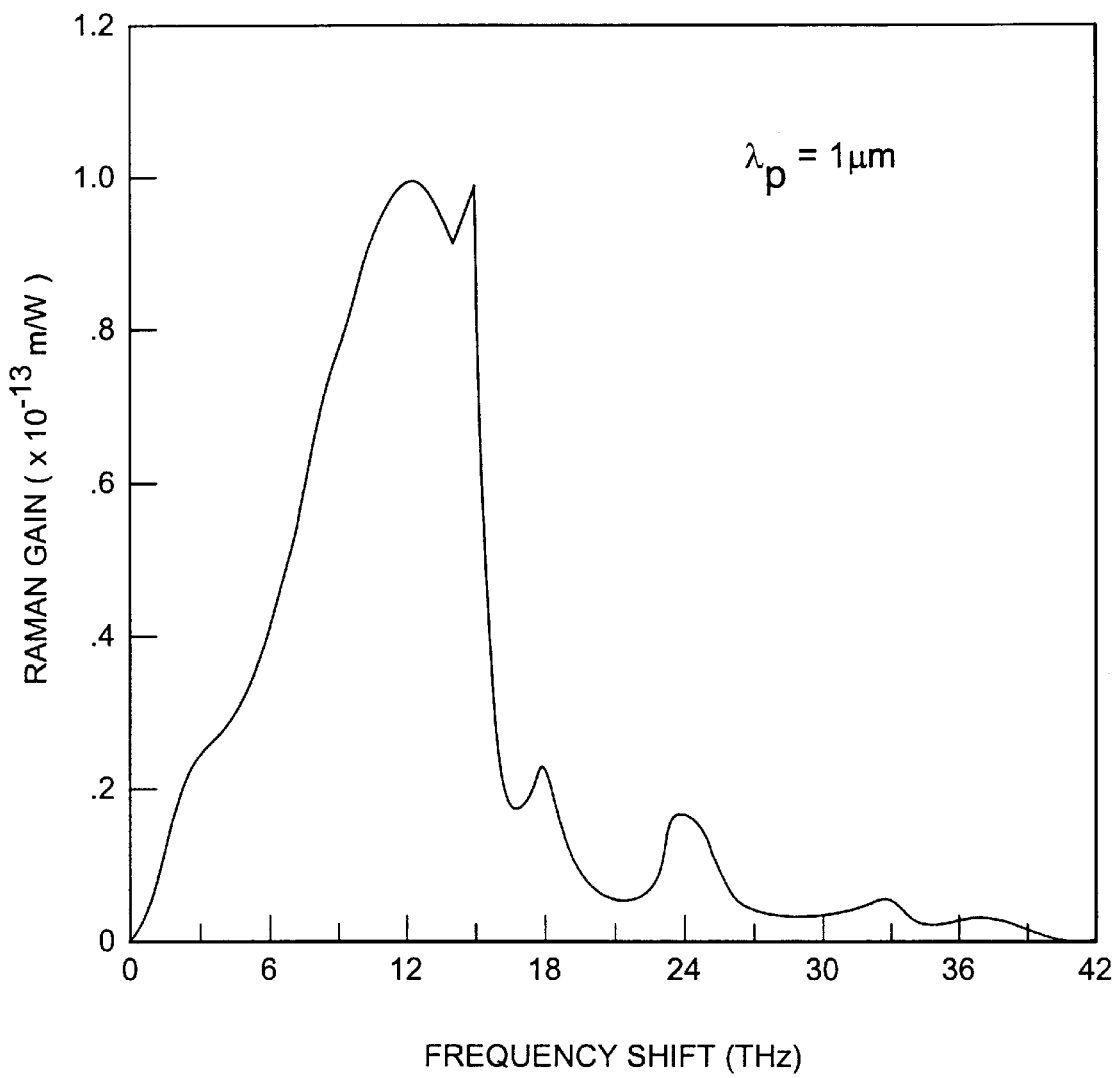
FIG. 1 is a graph of Raman gain coefficient in fused silica fiber.

The noise performance for distributed Raman amplifiers (DRA's) can be improved by using a multiple Raman order pumping scheme. The signal wavelength can be pumped by a Raman order (i.e., $n^{th}$ Raman order or pump Raman order). The pump Raman order can be amplified by the previous Raman order (i.e., n−1 Raman order or intermediate Raman order). The low-noise DRA pumping scheme can be arranged so that the $n^{th}$ Raman order is counter-propagating to the signal, while the n−1 Raman order is co-propagating with the signal. In this configuration, the pump fluctuations from the $n^{th}$ Raman order do not couple to the signal. The $n^{th}$ Raman order can be amplified closer to the input of one period of the amplifier length by the n−1 Raman order, thereby improving the noise figure of the amplifier. More generally, the pump Raman order can be arranged to be counter-propagating to the signal direction, and alternate previous Raman orders can be arranged to be counter-propagating to each of the subsequent Raman orders (i.e., consecutive Raman orders alternate in direction). This alternating pumping scheme can give a more uniform profile for the gain. This achieves a number of advantages, including one or more of boosting the pump near the beginning of each period of the amplifying segment to improve the NF for the DRA, and achieving a more uniform application profile which can be important for high-bit-rate systems and soliton based systems. Because the pump Raman order can be counter-propagating to the signal, the noise coupling between pump and signal can be minimized. Additionally, amplifying the pump can be a way to accumulate more pump power in the fiber. This can be particularly important when weaker pumps such as laser diodes are used, where the powers from different laser diodes can be combined.

In one exemplary system, the Raman pumps can be placed at amplifier spacings of 40–45 km, corresponding to one exemplary hut spacing in a telecommunication system. The amplification scheme can either be a pure DRA or a hybrid scheme comprising a discrete and distributed amplifier. The pump Raman order light can propagate upstream toward the signal source, while the intermediate Raman order can propagate downstream in the direction of the signal. For example, the hybrid amplifier could be an erbium-doped fiber amplifier (EDFA) that operates around 1550 nm combined with a DRA. A pump Raman order ($n^{th}$ order) can be introduced, counter-propagating around a wavelength of 1450 nm, while the intermediate Raman order (n−1 order) can be inserted, co-propagating around a wavelength of 1365 nm.

The low-noise DRA or hybrid amplifier can be pumped by either separate pumps or by dual-wavelength Raman oscillators. The dual-wavelength Raman oscillator can be a periodic transmission filter, with output couplers used along two arms of the cavity in the $n^{th}$ and n−1 Raman orders. Alternately, the $n^{th}$ and n−1 Raman order pumps can be laser diodes at the appropriate Raman wavelengths, where subsequent orders are separated by approximately 13.2 THz. This provides a convenient way to combine and accumulate sufficient laser diode power from a number of laser diodes. The $n^{th}$ order pump can be combined with the pump for the discrete amplifier in a hybrid amplifier scheme. For example, a pump between 1450–1480 nm can be used to pump both a discrete EDFA as well as the DRA in the $n^{th}$ order.

Multiple Raman orders to improve the amplifier NF and distribution of gain can also be used in discrete Raman amplifiers. In the discrete amplifier, a gain fiber can be inserted into the transmission line rather than using the transmission fiber as a gain medium. The NF improvement arises from boosting the pump at the entry point of the amplifier. A counter-propagating geometry can minimize the pump-to-signal coupling of fluctuations. Finally, in some embodiments pump lasers both at the pump Raman order as well as the intermediate Raman order can combine more laser diode powers.

Beyond the noise figure, other possible areas of improvement for DRA's include addressing limited bandwidth (e.g., about 20–25 nm) and high pump power requirements. One embodiment achieves a relatively flat and broadband DRA with a pump pre-emphasis technique combined with the spatial and spectral evolution of the Raman gain profile down the length of the transmission fiber. The nonlinear interaction between the pumps can be applied to discrete Raman amplifiers as well as DRA's. One embodiment improves the efficiency of Raman amplifiers by increasing the effective nonlinearity of the fiber used as the gain medium. One embodiment increases the effective nonlinearity without significantly increasing the loss or dispersion in the fiber, and keeping the cut-off wavelength of the fiber shorter than the pump wavelengths.

Finally, some embodiments of DRA's are systems enabled by use of the DRA's. In one exemplary system, the benefits of DRA—such as reduction of nonlinear effects among WDM signal channels—can increase the bandwidth utilization efficiency in WDM systems. For example, by using low-noise DRA's, the channel spacing can be reduced in some embodiments to 10 GHz, thereby enabling 100's of wavelength channels in WDM systems. In one embodiment, a source for such a dense-WDM system can be a continuum generation source in which the longitudinal modes serve as different wavelength channels. In another embodiment, DRA's can permit bandwidth expansion into the $S^+$-band and shorter wavelengths (i.e., wavelengths shorter than 1480 nm), where the loss in the fiber can increase beyond 0.03 dB/km above the fiber loss minimum around 1550 nm.

In some embodiments, by using multiple order Raman pumping of a DRA, some of limitations of current schemes of DRA can be minimized. Some current DRA schemes can be restricted to a counter-propagating pumping scheme, which leads to reduced NF and limited fiber length over which the DRA is effective. Both of these limitations can arise from the attenuation of the pump as it propagates down the fiber. Therefore, if a way of boosting the pump down the transmission line existed, the NF and length restrictions could be minimized. One embodiment is a Raman amplifier with an improved noise figure. Another embodiment makes the pump profile as a function of length more uniform with bi-directional pumping. The co-propagating pump can couple fluctuations to the signal, degrading the NF. Another embodiment is a Raman amplifier with bi-directional pumping having an improved noise figure. Thus, bi-directional pumping can be used with an extremely low-noise pump. Another embodiment boosts the pump down the transmission line with the previous Raman order to amplify the pump Raman order.

In another embodiment, a Raman amplifier with bi-directional pumping has an improved noise figure. Bi-directional pumping can be achieved with a pump to amplify the signal in a counter-propagating manner. One embodiment is a bi-directional Raman amplifier with at least a first and a second pump as well as at least one additional pump that co-propagates with the signal to amplify the first pump. The signal wavelength can be pumped by a Raman order (i.e., $n^{th}$ Raman order or pump Raman order). The pump Raman order can be amplified by the previous Raman order (i.e., n−1 Raman order or intermediate Raman order).

Figure 3A:
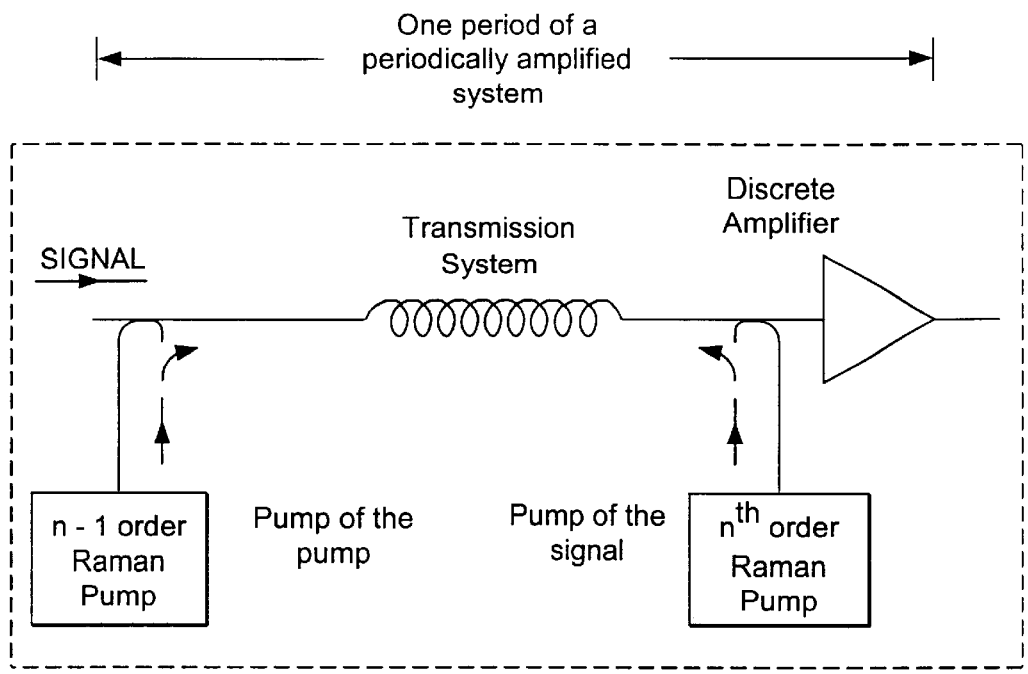
FIG. 3(*a*) is a schematic diagram of one embodiment of a bi-directionally pumped Raman amplifier of the present invention with two pumps.
Figure 3B:
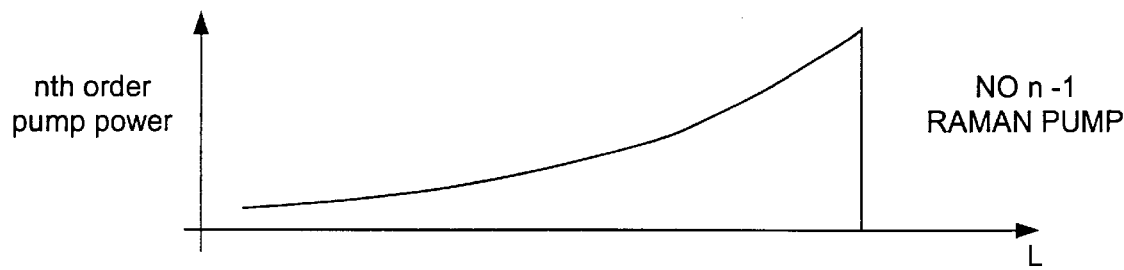
Figure 3C:
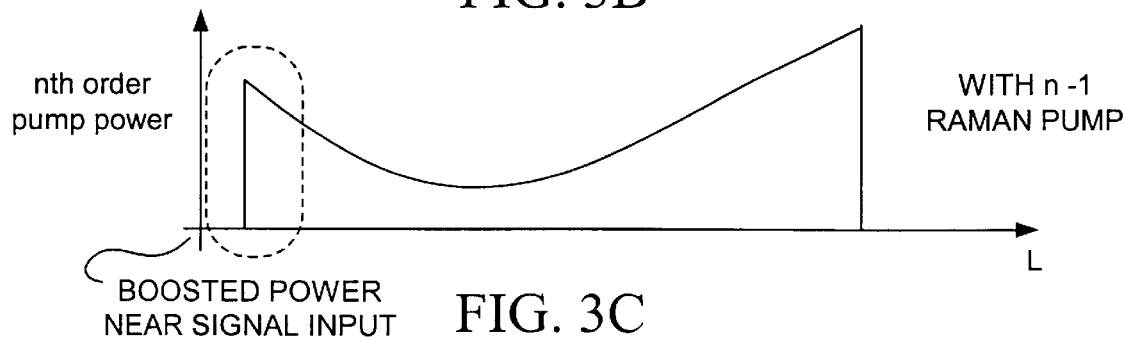

The low-noise DRA pumping scheme can be arranged so that the $n^{th}$ Raman order is counter-propagating to the signal, while the n−1 Raman order is co-propagating with the signal (c.f. FIG. 3a). In this configuration, the pump fluctuations from the $n^{th}$ Raman order do not couple to the signal. Also, the $n^{th}$ Raman order can be amplified closer to the input of one period of the amplifier length by the n−1 Raman order, thereby improving the noise figure of the amplifier (FIGS. 3b,c). One embodiment is a bi-directional Raman amplifier with multiple orders of Raman pumps and includes at least a first and a second pump and at least one additional pump that co-propagates with the signal to amplify the first pump.

Figure 3D:
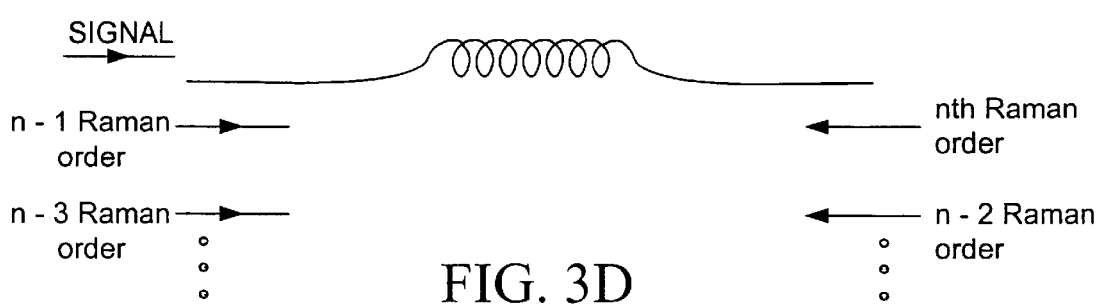
Figure 4:
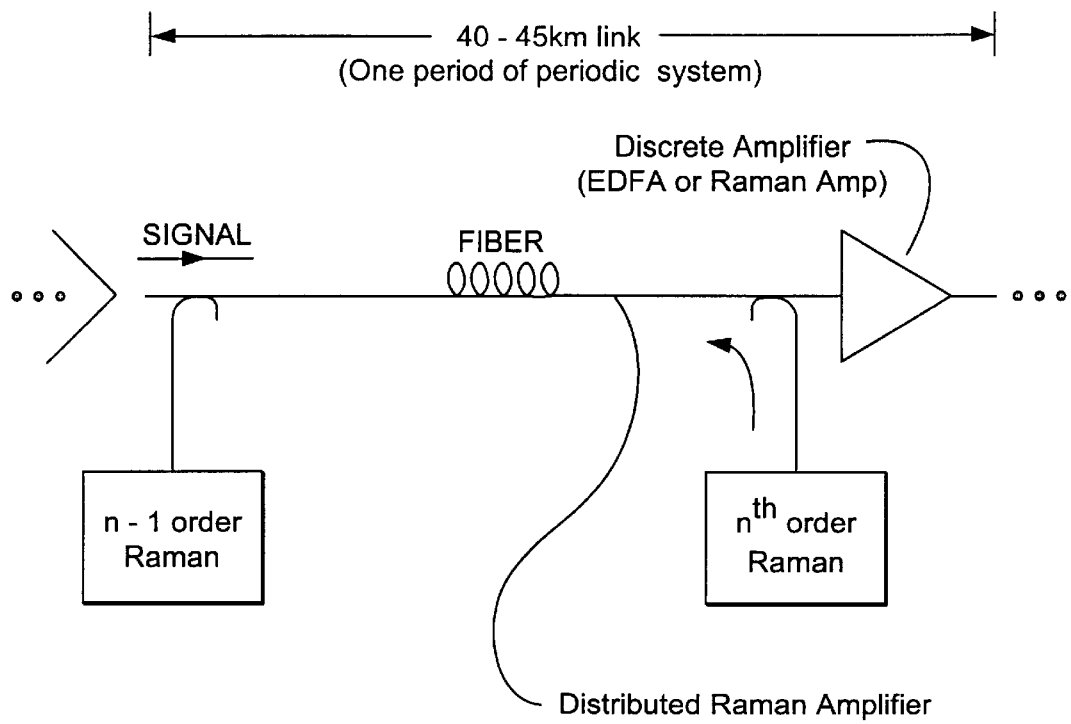
FIG. 4 is a schematic of an embodiment with the signal wavelength in the neighborhood of 1550 nm and transmission fiber length distance of 40 to 45 km between amplifiers.
Figure 5:
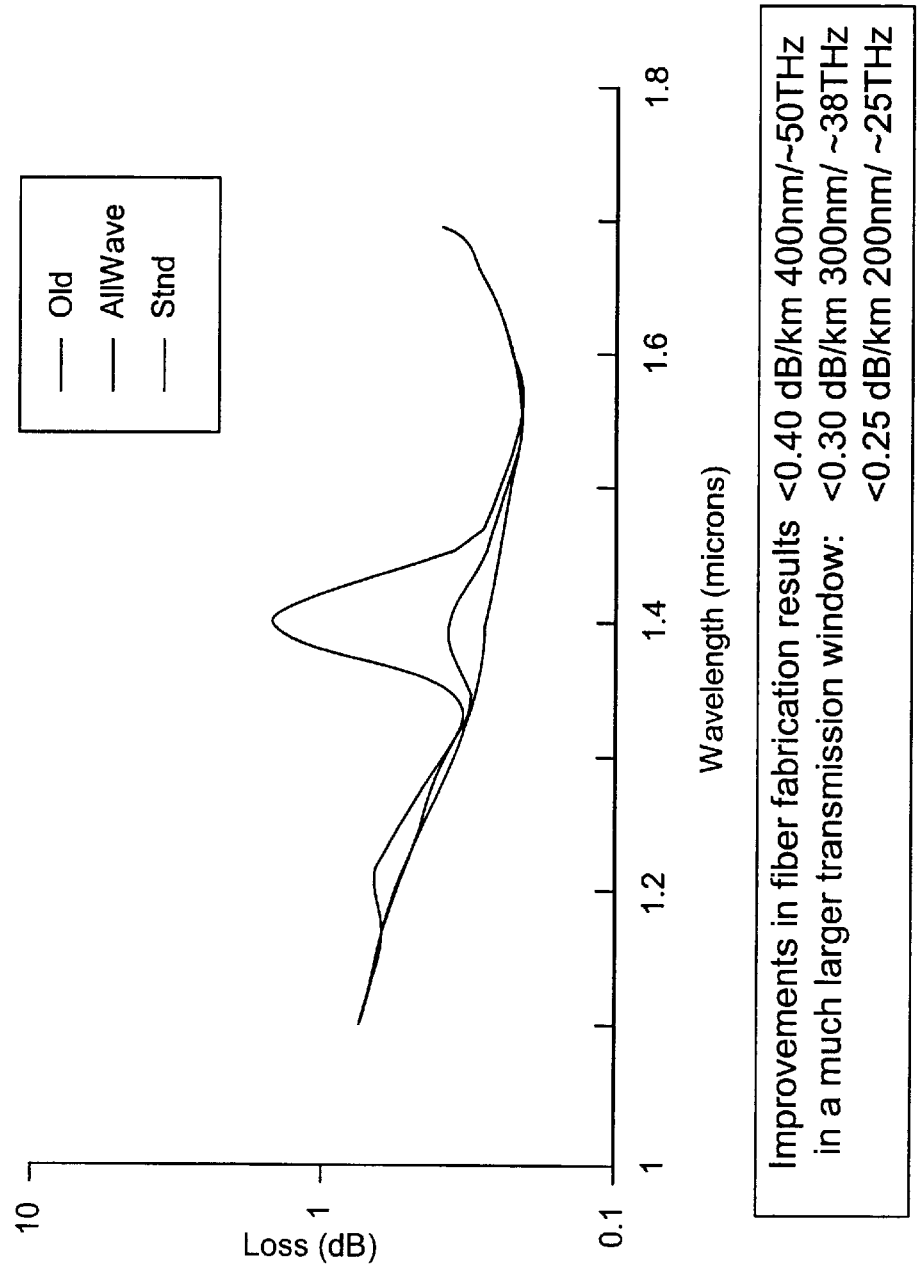
FIG. 5 is a graph illustrating the loss versus wavelength for different types of optical fibers useful in some embodiments.

The pump Raman order can be arranged to be counter-propagating to the signal direction, and alternate previous Raman orders can be arranged to be counter-propagating to each of the subsequent Raman orders (i.e., consecutive Raman orders alternate in direction)—FIG. 3d. This alternating pumping scheme can give a more uniform profile for the gain. In one embodiment, the Raman pumps can be placed at amplifier spacings of 40–45 km, corresponding to one possible hut spacing in telecommunication systems (FIG. 4). Since the pump attenuation can range from 0.3–0.4 dB/km (c.f. FIG. 5), in some embodiments the pump effectiveness in providing Raman gain can be restricted to a few $L_{eff}$ lengths, or about 10–20 km.

Another embodiment is a low noise distributed Raman amplifier with bi-directional pumping. Another embodiment is a low noise hybrid Raman amplifier with bi-directional pumping. The 40–45 km spacing can keep the DRA effective all the way through the transmission line. The amplification scheme can either be a pure DRA or a hybrid scheme comprising a discrete and distributed amplifier. The pump Raman order light propagates upstream toward the signal source, while the intermediate Raman order propagates downstream in the direction of the signal. In one example, the hybrid amplifier could be an erbium-doped fiber amplifier (EDFA) that operates around 1550 nm combined with a DRA. A pump Raman order ($n^{th}$ order) is introduced counter-propagating around a wavelength of 1450 nm, while the intermediate Raman order (n−1 order) is inserted co-propagating around a wavelength of 1365 nm. Also listed in FIG. 4 are other previous order Raman wavelengths, which can be used to extend the scheme to more than two pump orders in other embodiments.

Figure 6:
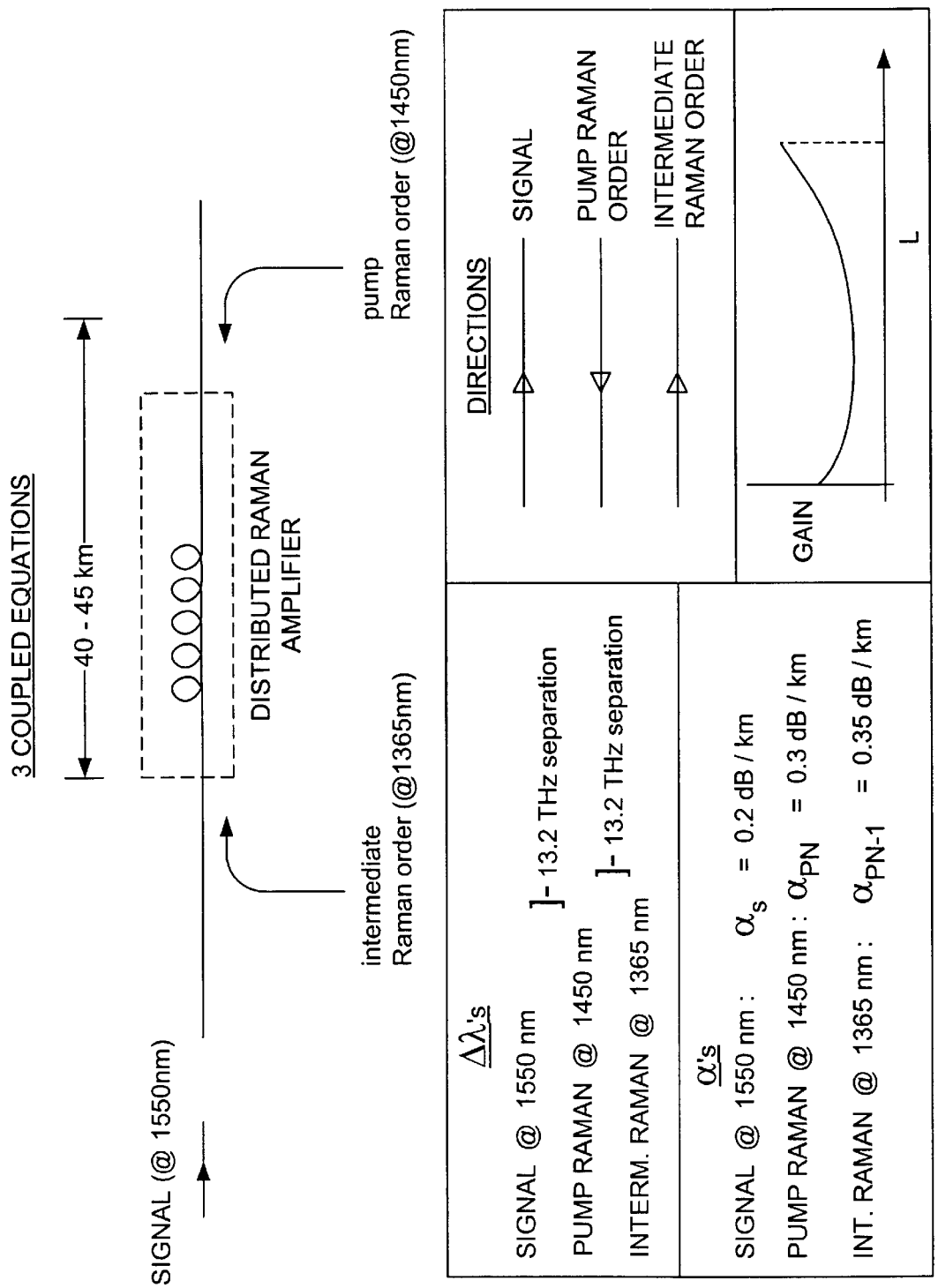
FIG. 6 is a table of calculation parameters to illustrate the improvement in noise figure of some embodiments.

The improvement in NF for this 1550 nm signal wavelength from using the multi-Raman order pumping scheme in some embodiments can be estimated using some simple calculations. Losses for different wavelengths can be assumed to be: at 1550 nm~0.2 dB/km, at 1450 nm~0.3 dB/km, and at 1365 nm~0.35 dB/km (see FIG. 5). The details of the calculated case are provided in FIG. 6.

Figure 7:
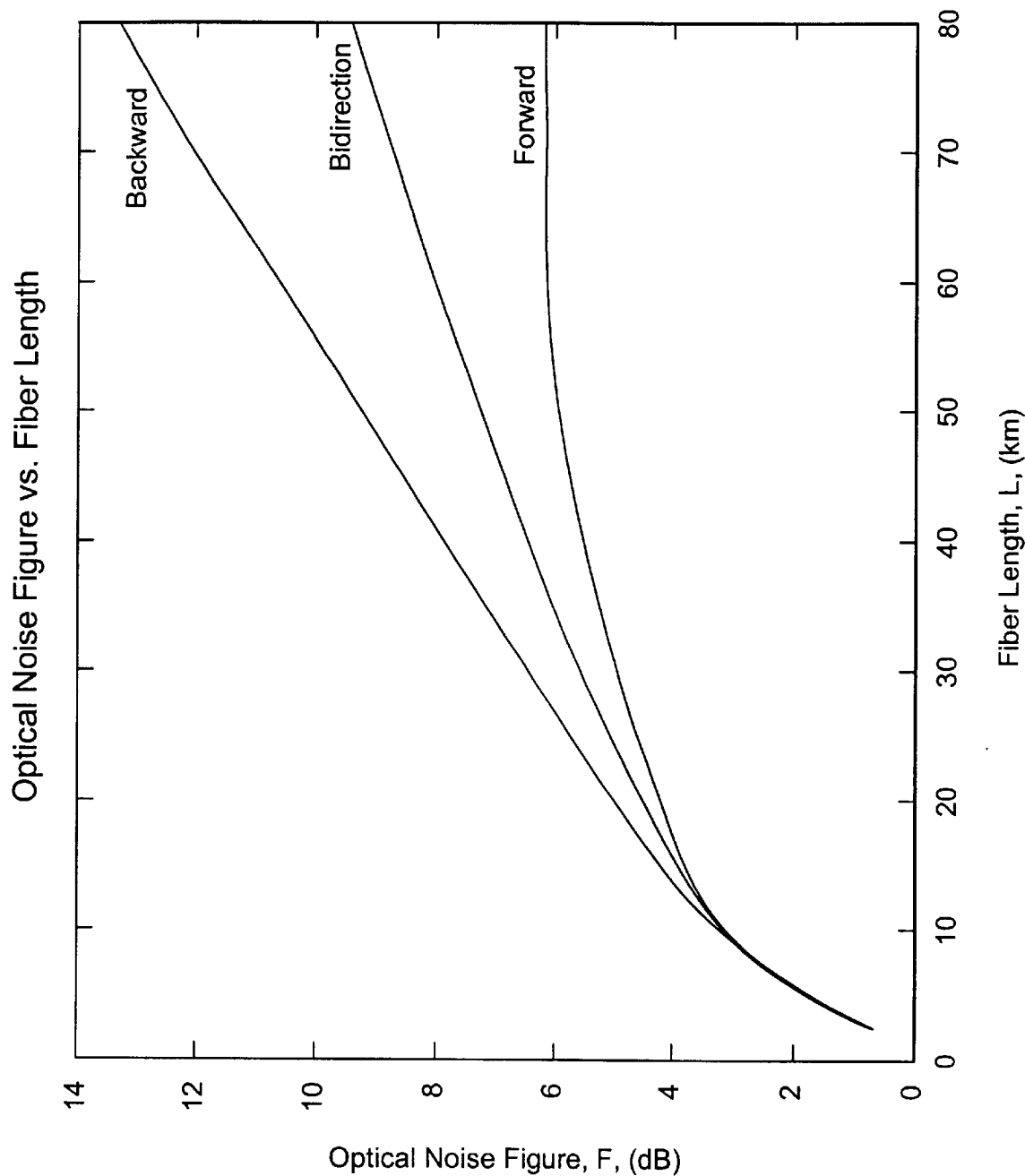
FIG. 7 is a graph illustrating the optical noise figure versus spacing between optical amplifiers for forward, backward and bi-directional pumping of some embodiments of Raman amplifiers.

The computed noise figure is shown in FIG. 7, and a tabulation of the noise figure for different embodiments' pump configurations versus length is included in FIG. 8. The backward pump case refers to using a single pump that decays toward the input, and this case can have the worse noise figure. It can be used with the counter-propagating pump reducing noise coupling between the signal and pump. The forward pump has theoretically the best noise figure. The bi-directional pumping using two cascaded Raman orders is also shown in FIG. 7, and it has an optical noise figure between the two limiting cases of forward and backward pumps. At 40 km amplifier spacing, the bi-directional pumping gives more than 1 dB improvement in noise figure over the backward pumped case. At 80 km amplifier spacing, the bi-directional pumping gives ~4 dB improvement in noise figure over the backward pumped case.

Figure 9A:
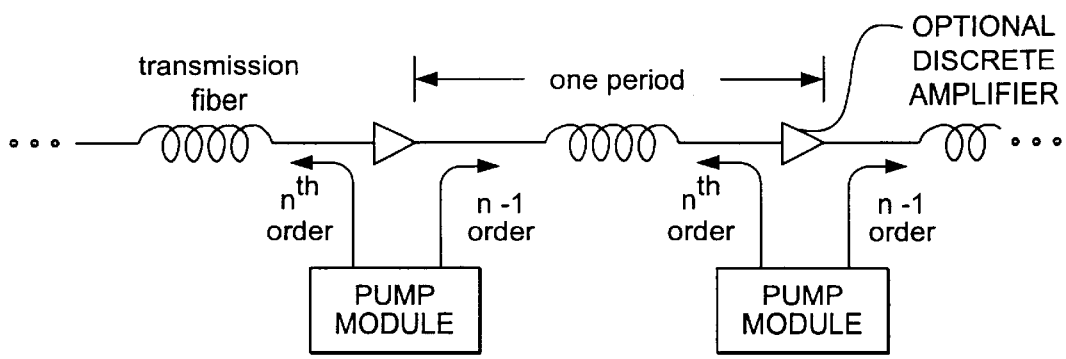
FIG. 9(a) is a schematic diagram of one embodiment of a transmission line that is periodic and has at least two pump modules per period.
Figure 9B:
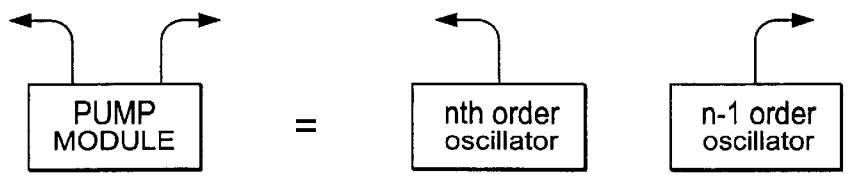
FIGS. 9(b)–9(c) illustrate embodiments of different pump modules, which can optionally be used with the transmission line of FIG. 9(a).

In another embodiment, a bi-directional Raman amplifier is provided with pump modules that can be multi-wavelength Raman oscillators, single wavelength Raman oscillators, laser diode pumps and combinations thereof. The low-noise DRA or hybrid amplifier can be pumped by either separate pumps or by dual-wavelength Raman oscillators (FIGS. 9(a) and 9(b)). The dual-wavelength Raman oscillator can be of the design of a periodic transmission filter, with output couplers used along two arms of the cavity in the $n^{th}$ and n−1 Raman orders (FIG. 9(c)). In another embodiment, the $n^{th}$ and n−1 Raman order pumps can be laser diodes at the appropriate Raman wavelengths, where subsequent orders can be separated by approximately 13.2 THz (FIG. 9(d)). Sufficient laser diode power from a number of laser diodes can combine and accumulate. The $n^{th}$ order pump can be combined with the pump for the discrete amplifier in a hybrid amplifier scheme (FIG. 9(e)). For example, a pump between 1450–1480 nm can pump both a discrete EDFA as well as the DRA in the $n^{th}$ order.

Figure 9C:
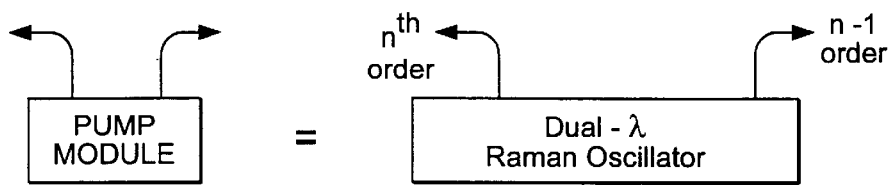
Figure 9D:
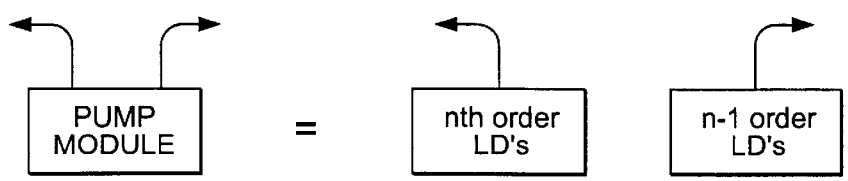
FIG. 9(d) is a schematic diagram of an embodiment of a transmission line with a hybrid amplifier with pumping that goes through a discrete amplifier.
Figure 9E:
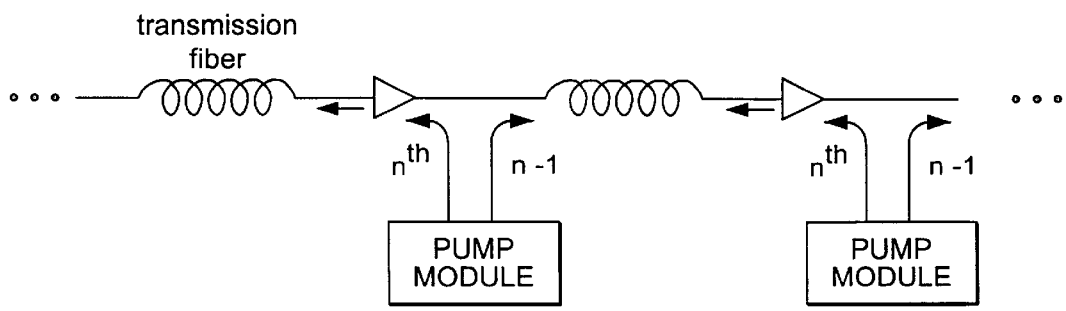
Figure 10:
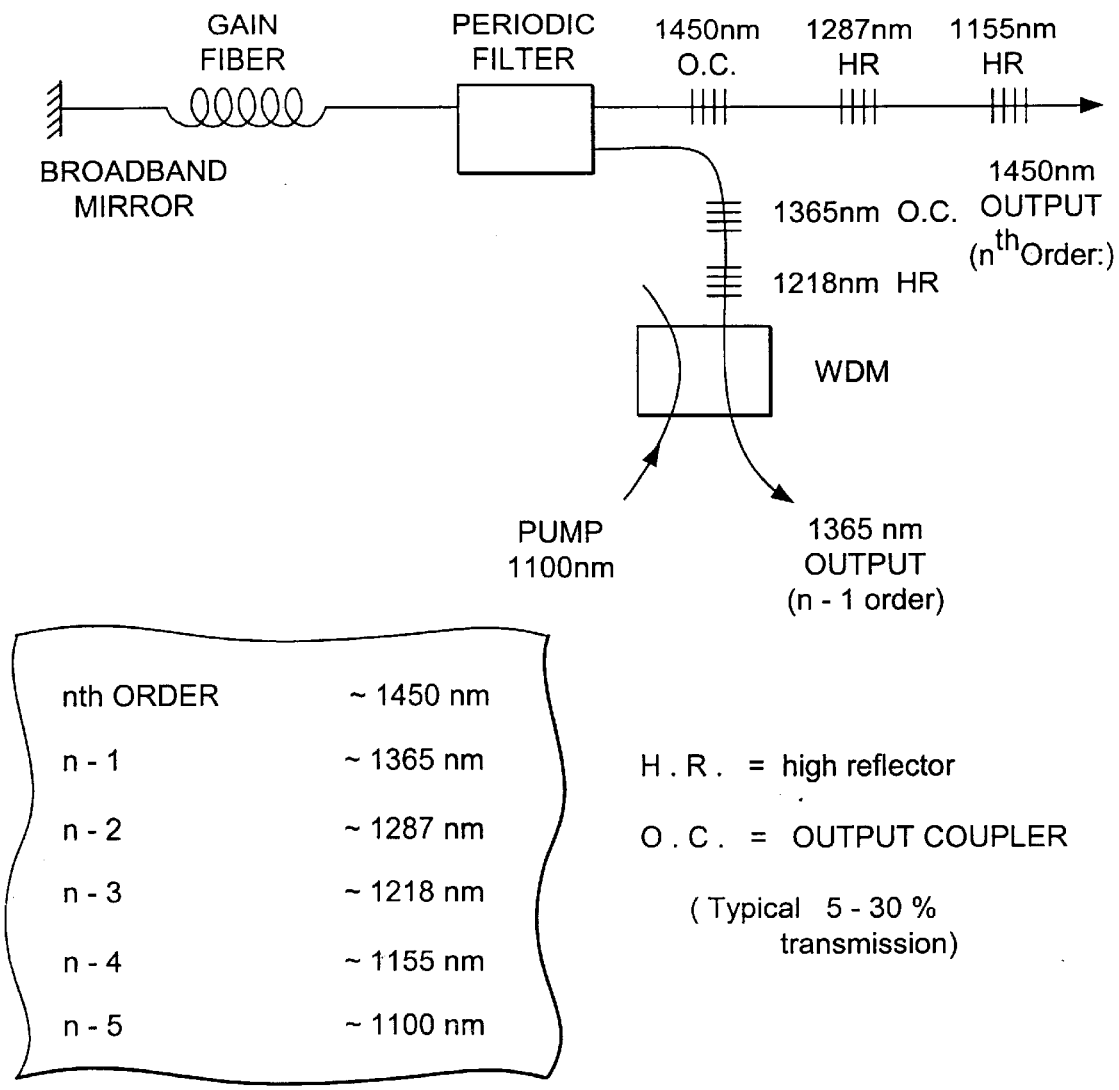
FIG. 10 is a schematic diagram of one embodiment of a dual wavelength Raman oscillator of the present invention pumped at 1100 nm.
Figure 10:
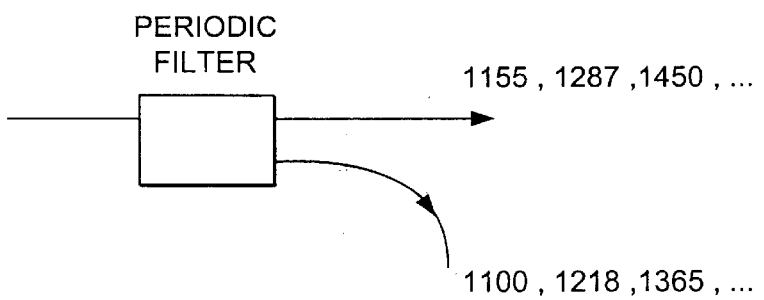

An exemplary dual-wavelength Raman oscillator of FIG. 9(c) is illustrated in more detail in FIG. 10. This embodiment of a Raman oscillator is of a periodic filter design. A dual-wavelength Raman oscillator is shown for a signal band around 1550 nm. The two output wavelengths desired can be around 1450 nm and 1365 nm. A broadband mirror (i.e, either dielectric coating or a Sagnac loop mirror) and a gain fiber can form one end of the cavity. A periodic filter can separate the paths for alternate Raman orders. Narrowband reflectors such as fiber gratings can form the cavities for each of the intermediate Raman orders. For the two output Raman wavelengths desired, output couplers can be used that can have a transmission between 5 to 30 percent. In embodiment of a cavity design the two desired Raman orders can be automatically separated. The periodic filter can help to reduce losses and any heating effects that may exist in the gratings.

The multiple Raman order pumping scheme can be used to enhance the combination of power from different LD's.

Figure 11:
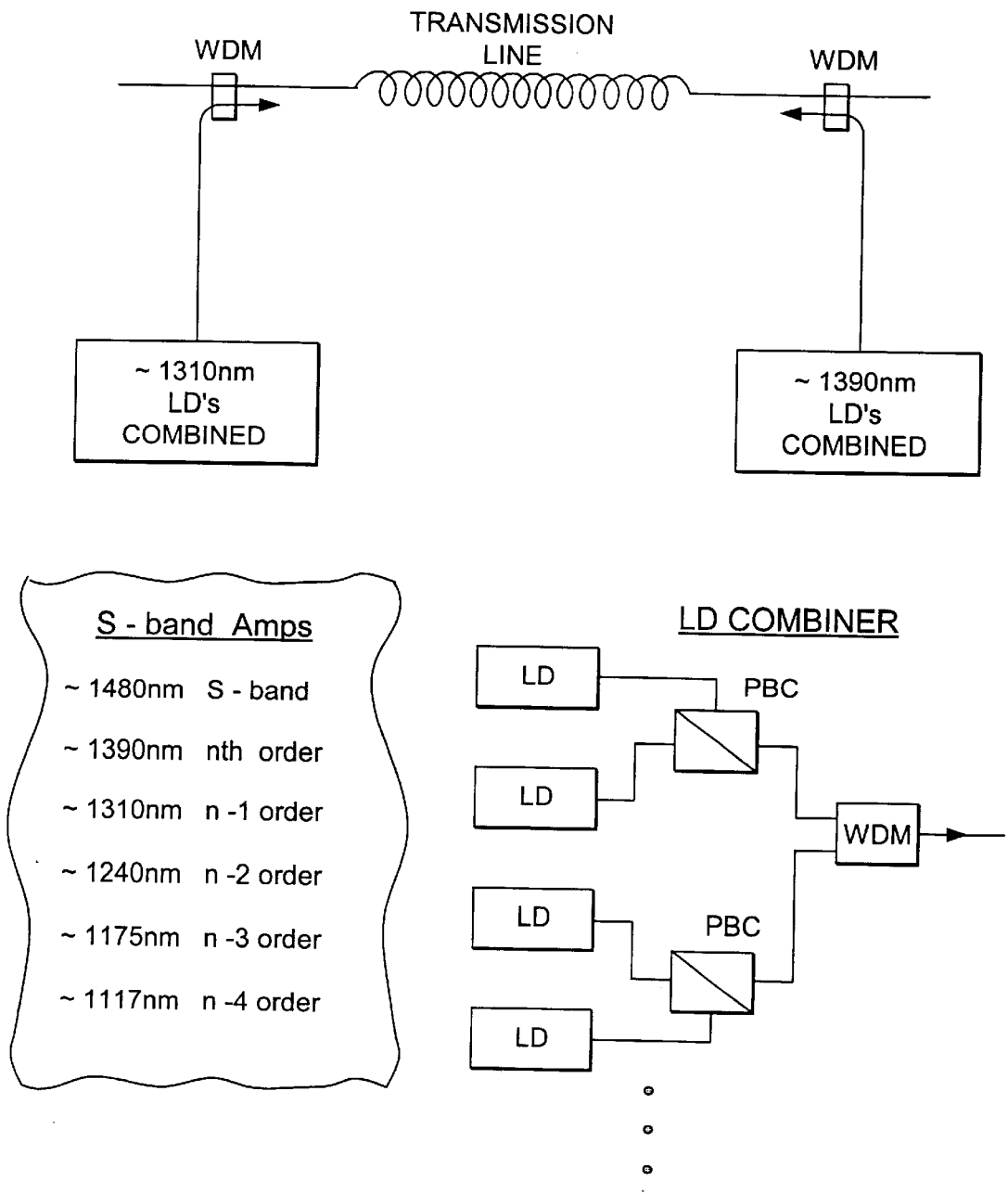
FIG. 11 is a schematic diagram illustrating an embodiment of a laser diode pumping of an S band distributed Raman amplifier.

As an example, FIG. 11 shows how a short-wavelength band (S-band) amplifier at approximately 1480 nm can be made with laser diodes at convenient wavelengths. Since the zero dispersion wavelength for standard single-mode fibers can be around 1310 nm, LD technology for 1310 nm semiconductor lasers can be fairly mature. Efforts have been made to make LD's around 1400 nm. The LD's for 1310 nm can be made from InGaAs ternary compound semiconductors, while the LD's for 1310 nm or 1400 nm can be made from InGaAsP quaternary compound semiconductors. For an S-band amplifier centered around 1480 nm, the two required pump orders can be around 1390 nm for the $n^{th}$ order and around 1310 nm for the n−1 order. Different LD's can be combined in each pump module with a combination of polarization multiplexing and wavelength division multiplexing, as shown in FIG. 11. Although the power per LD may be limited, by combining several LD's and by using the two Raman orders to transfer power to the signal, adequate power levels can be reached for Raman amplification (i.e., above 400 mW) in some embodiments.

Figure 12A:
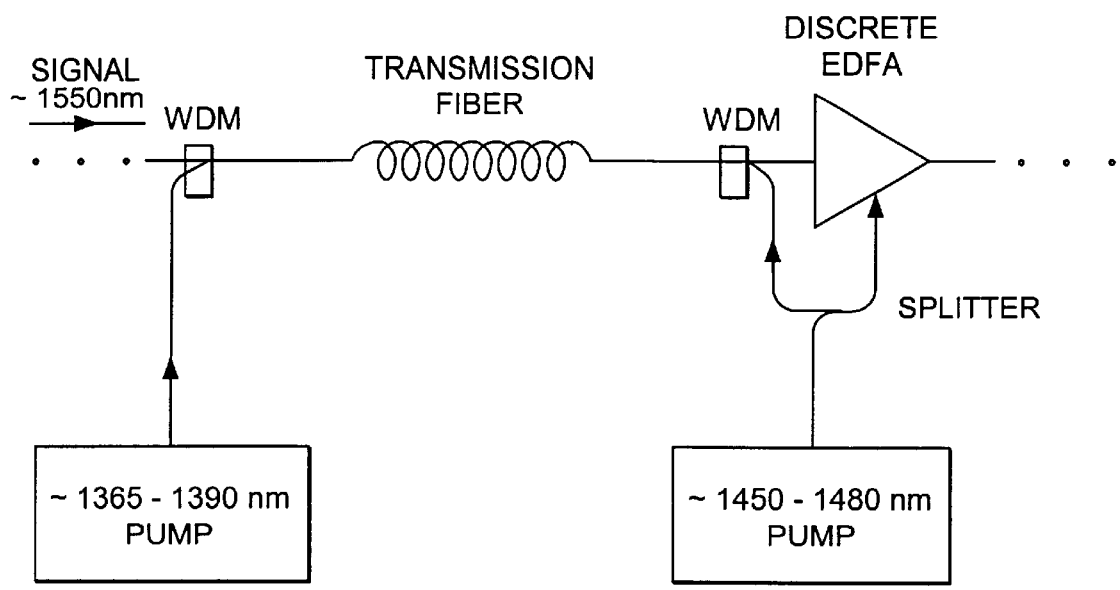
FIG. 12(a) is a schematic diagram of one embodiment illustrating a pumping scheme of a hybrid amplifier with a signal near 1550 nm.
Figure 12B:
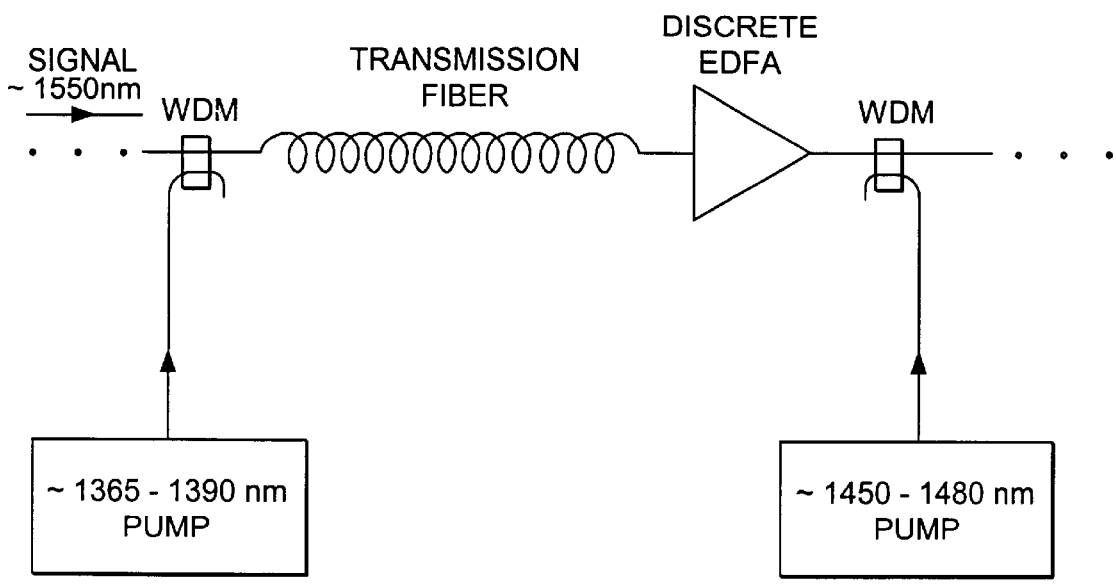
FIG. 12(b) is a schematic diagram of one embodiment illustrating hybrid amplifier pumping through a discrete amplifier with a signal near 1550 nm.

In one embodiment of a hybrid amplification scheme, the pumping configuration can be simplified by using a common pump for the discrete and distributed amplifier. The pump Raman order ($n^{th}$ order) can be used to pump a discrete Raman amplifier or a discrete amplifier such as an EDFA. For example, a pump between 1450–1480 nm can be used to pump both a discrete EDFA as well as the DRA in the $n^{th}$ order. (FIG. 12). The pump band for EDFA's can peak around 1480 nm, and absorption can exist down to below 1450 nm. An $n^{th}$ order Raman pump in the wavelength range of ~1450 to ~1480 nm can be used both as a discrete EDFA pump as well as the backward pump for a DRA. The corresponding n−1 order forward Raman pump can be in the wavelength range of ~1365 to ~1390 nm. The $n^{th}$ order pump can be split and sent separately to the DRA and EDFA (FIG. 12(a)). The DRA can be pumped with the remaining power after the EDFA (FIG. 12(b)). FIG. 9 shows an embodiment where the pump lasers can be combined LD's or single or dual-wavelength Raman oscillators.

Figure 13:
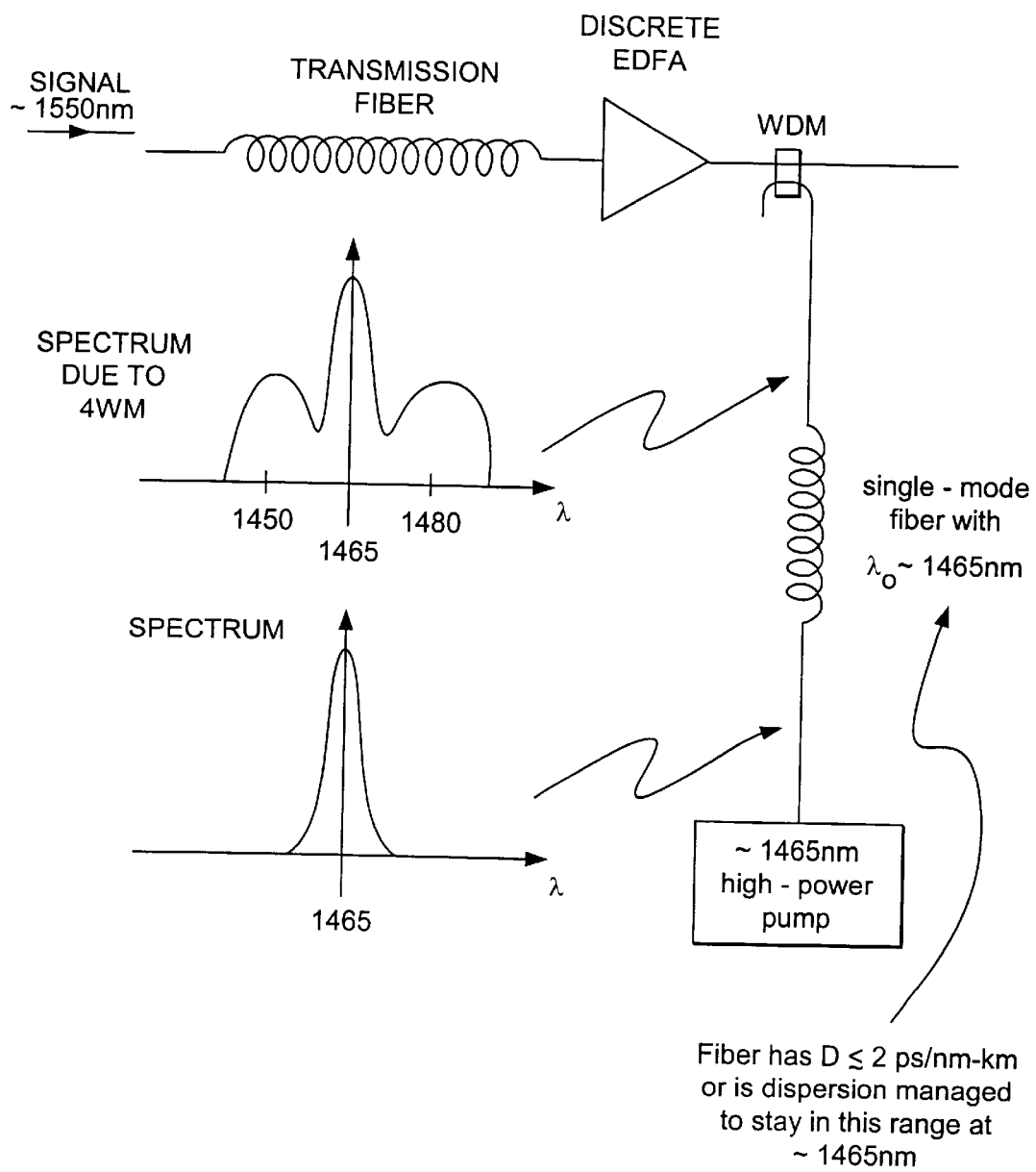
FIG. 13 is a schematic diagram of an embodiment with broadening of the pump wavelength spectrum used in a hybrid amplifier.

Another embodiment pumps the hybrid amplifier by broadening the nth order pump wavelength using nonlinearities in fibers. For propagation near the zero dispersion wavelength of a fiber, the pump beam can experience spectral broadening due to a phenomena known as four-wave mixing (4WM) or parametric amplification (PA). Sending a high-powered $n^{th}$ order pump through a fiber with appropriately selected zero dispersion wavelength can lead to a broader pumping band that can pump both discrete and distributed amplifiers. FIG. 13 illustrates an embodiment of a pumping scheme for the signal band around 1550 nm, such as in FIG. 12. For instance, a high-powered pump can be selected around 1465 nm. With a fiber having a zero dispersion wavelength around 1465 nm, the pump spectrum can be broadened to cover the range of at least 1450 to 1480 nm. The pump lead fiber should have the group velocity dispersion less than or equal to about 2 ps/nm/km. The fiber can be dispersion managed (i.e., combine different dispersion fibers to cancel out some of the dispersion) to achieve this dispersion around 1465 nm. In one embodiment, if the discrete amplifier is an EDFA, it can absorb wavelengths closer to 1480 nm. In one embodiment, the DRA can pump wavelengths around 1450 nm for a signal band around 1550 nm. A spectrally broadened pump can effectively pump both the discrete EDFA and the DRA.

In another embodiment, a low noise discrete Raman amplifier can have bi-directional pumping. Advantages mentioned above can benefit discrete amplifiers. In the discrete amplifier, a gain fiber can be inserted into the transmission line rather than using the transmission fiber as a gain medium. Discrete amplifiers can be in single or multiple stages. The NF improvement again arises from boosting the pump at the entry point of the amplifier. In one embodiment, a counter-propagating geometry can minimize the pump-to-signal coupling of fluctuations. Pump lasers both at the pump Raman order as well as the intermediate Raman order can combine more laser diode powers.

Figure 14:
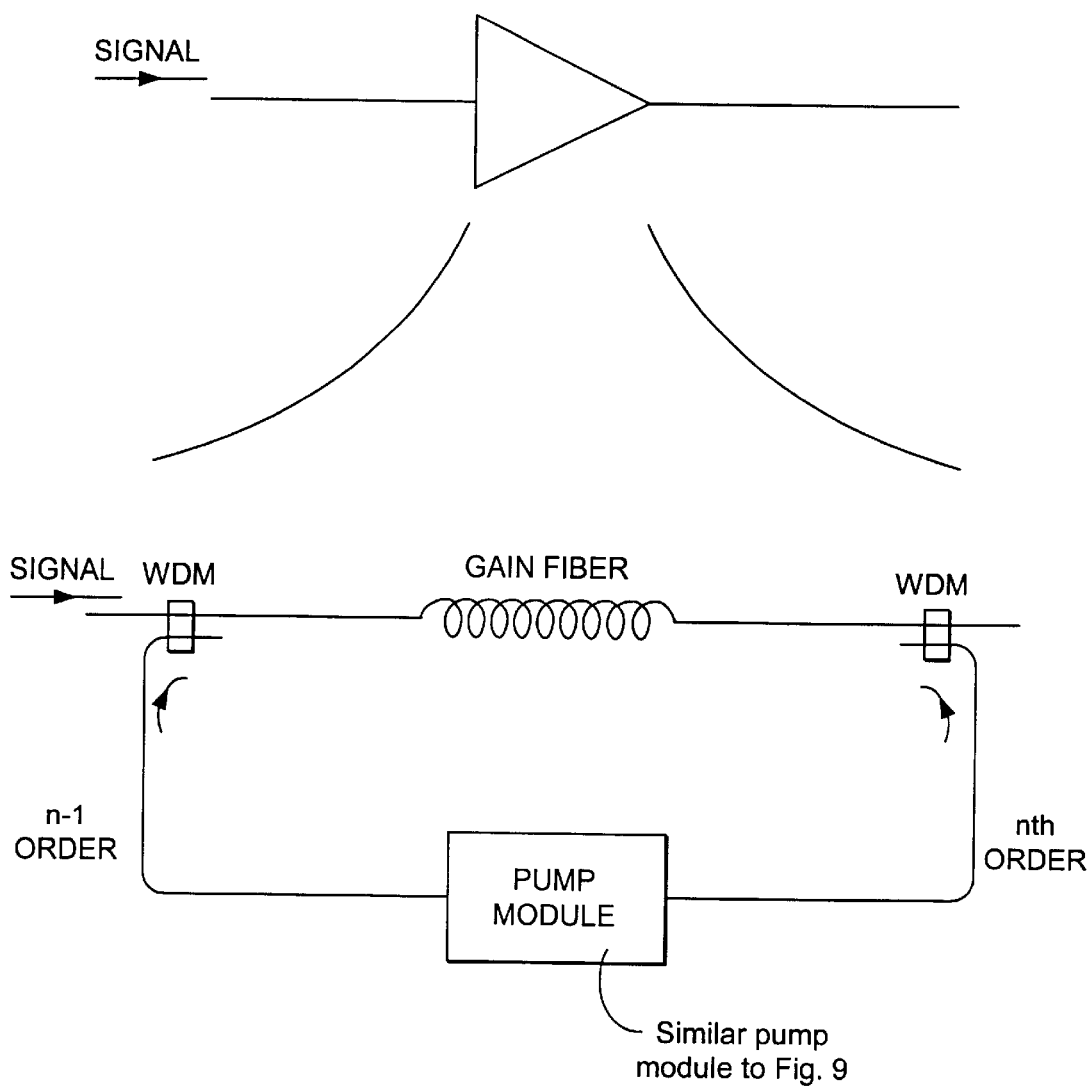
FIG. 14 is a schematic diagram illustrating an embodiment with a low noise discrete single stage Raman amplifier.

One embodiment of a single-stage discrete Raman amplifier using the multi-order pumping scheme is illustrated in FIG. 14. The discrete amplifier comprises a gain fiber surrounded by two WDM's for inserting the pumps. In some embodiments, one or two isolators surrounding the amplifier can be inserted to avoid lasing or feedback from reflections. The dual-wavelength pump module can be similar to FIG. 9, comprising different order oscillators, a dual-wavelength Raman oscillator or different LD combinations. The $n^{th}$ order pump can be made counter-propagating to the signal, while the n−1 order intermediate order can be made to be co-propagating to the signal. The n−1 order helps to boost the gain for the signal at the entry point into the gain fiber, thereby improving the NF of the amplifier.

Figure 15A:
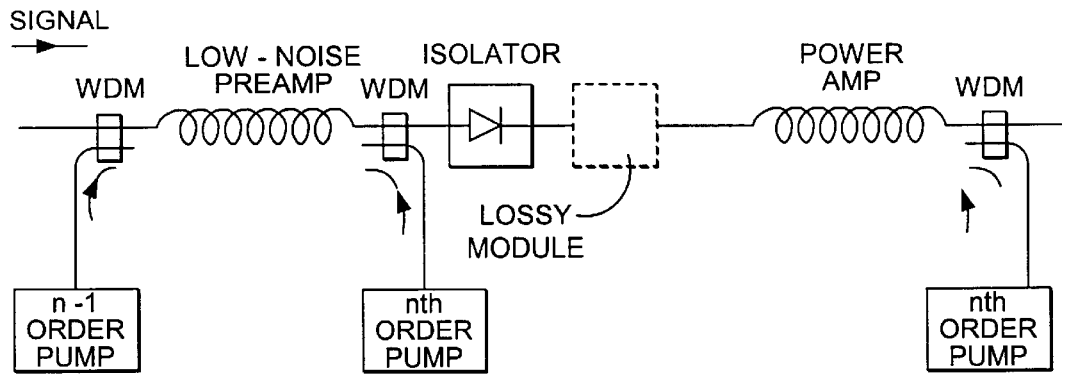
FIG. 15(a) is a schematic diagram of a dual stage Raman amplifier embodiment with improved noise performance in the first stage.
Figure 15B:
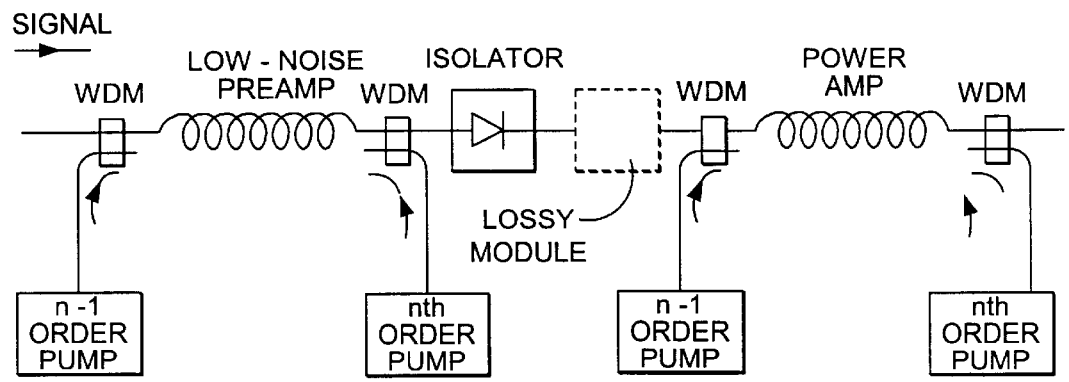
FIG. 15(b) is a schematic diagram of a dual stage Raman amplifier embodiment with improved noise performance in the first and second stages.

The multiple-Raman order pumping can be advantageous for multi-stage Raman amplifiers. For example, FIG. 15 illustrates embodiments of dual-stage Raman amplifiers, where the first stage can be a low-noise pre-amplifier while the second stage can be a power amplifier. An isolator can be placed between the two sections to minimize the effects from stray reflections as well as multi-path interference. In addition, lossy modules, such as dispersion compensation elements or optical add/drop multiplexers, may also be placed at an intermediate stage between the two gain sections. If the n−1 order pump can be used in one place, an important position in one embodiment is in the low-noise pre-amplifier, as illustrated in FIG. 15(a). Further improvements in the gain and NF can be obtained by inserting a second n−1 order pump at the entry point to the high-gain segment, as shown in the embodiment of FIG. 15(b).

Figure 16A:
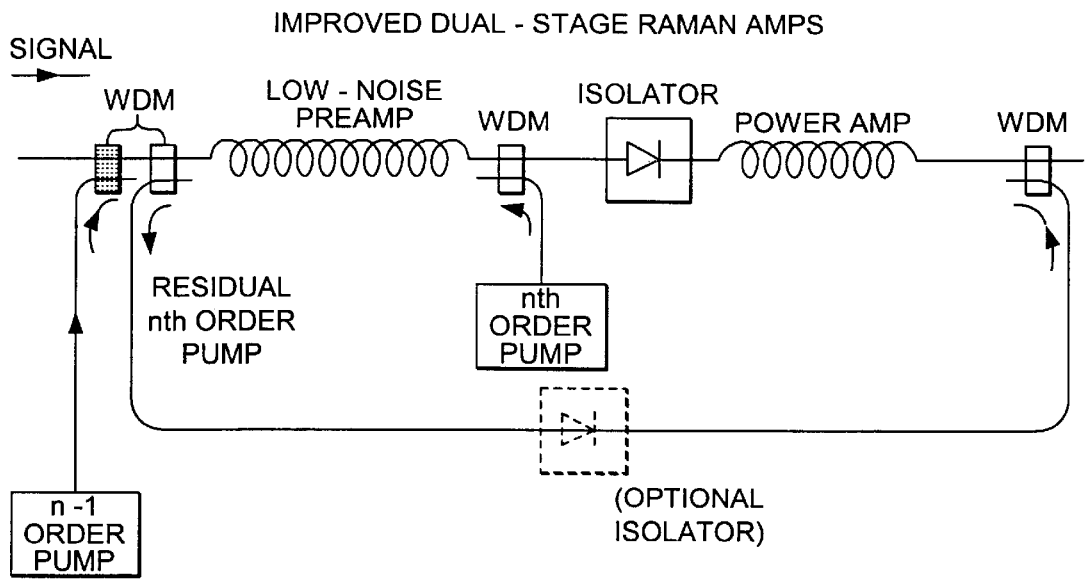
FIG. 16(a) is a schematic diagram of an embodiment with a dual stage Raman amplifier with a shunt and improved noise performance in the first stage.
Figure 16B:
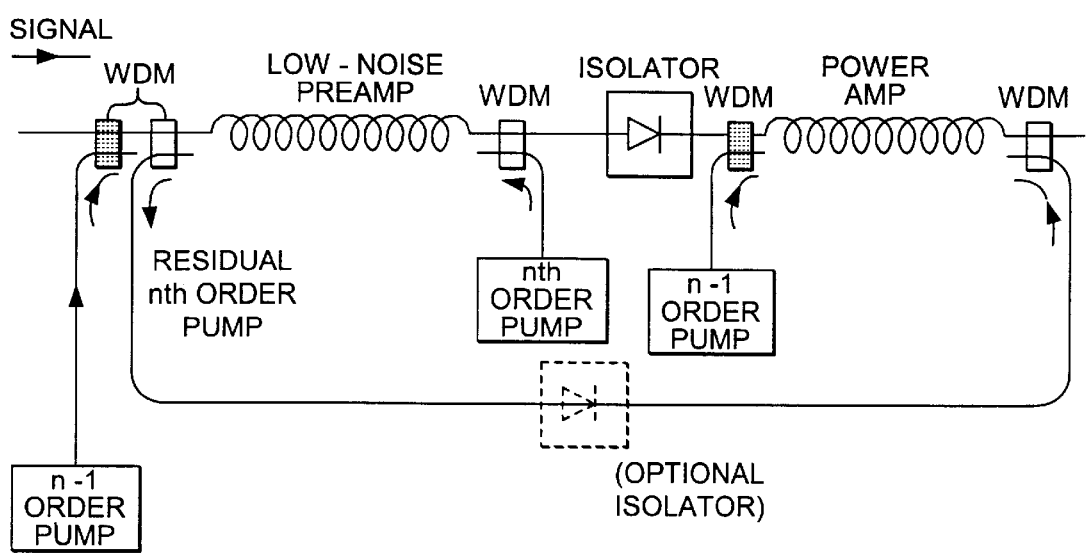
FIG. 16(b) is a schematic diagram of an embodiment with a dual stage Raman amplifier with a shunt and improved noise performance in the first and second stages.

An embodiment of a more-efficient dual-stage design is shown in FIG. 16. The first stage can be a low-noise pre-amplifier while the second stage can be a power amplifier. The $n^{th}$ order pump can be used first in the low-noise pre-amplifier, and then any residual $n^{th}$ order pump power can be fed back to the second stage and used to pump the power amplifier in a counter-propagating fashion. In one embodiment, if the n−1 order pump can be used in only one position, the coupling location is the beginning stage of the low-noise pre-amplifier (FIG. 16(a)). In another embodiment, more gain and better NF can be obtained by adding a second n−1 order pump at the beginning of the power amplifier (FIG. 16(b)). In some embodiments, isolators can be placed in the pump loop-back paths as indicated in FIG. 16 to improve the multi-path interference for the signal.

As shown in FIG. 1, the gain bandwidth of Raman amplification with a single pump can be on the order of 20 nm. To make broadband Raman amplifiers, multiple pumps at different wavelengths can be used. However, in a DRA, the nonlinear interaction between pumps can make it difficult to achieve a broadband DRA. In particular, through the Raman effect in the fiber, the longer wavelength pumps rob energy from the shorter wavelength pumps. As a consequence, longer wavelength bands receive more gain than shorter wavelength bands.

One embodiment achieves relatively flat and broadband DRA with a pump pre-emphasis technique combined with the spatial and spectral evolution of the Raman gain profile down the length of the transmission line. Given that there can be non-linear interaction between pumps, the interaction can be exploited to create a more uniform gain profile. Since DRA's can use the entire length of transmission line, the long transmission length can allow the pump power to re-distribute and provide more uniform pumping. In some embodiments the shortest wavelength pump beam should be the highest power, and then the longer wavelength pumps should be in sequentially diminishing power levels at the input to the fiber. Then, as the pumps propagate down the length of the transmission fiber, the pump power starts at the shortest wavelength and shifts along the fiber length to the longer wavelength pumps. The pump pre-emphasis magnitude can depend on details of the system, including pump power, fiber effective area, fiber length, fiber loss and Raman gain coefficient.

Figure 17:
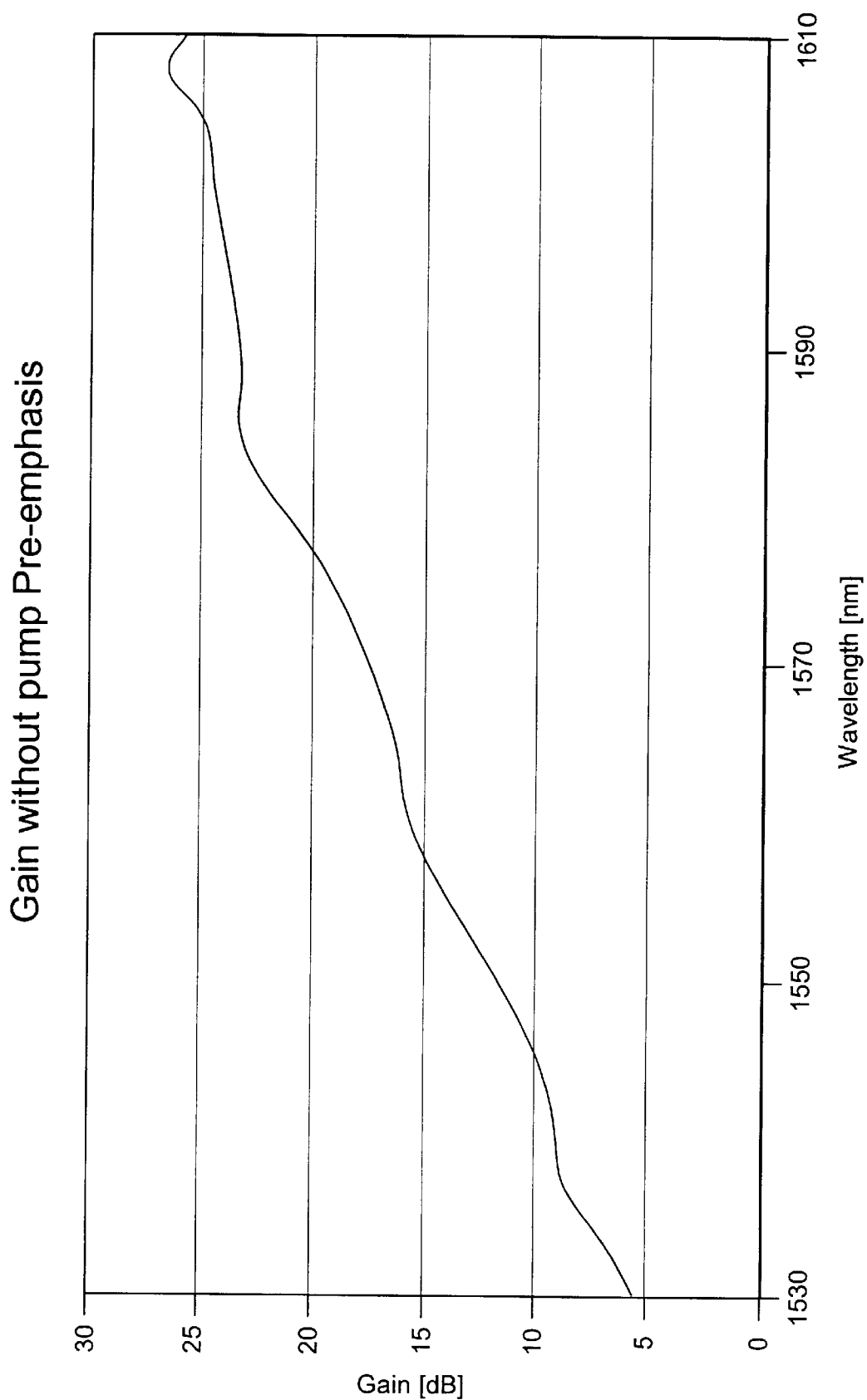
FIG. 17 is a graph of gain versus wavelength for an embodiment of a broadband Raman amplifier without pump pre-emphasis.
Figure 18:
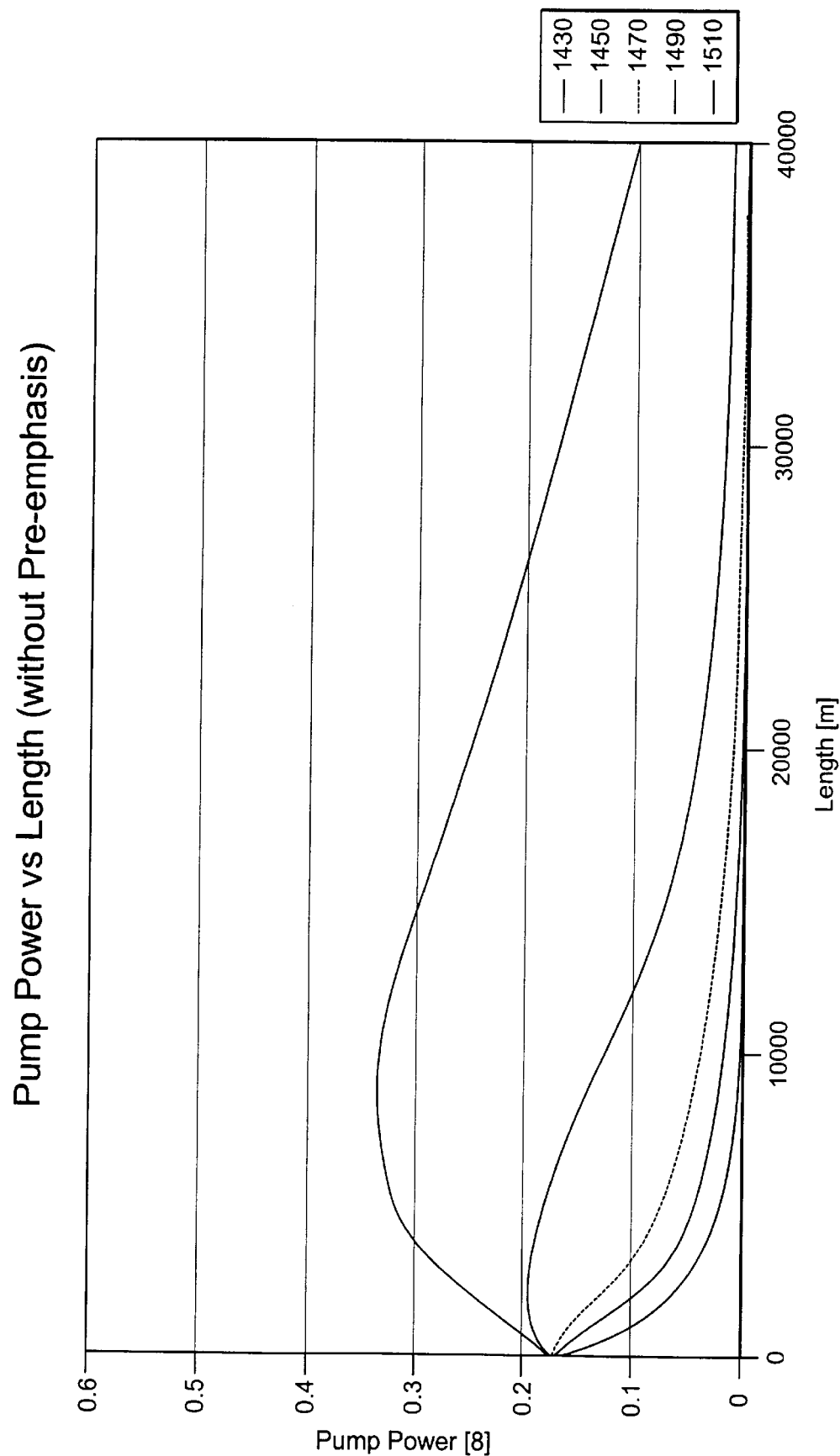
FIG. 18 is a graph of pump power versus fiber length for an embodiment of a broadband Raman amplifier without pump pre-emphasis.

A hybrid amplifier can use discrete erbium-doped fiber amplifiers combined with DRA's. The conventional (C-band) and long-wavelength (L-band) erbium-doped fiber amplifiers cover the wavelength range from about 1530 to 1610 nm. Computer simulations can study the effect of different pumping schemes. One embodiment has pump wavelengths of 1430, 1450, 1470, 1490 and 1510 nm. The net power over all of these pump bands can be 925 mW in one embodiment. The parameters for the simulations in one embodiment are:

effective area $A_{eff}$=50 $\mu m^2$ link length L=40 km loss at 1310 nm: 0.35 dB/km loss at 1380 nm: 0.3 dB/km loss at 1550 nm: 0.2 dB/km In one embodiment multiple Raman pumps can be launched at equal powers to provide DRA over the C and L bands. For example, 5 Raman pumps can be launched at equal powers of 185 mW per pump. FIG. 17 shows an example of gain when equal pump powers are launched, and FIG. 18 shows an example of the evolution of the different pumps along the transmission fiber. The gain can be highly non-uniform with a change of almost 20 dB between 1530 and 1610 nm. The pump evolution in FIG. 18 shows that the power can shift rapidly to longer wavelengths, thereby creating higher gain at the longer wavelengths.

Figure 19:
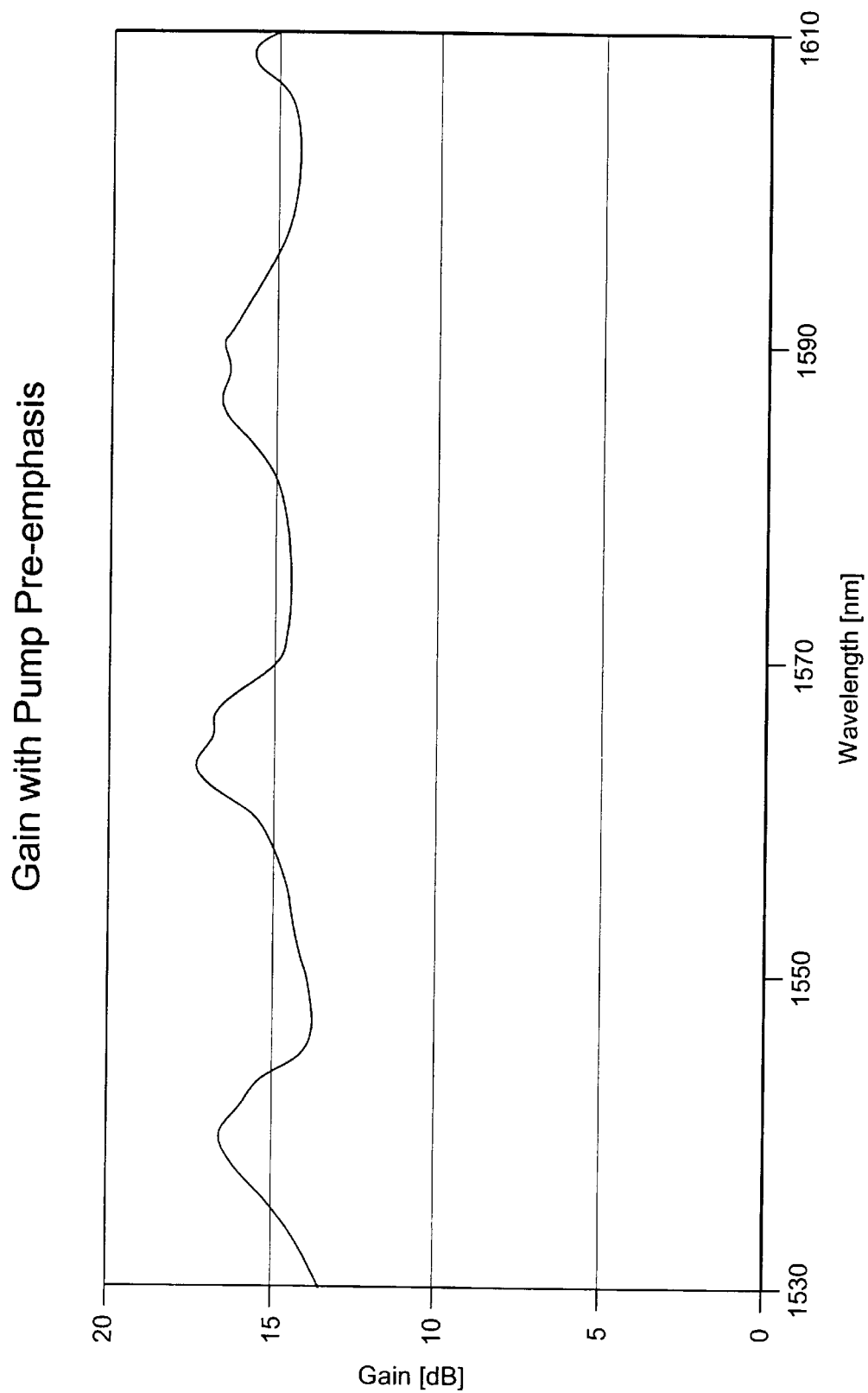
FIG. 19 is a graph of gain versus wavelength for a broadband Raman amplifier with pump pre-emphasis.
Figure 20:
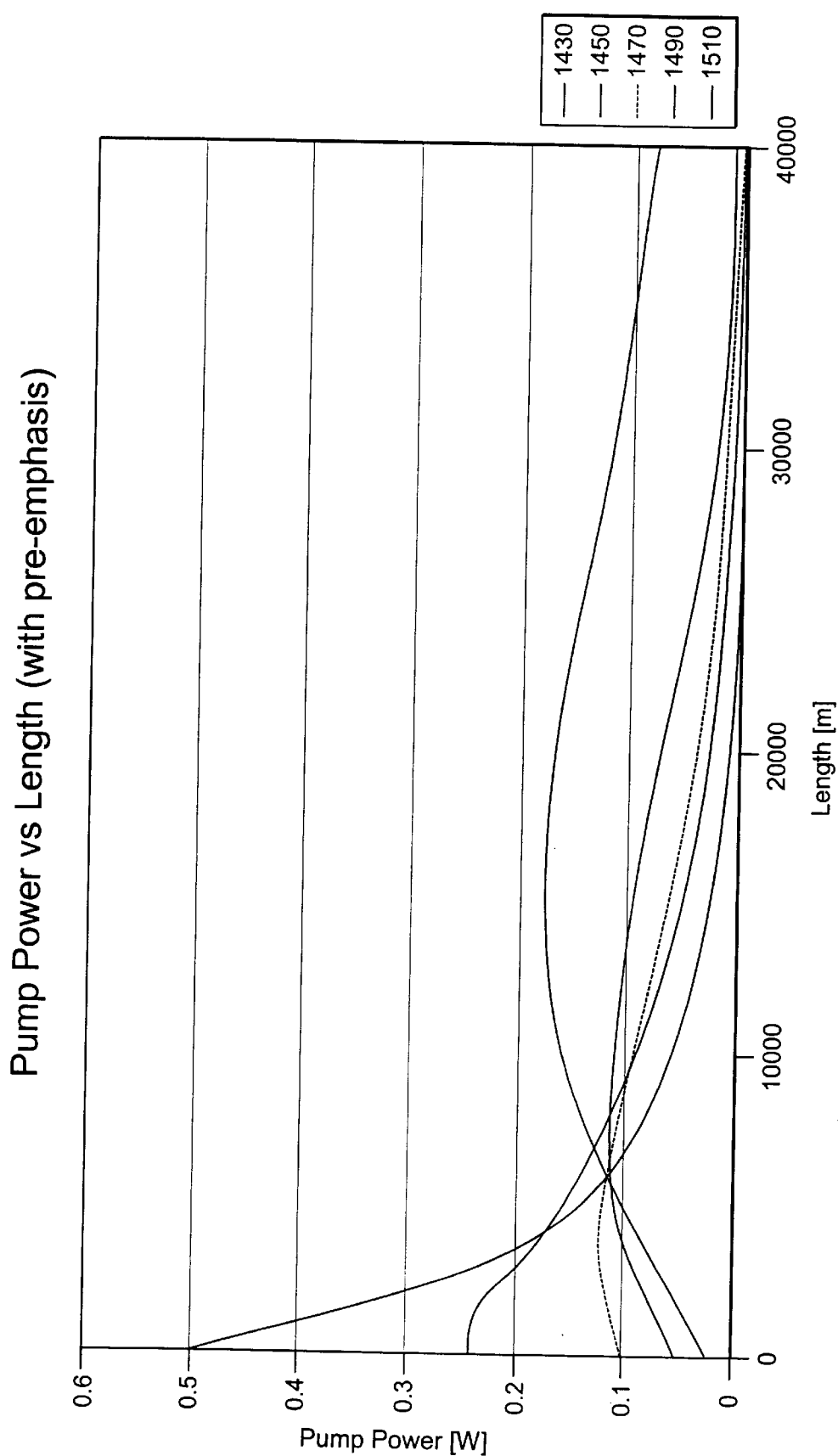
FIG. 20 is a graph of pump power versus fiber length for a broadband Raman amplifier with pump pre-emphasis.

Pump pre-emphasis can be used, and the evolution down the fiber. In one example, pump powers launched can be: 500 mW at 1430 nm, 250 mW at 1450 nm, 100 mW at 1470 nm, 50 mW at 1490 nm and 25 mW at 1510 nm (note: same net power as in above case). In this example, the pumps can be assumed to be much stronger than the signal powers, so there is no pump depletion. The resulting gain profile is shown in FIG. 19 for this example, and the gain is 15±2 dB over the entire band between 1530 and 1610 nm. Further gain flattening elements—such as Mach-Zehnder interferometer filters, long-period gratings or acousto-optic devices—can be used to further flatten the gain in other embodiments. In another embodiment, more pumps at closer wavelength spacing can be used to create a flatter gain profile. The pump evolution for the different wavelengths is shown in FIG. 20, and the peak for longer wavelength pumps is seen to occur further down the fiber during the spatial evolution.

Figure 21A:
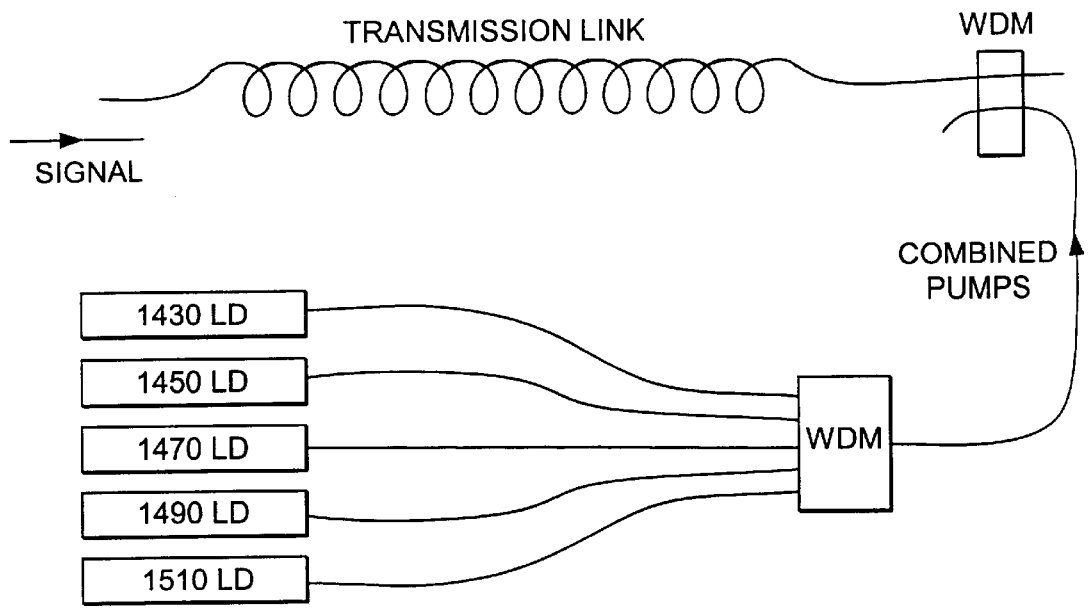
FIG. 21(a) is a schematic diagram of an embodiment with five laser diode pumping with pump pre-emphasis in Raman amplifiers.
Figure 21B:
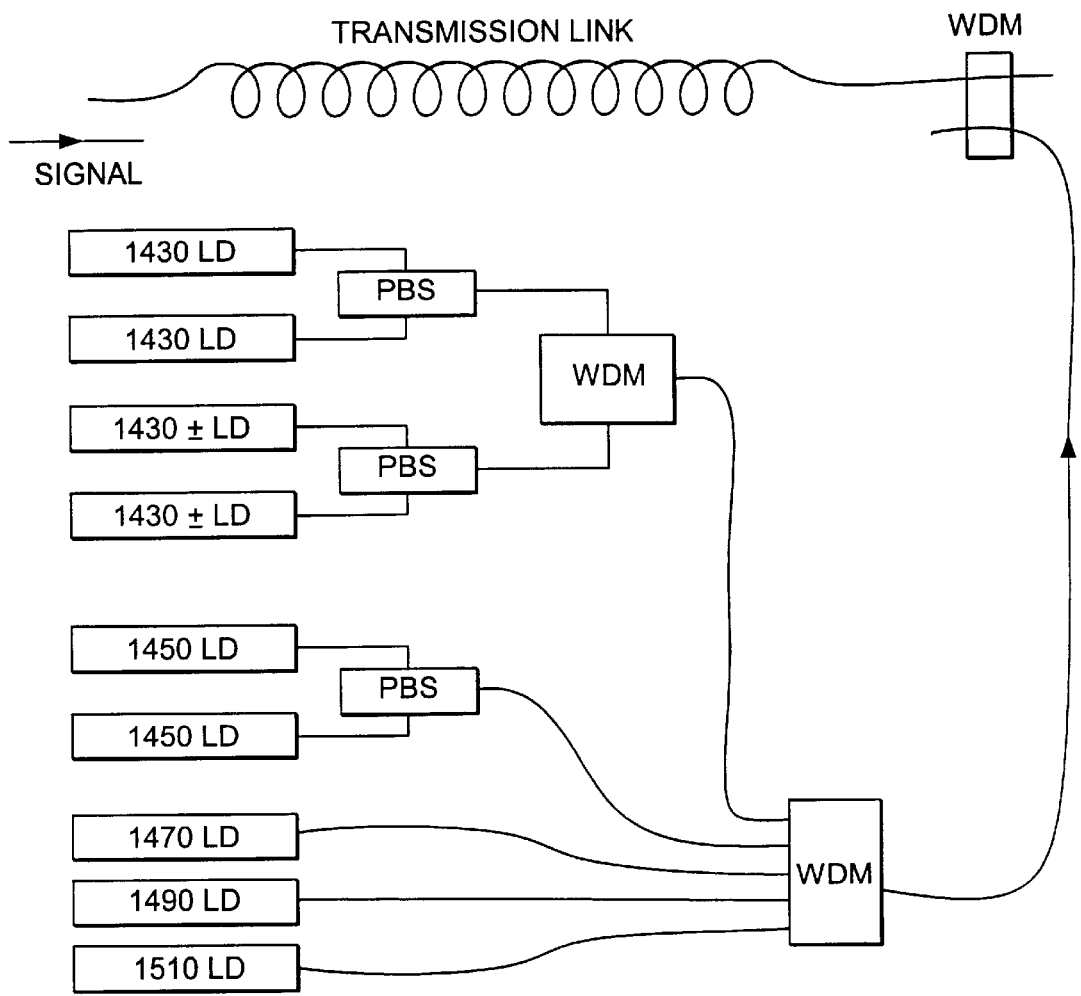
FIG. 21(b) is a schematic diagram of an embodiment with multiple laser diodes pumping with higher power for shorter wavelengths for pump pre-emphasis in Raman amplifiers.
Figure 22A:
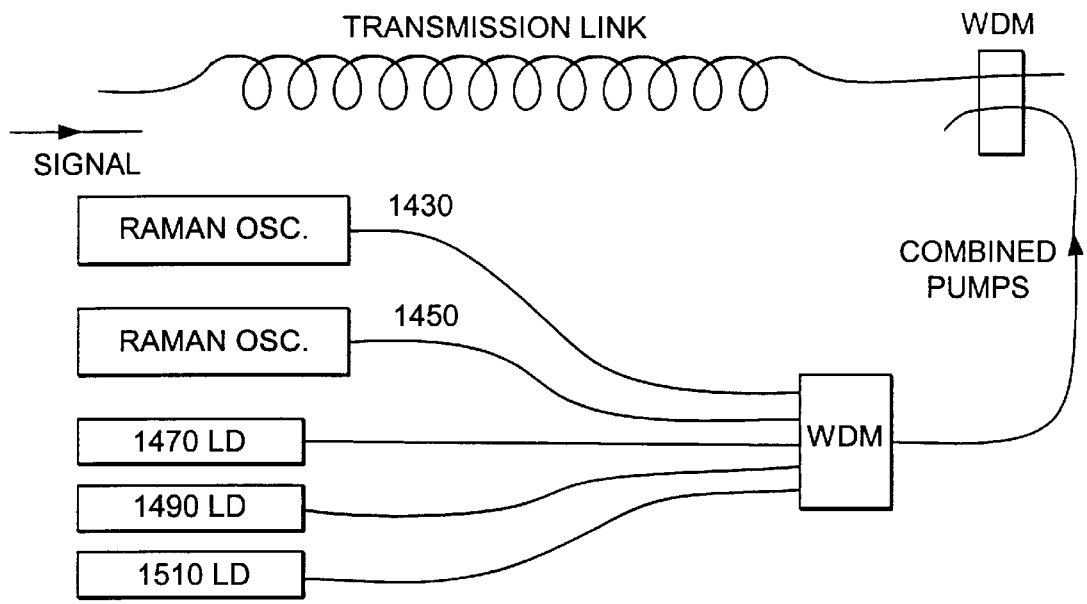
FIG. 22(a) is a schematic diagram of an embodiment with multiple laser diodes and Raman oscillators pumping with higher power for shorter wavelengths for pump pre-emphasis in Raman amplifiers.
Figure 22B:
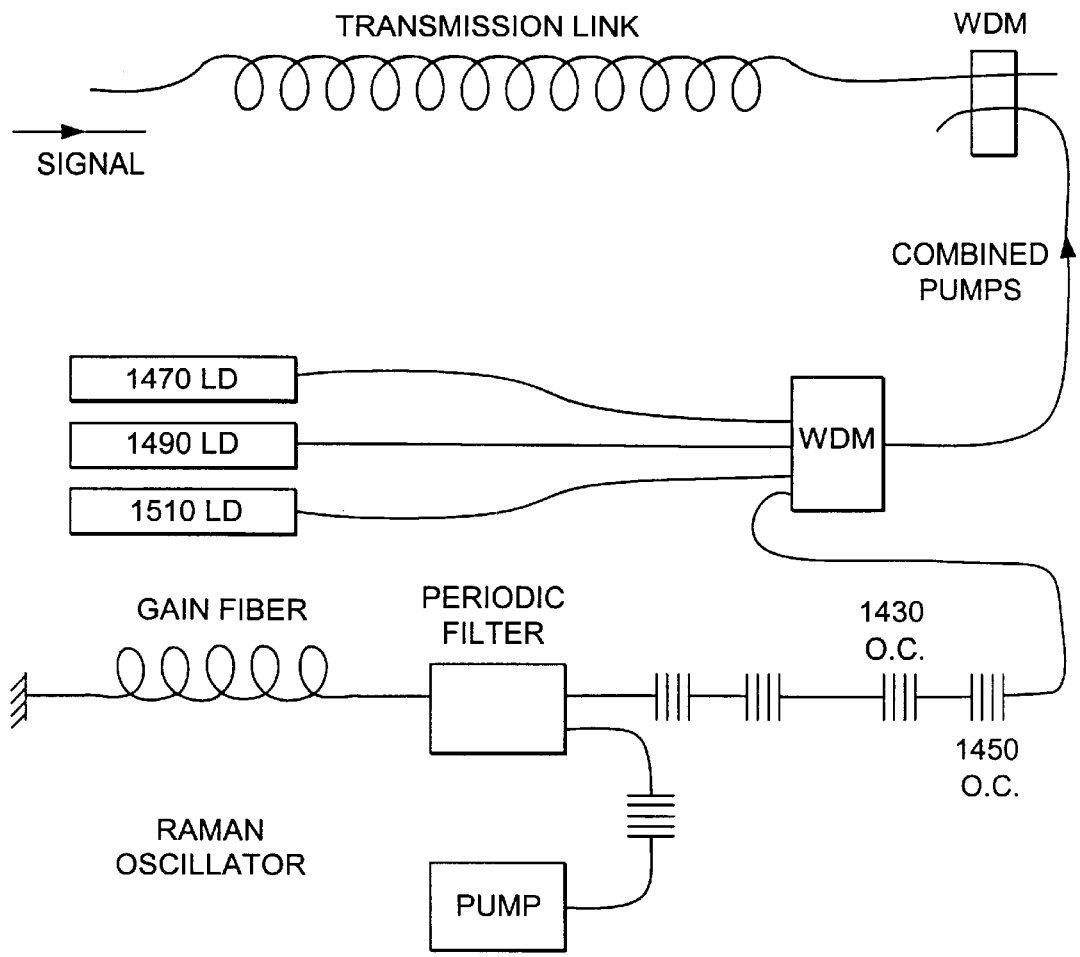
FIG. 22(b) is a schematic diagram of an embodiment with multiple laser diodes pumping in combination with dual wavelength Raman oscillators with higher power for shorter wavelengths for pump pre-emphasis in Raman amplifiers.

The Raman pump used for the broadband amplification can be various combinations of laser diodes (LD's) and Raman oscillators. FIGS. 21 and 22 show other embodiments with pumps. One exemplary pumping scheme combines different LD's at each of the pump wavelengths (FIG. 21($a$)). If sufficient LD power does not exist, for example for the shortest wavelength at the highest power, then different LD's that are polarization and/or wavelength multiplexed can be used (FIG. 21($b$)). In another embodiment, a high-powered Raman oscillator can provide the $1^{st}$ and, if necessary, $2^{nd}$ pump wavelengths, and the longer wavelength weaker pumps can be LD's (FIG. 22($a$)). One advantage of the Raman oscillators in some embodiments is that higher powers are readily available at this time. A Raman oscillator of the design of a periodic filter can be used with, for example, one or two output couplers to obtain the shortest wavelength pumps (FIG. 22($b$)).

Figure 23:
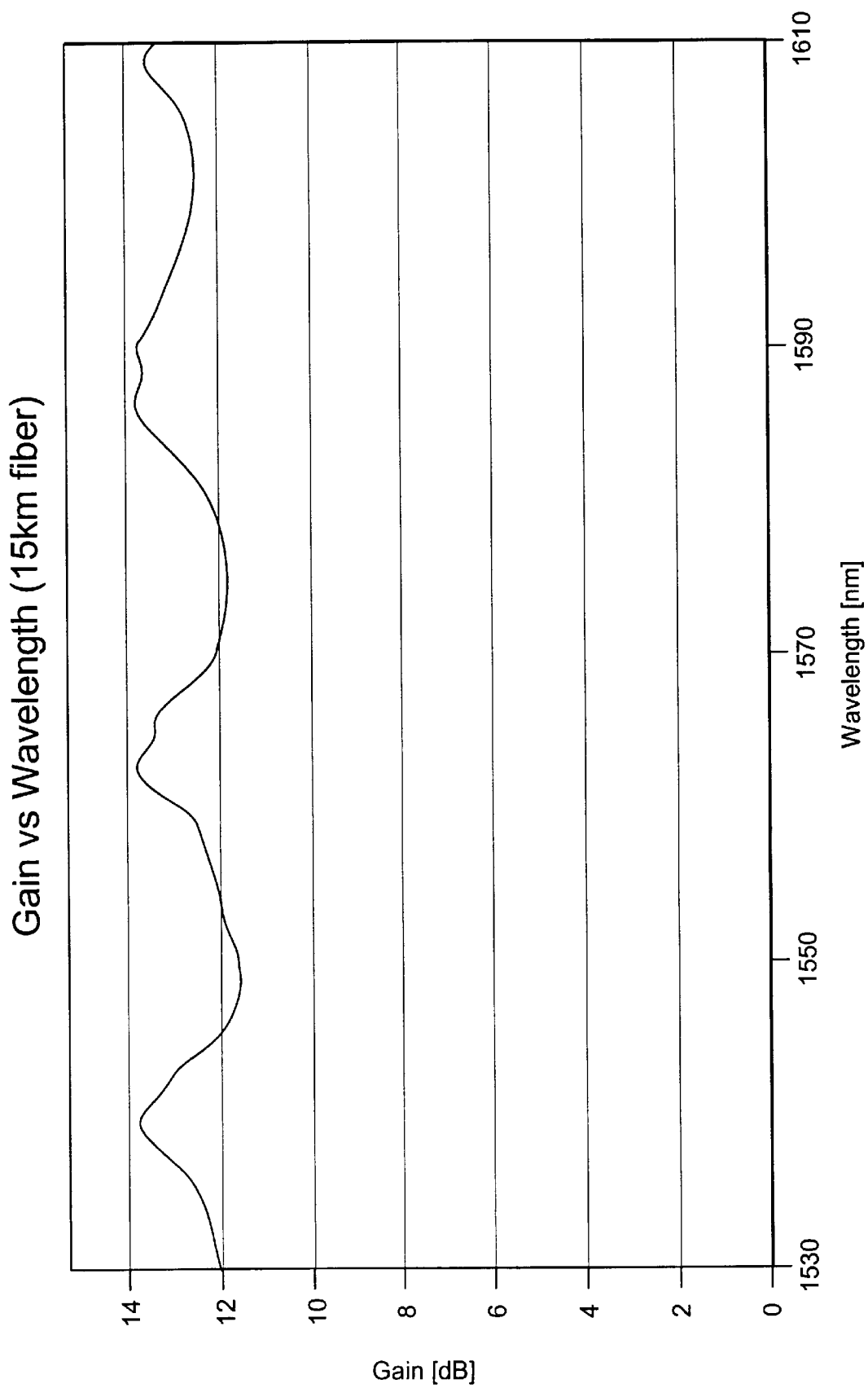
FIG. 23 is a graph of gain versus wavelength for a discrete Raman amplifier of an embodiment with pump pre-emphasis.

Pump pre-emphasis can be used in discrete Raman amplifiers. FIG. 18 or 20 show that the pump re-distribution activity can occur in fiber lengths under about 15 km in some embodiments. For discrete Raman amplifiers with lengths on the order of 8–15 km (for example, Raman amplifiers made in dispersion-shifted fiber), pump pre-emphasis techniques can be used to broaden the gain bandwidth. For instance, the gain for the DRA in FIG. 19 is recalculated for the case of a 15 km length of gain fiber and shown in FIG. 23. Although the fiber length is reduced from 40 km back to 15 km, the gain profile remains very similar. The same parameters are used as in FIG. 19, except that the power in the longest two pump wavelengths can be slightly increased. The power shift to the longest wavelengths is not complete in the 15 km. Therefore, the pump powers used for the example in FIG. 23 are: 500 mW at 1430 nm, 250 mW at 1450 mW, 100 mW at 1470 nm, 80 mW at 1490 nm (slight increase from 40 km case), and 70 mW at 1510 nm (increase from 40 km case). The resulting gain is approximately 13±1 dB over the range from 1530 to 1610 nm.

Just as in the DRA, for a discrete amplifier, the pump can be a combination of LD's and Raman oscillators. Also, the pump pre-emphasis technique can be used for both single and multi-stage amplifiers. In some embodiments, the addition of longer wavelength LD's offers a way of upgrading discrete or distributed Raman amplifiers. A high-powered Raman oscillator, such as illustrated in FIG. 10 or 22$b$, can pump the amplifier in one embodiment. In other embodiments, by the addition of the long wavelength LD's, the gain bandwidth can be increased. In other embodiments, by adjustment of the amplitude of the long wavelength LD's, the gain tilt can also be varied, for example, with a Raman oscillator pump.

Broadband Raman amplifiers with multiple pump pre-emphasis can be combined with multiple-order Raman pumping from the two sides to lower the noise figure. For broadband and low-noise case embodiments, multiple wavelength pumps can be used at the various Raman order pumps. For example, if four wavelengths are used to achieve a certain gain bandwidth in the $n^{th}$ order pump, then from the opposite side the amplifier can also be pumped by four wavelengths at the n−1 order. Because of the spatial evolution down the length of the fiber, the noise figures can be improved over the counter-propagating case, and the amount of improvement may vary for different gain bands.

Due to the high pump power requirements of Raman amplifiers, some embodiments include higher efficiency Raman amplifiers, where the efficiency can be defined as the ratio of signal output to pump input. In one embodiment, the efficiency can be improved to the point that laser diodes (LD's) can be used to directly pump the Raman amplifier. As an exemplary benchmark, for a dual stage amplifier made from dispersion-shifted fiber (DSF) with a gain of >15 dB and an electrical noise figure of <6 dB, a pump power of about 1W can be required from the Raman oscillator or pump laser. This power level can require the combined powers from about eight LD's in one embodiment. If the pump requirements could be dropped by a factor of four or so, the pump powers could be achieved with the combination of two LD's that are polarization multiplexed in another embodiment. In one embodiment, four LD's could be used to provide more than 0.5W of power, and the remaining improvement factor could be used to reduce the gain fiber lengths.

One embodiment improves the efficiency of Raman amplifiers by increasing the effective nonlinearity of the fiber used as the gain medium. The effective nonlinear coefficient for the fiber can be defined as $$\gamma = \frac{2\pi}{\lambda} \frac{n_2}{A_{eff}}$$

where $n_2$ is the nonlinear index of refraction and $A_{eff}$ is the effective area of the fiber. The Raman gain coefficient can be directly proportional to $\gamma$. The Raman coefficient is the imaginary part of the nonlinear susceptibility while the index is proportional to the real part of the susceptibility, and the nonlinear index and Raman gain will be related by the so-called Kramers-Kronig relations. For a dispersion shifted fiber at 1550 nm wavelength with an $n_2=2.6\times10^{-16}$ cm$^2$/W and an $A_{eff}=50\Phi$m$^2$, the nonlinear coefficient can be about $\gamma=2$ W$^{-1}$ km$^{-1}$. If this value is raised to over 3 W$^{-1}$ km$^{-1}$, then the pump power or fiber lengths can be reduced in proportion to the increase in nonlinear coefficient.

Beyond the constraint on the Raman gain coefficient, the dispersion in the amplifier can be restricted. To maintain a relatively low level of dispersion in the vicinity of the signal wavelengths, the zero dispersion wavelength $\lambda_o$ can be in close proximity to the operating wavelength. For single-channel, high-bit-rate systems, one embodiment minimizes the dispersion by placing the signal wavelength within 10 nm of the $\lambda_o$. For some embodiments of multi-wavelength WDM systems, where the channels can interact through four-wave mixing in the vicinity of $\lambda_o$, a dispersion-managed fiber can be used. A dispersion-managed fiber can have a locally high dispersion but a path-averaged value for dispersion close to zero by combining lengths of plus and minus values for the dispersion around the operating band. For the operating wavelength band, some segments of fiber can have $\lambda_o$ at shorter wavelengths and some segments of fiber can have $\lambda_o$ at longer wavelengths.

By proper design of the fiber, higher nonlinearity and lower dispersion can be achieved. For example, for operation in the S-band around 1520 nm, high nonlinearity fibers have been produced. The fiber core can have a modified parabolic refractive index profile with a $\Delta_{peak}=2\%$. Three exemplary fibers have zero dispersion wavelengths of 1524 nm, 1533 nm and 1536 nm. Such fibers can have a dispersion slope of 0.043 ps/nm$^2$-km, and the loss at 1550 nm can be approximately 0.6 dB/km. The nonlinear coefficient can be $\gamma=9$ W$^{-1}$ km$^{-1}$, or a factor of 4.5×higher than in DSF. The enhancement can be attributed to two factors: a smaller effective area and a higher germanium content. The effective area can be reduced to about $A_{eff}=16.5$ $\mu$m$^2$, or about a factor of 3.3 less than in DSF. Also, the nonlinear index of refraction is about 1.35×larger than in DSF due to the extra germanium used to increase $\Delta_{peak}$ from 1% in DSF to 2% for the high nonlinearity fiber. In addition the mode field diameter at 1550 nm can be measured to be 4.67 $\mu$m.

For the gain fiber used in the Raman amplifier, a figure-of-merit for the fiber can be defined in some embodiments. A figure-of-merit that can be measured and indicate amplifier performance is the ratio of the Raman gain coefficient to the loss at the signal wavelength. The higher this figure-of-merit, the better the performance of the amplifier. This figure-of-merit for different fibers in some embodiments is provided in Table 1. In one embodiment the lowest figure-of-merit is found for standard (non-dispersion-shifted) SMF-28 fiber. This fiber can have a low germanium content and a relatively large $A_{eff}=86$ $\mu$m$^2$. The figures-of-merit for the high-nonlinearity (Hi-NL) fiber can exceed the other fibers, with a value about two-fold larger than Lucent True-wave fiber in one example. Although the DCF's can have a relatively large figure-of-merit for Raman amplification, they can have very large dispersion coefficients for S-band signals.

TABLE 1

Comparison of Raman gain figure-of-merit for different fibers measured.

| Fiber Type | Gain [dB/W-km] @ 1500 nm | Loss [dB/km] @ 1500 nm | Figure-of-Merit |
|---|---|---|---|
| Corning SMF-28 | 2.2 | 0.19 | 11.6 |
| Lucent True-Wave | 3.3 | 0.21 | 15.7 |
| Corning SMF-DS | 4.0 | 0.2 | 20.0 |
| Corning DCF | 11.75 | 0.445 | 26.4 |
| Lucent DCF | 13.72 | 0.5 | 27.6 |
| Hi-NL | 18.0 | 0.6 | 30.0 |

Figure 24:
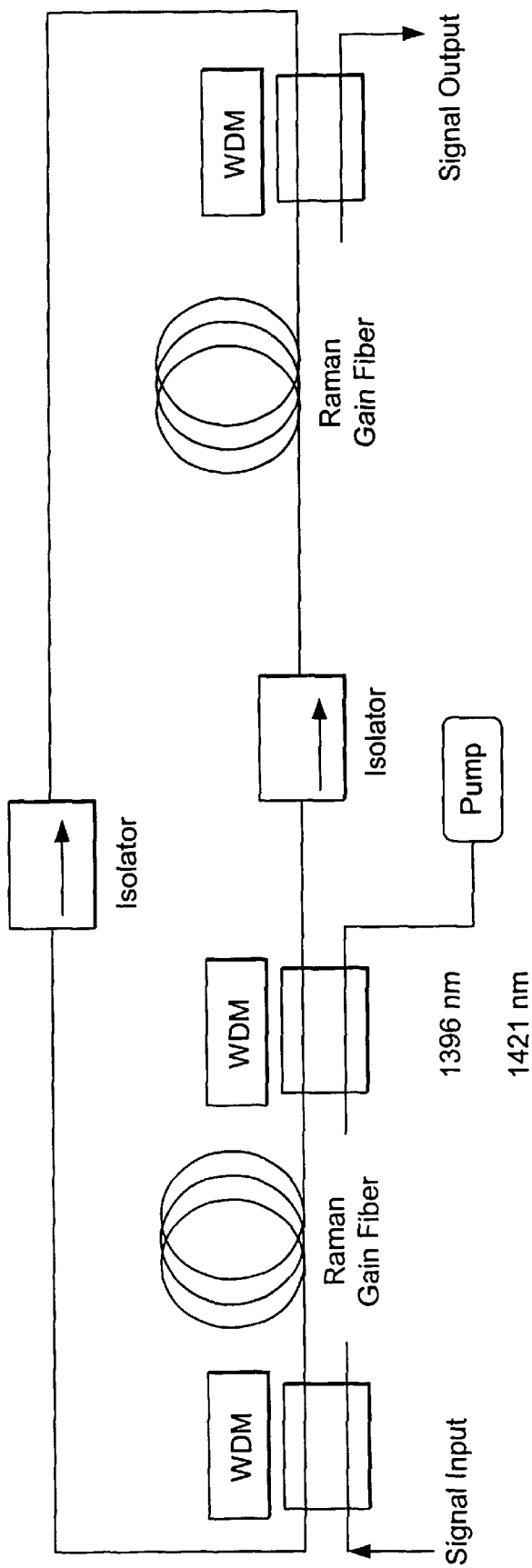
FIG. 24 is a schematic diagram of one embodiment of a dual stage amplifier.
Figure 25:
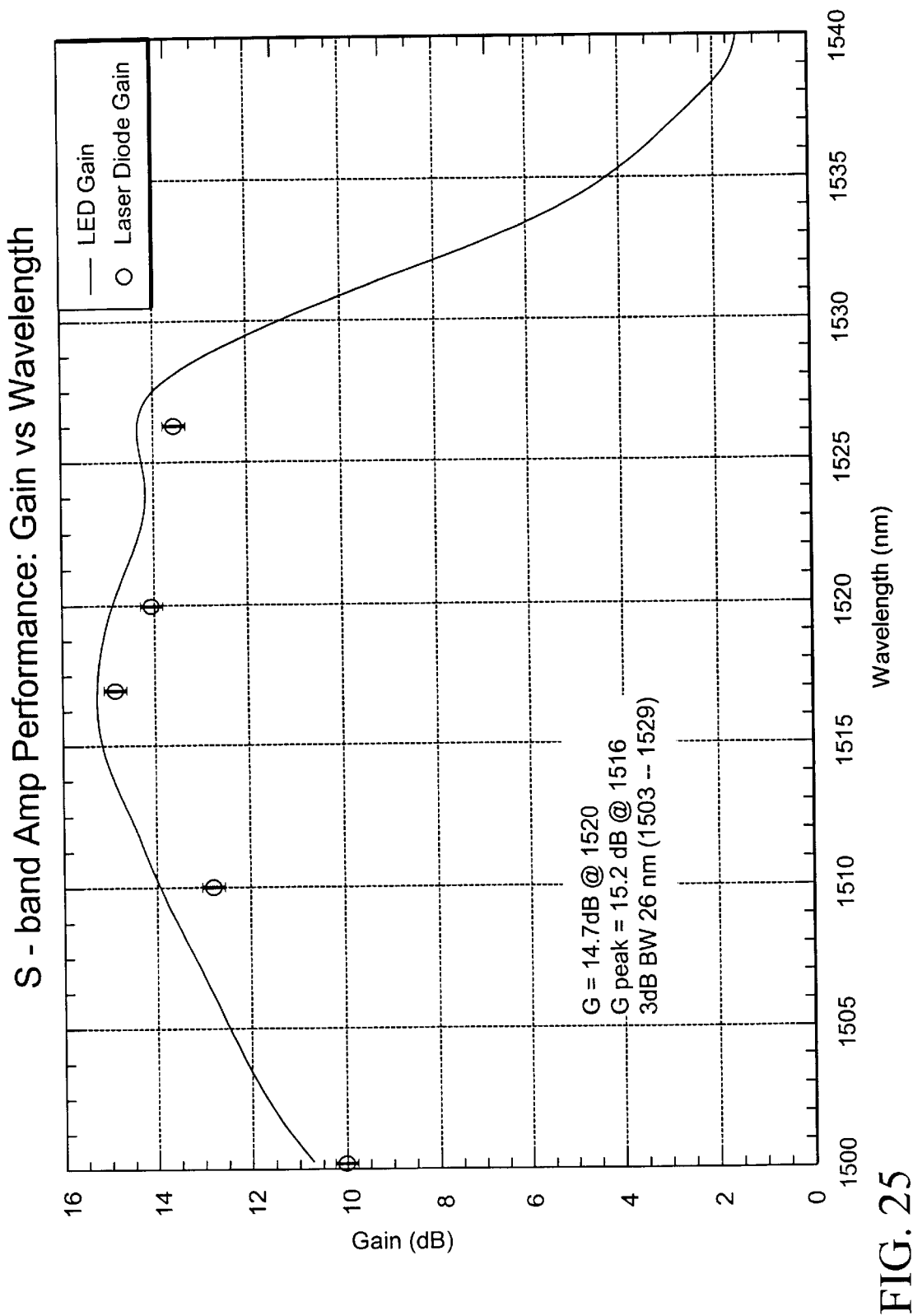
FIG. 25 is a graph of gain versus wavelength for an S band dual stage amplifier, such as for the embodiment of FIG. 24.
Figure 26:
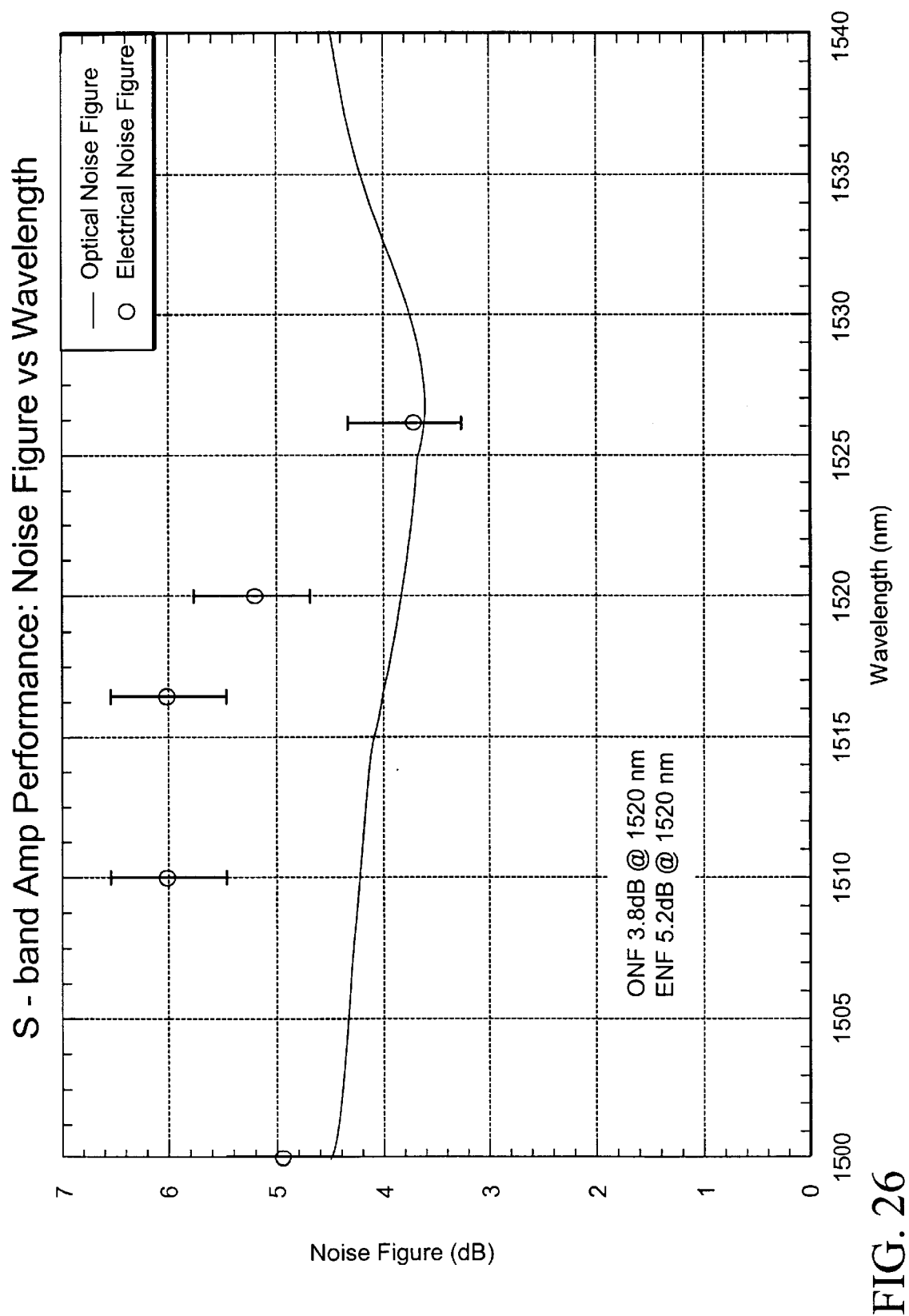
FIG. 26 is a graph of noise figure versus wavelength for an S band dual stage amplifier, such as for the embodiment of FIG. 24.
Figure 27:
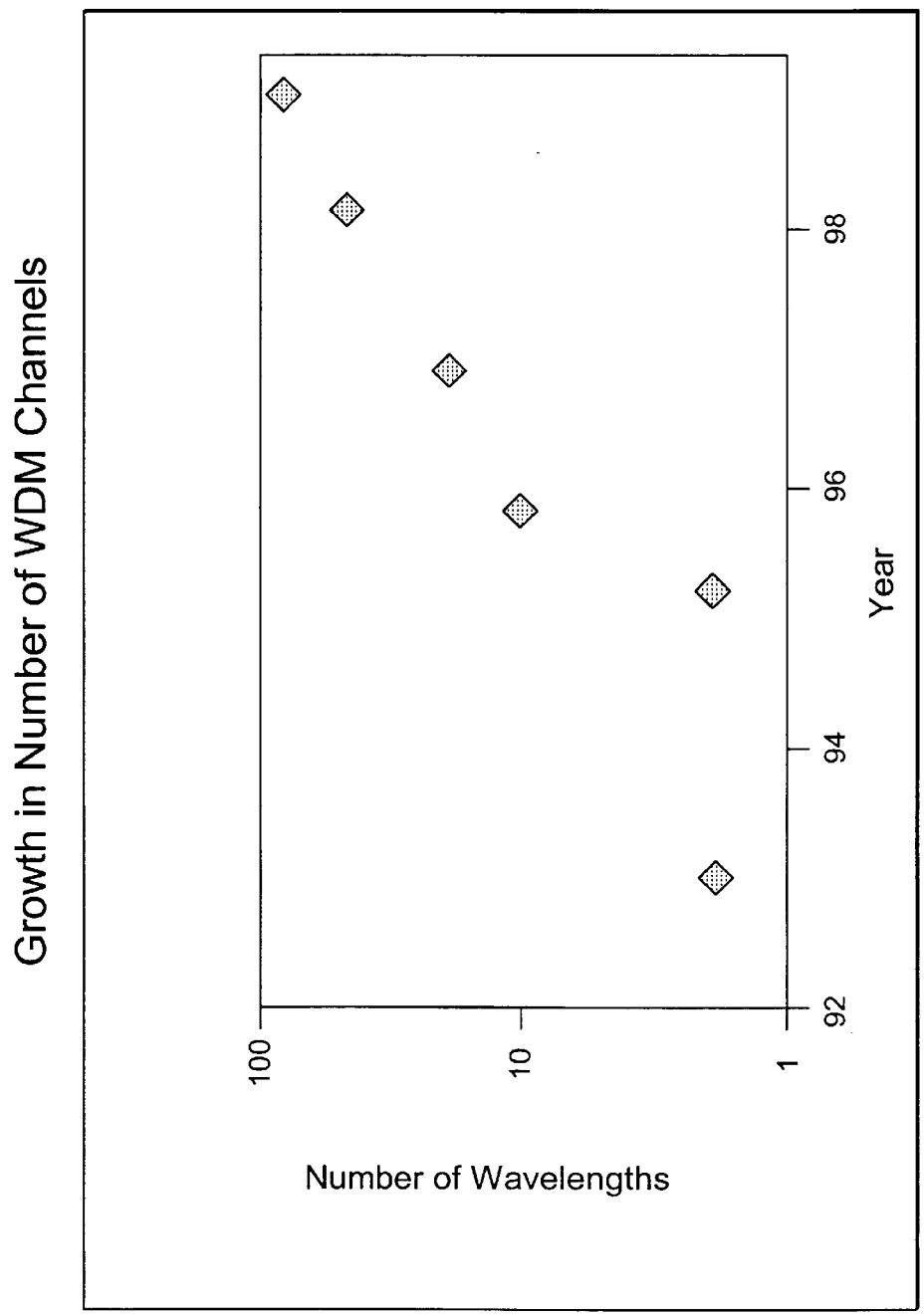
FIG. 27 is a historical graph illustrating the increase in the number of wavelengths versus year.

One embodiment with Hi-NL fiber has significant improvements in terms of fiber length and pump power used in a Raman amplifier. One embodiment has an amplifier made out of Lucent True-Wave fiber. The specifications for the unit can be: low dispersion around 1520 nm, 15 dB of peak gain, electrical and optical NF under 6 dB, and multi-path interference (MPI) under 50 dB. A two-stage design for the Raman amplifier can be used, as illustrated in FIG. 24. In particular, 6 km of True-Wave fiber can be used in the first stage and 10–12 km of fiber can be used in the second stage. The measured performance of the amplifier can be: peak gain of 15.2 dB at 1516 nm, 3 dB bandwidth of 26 nm (between 1503–1529 nm), and electrical and optical noise figure under 6 dB. For example, the gain versus wavelength and noise figure versus wavelength for the unit is illustrated in FIGS. 25 and 26. This performance can have a pump power of about 1.0 W at 1421 nm.

In one embodiment, the True-Wave fiber in this design is replaced with Hi-NL fiber. Reductions in fiber lengths and pump power requirements can be achieved. The Hi-NL fiber can meet the dispersion requirement in some embodiments. The DCF fibers can lead to the introduction of large amounts of dispersion. Referring to the Table 1 comparison, the fiber lengths can be chosen to keep roughly the same amount of net loss. In one embodiment, fiber lengths can be roughly 2 km for the first stage and 3.3–4 km for the second stage. Pump power requirements can be lowered by the ratio of figures-of-merit, or roughly to 0.5W. in various embodiments, this power range can be provided by the Raman oscillator, or by polarization and wavelength multiplexing 3–4 LD's together. Hi-NL fiber can reduce the size of the amplifier as well as permit LD pumping in some embodiments.

The fiber can have single-mode operation for the pump as well as the signal wavelengths in some embodiments. Cut-off wavelength $\lambda_c$ of the fiber can be shorter than any of the pump wavelengths in some embodiments. The pump can be multi-mode, and noise can be introduced from the beating between modes in other embodiments.

Various embodiments have reduction of the Raman amplifier size and pump requirements while maintaining low net dispersion at the operating wavelengths, and include one or more of:

(A) A Raman amplifier using a gain fiber characterized in that nonlinear coefficient $\gamma > 3$ $W^{-1}$ $km^{-1}$ zero dispersion wavelength in the range of $1300 < \lambda_o < 1800$ nm, depending more precisely on the specifications Loss over the operating wavelength of <2 dB/km, with a preference for loss <1 dB/km (B) A Raman amplifier using a dispersion managed gain fiber characterized in that nonlinear coefficient $\gamma > 3$ $W^{-1}$ $km^{-1}$ dispersion management done using segments of fiber with zero dispersion wavelength in the range of $1300 < \lambda_o < 1800$ nm, depending more precisely on the specifications. Given an operating band, certain fiber segments have $\lambda_o$ less than the operating band and other fiber segments have $\lambda_o$ greater than the operating band. The local dispersion can be kept high, while the path average dispersion can be close to zero in the signal band.

Loss over the operating wavelength of certainly <2 dB/km, with a preference for loss <1 dB/km (C) Fibers as in (A) or (B) with cut-off wavelength shorter than any of the pump wavelengths.

(D) A Raman amplifier as described in (A) that is pumped by LD's. For two or more LD's, the power can be combined by using polarization and wavelength multiplexing using polarization beam combiners and wavelength-division-multiplexers.

(E) A Raman amplifier as in (B) that is pumped by LD's. For two or more LD's, the power can be combined by using polarization and wavelength multiplexing using polarization beam combiners and wavelength-division-multiplexers.

(F) At least a two-stage Raman amplifier that uses the improvements in (A), (B), (C), (D) or (E).

(G) Other factors as above with different numerical ranges

One technology for U-DWDM systems can be the use of hybrid amplifiers, which comprise a discrete amplifier along with a DRA, to avoid nonlinear interactions between channels. The DRA can operate over 80+ nm of bandwidth in some embodiments, which can be achieved by pump pre-emphasis and spectral evolution along the fiber length in some embodiments. If channel spacing of 10 GHz is used, for example, this can yield 1000+ wavelengths:

10 GHz channel spacing=~0.08 nm/channel overall bandwidth=~80+ nm channels=[80+ nm]/[0.08 nm/ch]=1000+ channels

If the bit-rate per channel is 2.5 Gb/s, then the capacity of the fiber can be bandwidth capacity=1000+ channels×2.5 Gb/s-ch=2.5+ Tb/s.

For maximum reach, the 80+ nm system bandwidth can coincide with the minimum loss region in the fiber in some embodiments. For example, the C and L-bands can be used between ~1530–1610 nm. The hybrid amplifier can use discrete EDFA's and DRA's in some embodiments.

Another technology is an ultra-broadband source that can be carved with filters to yield a large number of channels. Embodiments of ultra-broadband sources include continuum generation in fibers, short-pulse modelocked lasers, ASE sources, and superluminescent diodes. Carving of the broadband source using filters can be easier since the periodicity of the passive filters can set the channel spacing. When the channel spacing is less than 25 GHz, an embodiment includes complicated stabilization circuitry to set the wavelengths of individual LD's.

Another technology for 1000+ wavelength systems is the periodic filter technology. Various embodiments include wavelength-grating routers or array waveguide (AWG) filters. An AWG comprises two star couplers and a Mach-Zehnder interferometer based grating in one embodiment. A large number of wavelength channels of uniform channel spacing can be multiplexed through a Mach-Zehnder interferometer. AWG's can have 50 and 25 GHz spacing. Other embodiments can include high-contrast channel spacing approaching 10 GHz.

Figure 28B:
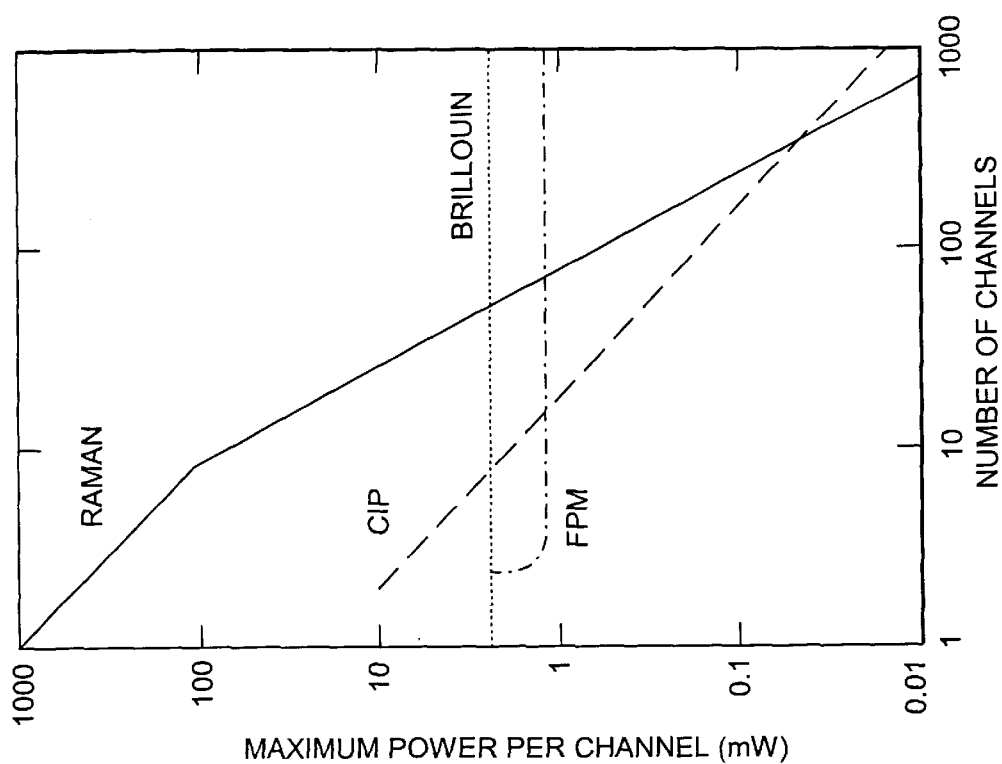
FIG. 28(b) is a graph of the maximum power per channel versus the number of channels as limited by different fiber non-linear effects.
Figure 28A:
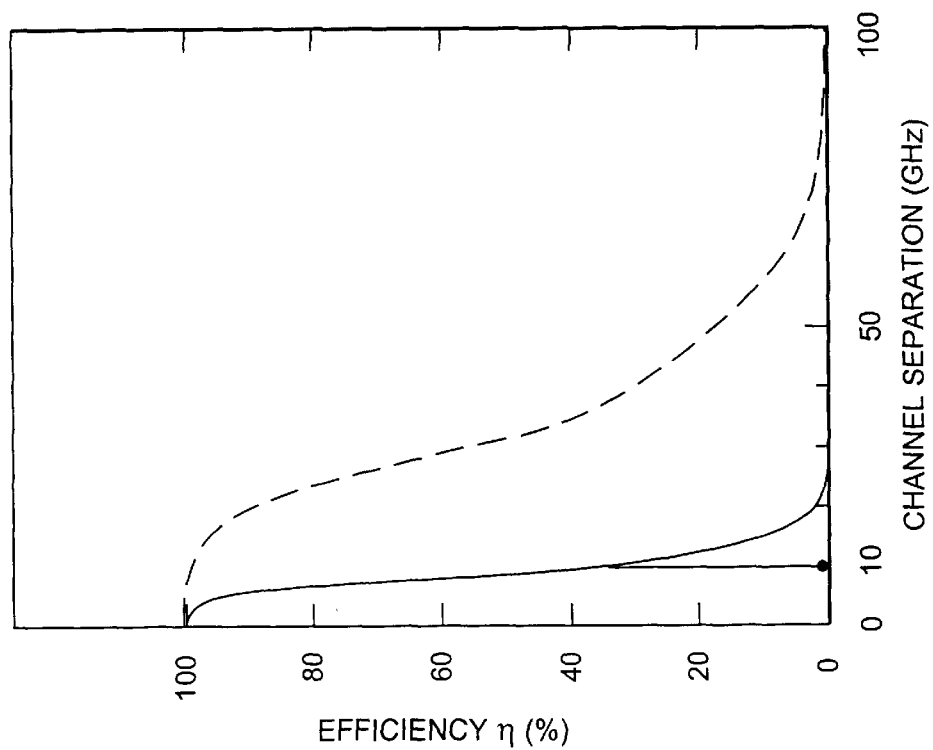
FIG. 28(a) is a graph of the efficiency of four wave mixing penalty versus channel separation.
Figure 29:
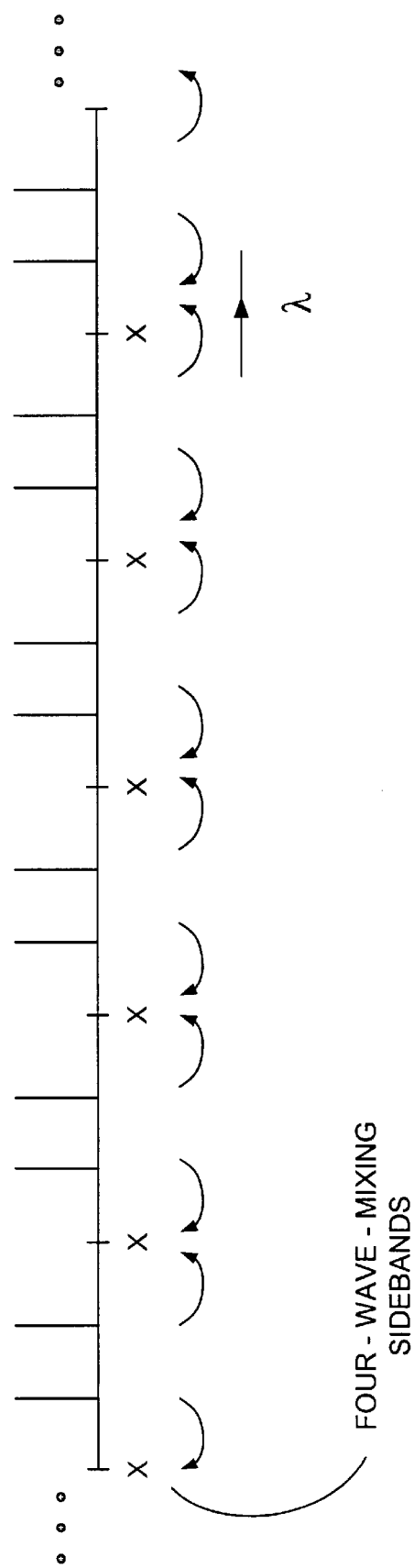
FIG. 29 is a schematic diagram of an embodiment illustrating removal of channels to reduce four wave mixing penalties.

As FIG. 28(b) shows, residual fiber nonlinearities can remain depending on the power level. Some embodiments have nonlinear control or compensation. Raman gain tilt can be compensated various gain equalization schemes. In various embodiments, these schemes equalize the tilt of the amplifier, and compensate for a combination of the amplifier tilt and the Raman gain tilt. With channel power pre-emphasis at the input in some embodiments, after propagation through the fiber system the channel energies equalize. To compensate for four-wave-mixing penalty, multiple embodiments can be used. Dispersion-managed fibers can be used, for example where the dispersion has a locally high value but a low path-averaged value. In other embodiments, every third channel can be skipped. When two adjacent channels beat through four-wave-mixing, they give rise to sidebands at the two surrounding channels. By skipping every third channel, the penalty from four-wave-mixing cross-talk can be reduced (see FIG. 29).

Figure 30:
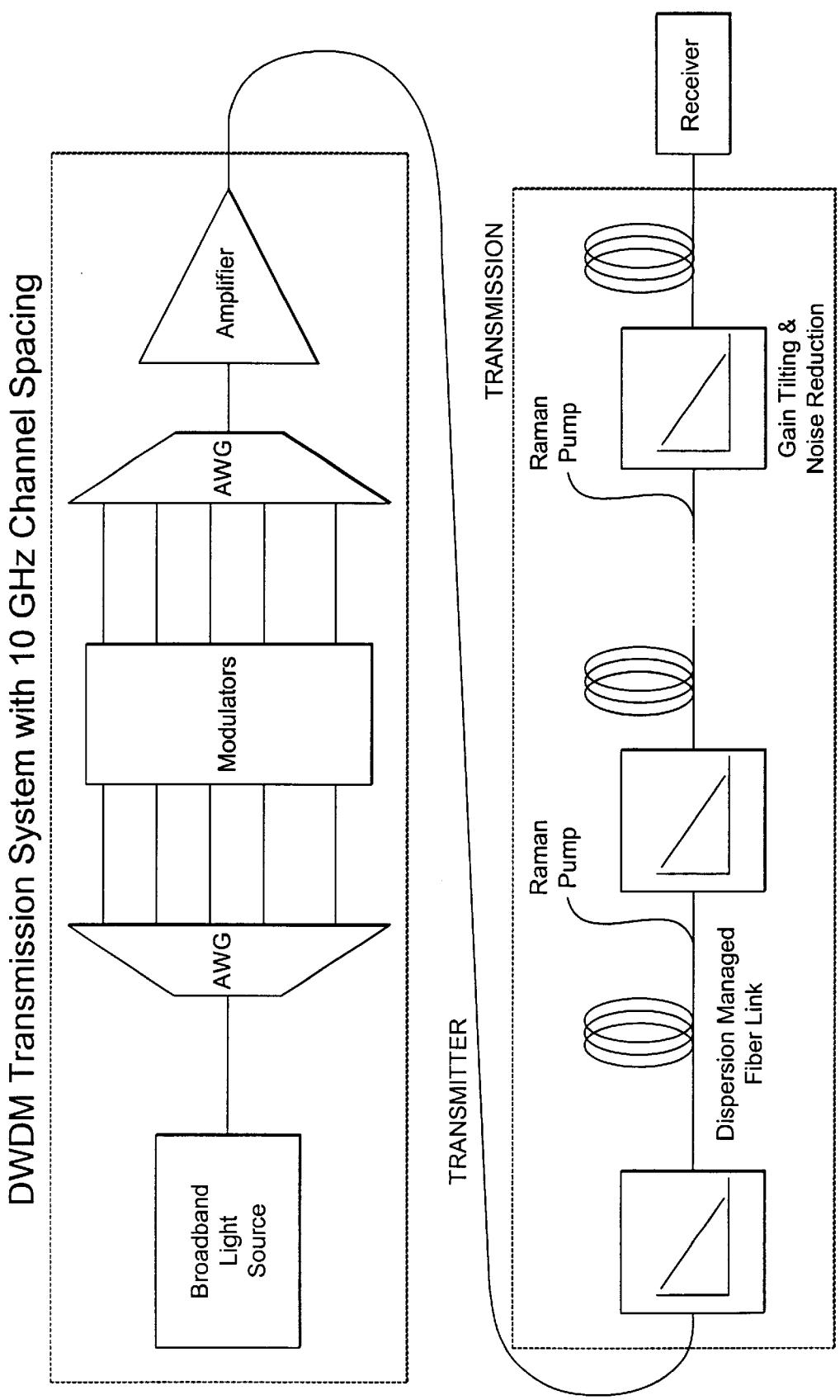
FIG. 30 is a schematic diagram of an embodiment of a dense WDM system with 10 GHz channel spacing.

The challenges of 1000+ wavelength systems can be met with a combination of one or more technologies (FIG. 30). Hybrid amplifiers, using discrete amplifiers plus DRA's, can be used to lower the signal channel power in some embodiments. The discrete amplifiers can be spaced at 80–100 km, although some embodiments can have spacing of 30–50 km. The DRA can use pump pre-emphasis to a desired bandwidth of 80+ nm in some embodiments. Various embodiments use discrete LD's, or can comprise one or more broadband light sources, which are then carved using passive periodic filters. A much tighter channel spacing, below 25 GHz and preferably 10 GHz, can be achieved in some embodiments. Some embodiments have dense channel filter technology such as AWG filters. Nonlinear control in some embodiments can compensate for fiber nonlinearity. To overcome the Raman gain tilt, gain tilt adjustment or signal power pre-emphasis can be used in some embodiments. To control four-wave-mixing, dispersion management or skipping every third channel can be used in other embodiments.

The wavelength range where hybrid amplifiers with DRA's are to be used, can be considered to facilitate future upgrades in bandwidth. DRA's used in the C-band (1530–1565 nm) or L-band (1570–1610 nm) can restrict opening up the S-band (1480–1530 nm) or S+ band (1430–1480 nm). DRA's can use pump bands that are 13.2 THz, or about 100 nm, shorter in wavelength than the signal band. For the C- or L-bands, DRA's can have pumps that lie in the wavelength range between 1430–1510 nm. The pump bands can be at a shorter wavelength than any signal band. The pump might deplete energy from the signal channels through the Raman process.

In embodiments where fiber bandwidth exceeds 100 nm, DRA can be inconsistent with further band expansion. For example, DRA's for C- and L-bands can prevent using the S- and S+-bands in the fiber in some embodiments. The pumps for DRA can lie at shorter wavelength than any signal band. To maximize the capacity of the fiber in some embodiments DRA's can be used at the shortest bands to be used in the fiber.

DRA's can be useful when the fiber loss increases in some embodiments. For example, when the fiber loss increases >0.03 dB/km from the minimum loss (i.e., for an 80 km link that would mean an additional loss of 2.4 dB), then the span design can be more difficult in some embodiments. The higher loss means that higher gain can be used for a fixed amplifier spacing, which can mean that more noise can be introduced. In turn, this can mean that the signal power can be increased or the bit-rate reduced to maintain the overall SNR. If hybrid amplifiers can be used in these higher loss windows, the improved NF can be used to offset the drawbacks from the higher loss.

Figure 31:
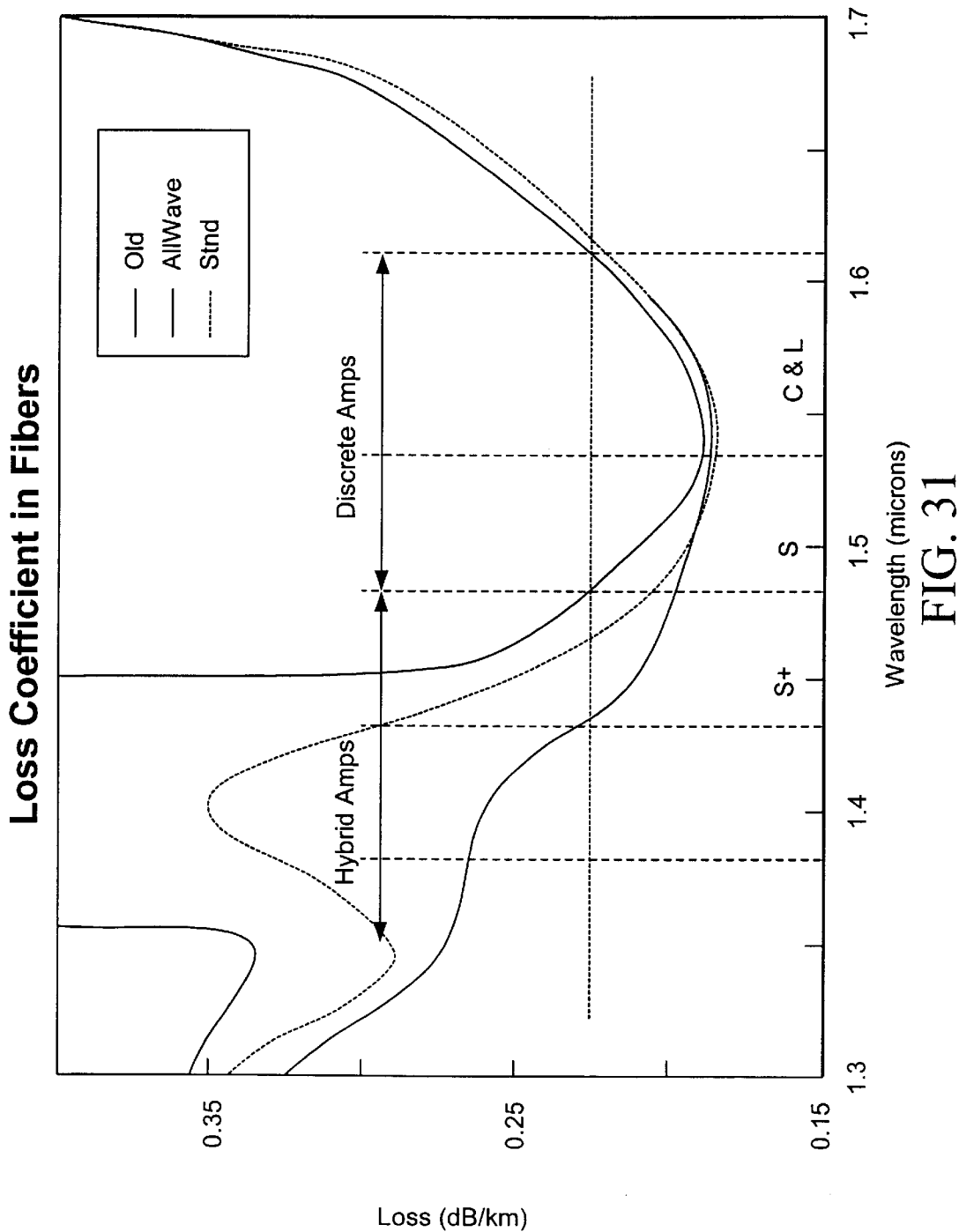
FIG. 31 is a graph of loss versus wavelengths comparing the wavelength range over which hybrid and discrete amplifiers can be operated.

FIG. 31 shows the loss coefficient (in dB/km) for three generations of fibers. The loss above 1600 nm can be due to infrared absorption, while the gradual increase in loss below 1550 nm can be due to Rayleigh scattering. The peak near 1390 nm can result from water absorption of OH bonds. With some newer fibers, the fibers can be dried better, so the water peak can be reduced. Also represented in FIG. 31 are different bands. The C- and L-bands can stretch from approximately 1530–1610 nm, the S-band from 1480–1530 nm, and the $S^+$ band from 1430–1480 nm. For some embodiments of fiber types, the loss in the S-band can be lower or equal to the loss in the C- and L-bands. Since these three bands can be the lowest loss bands, discrete amplifiers can be used in these bands in some embodiments. For example, the C- and L-bands can use discrete EDFA's, while the S-band can use Raman amplifiers.

In the $S^+$ band and shorter (i.e., wavelengths shorter than 1480 nm), the loss can rise above the loss in the C- and L-bands due to Rayleigh scattering and the water absorption. The $S^+$ band and shorter wavelengths can advantageously use DRA's in some embodiments. Since these bands can be on the shortest wavelength side, DRA's may not block further expansion of the bands in some embodiments. The loss in the shorter wavelengths can be too high for these wavelengths to be used in long-haul communications in some embodiments. Also, for some embodiments with DRA's used in the wavelength range just beyond the water absorption peak (i.e., wavelengths between 1430–1480 nm), the pumps can be at wavelengths approximately 1340–1380 nm, just below the water peak.

FIGS. 32(a), 32(b), 33(a) and 33(b) illustrate various embodiments with an amplifier module incorporated into a broadband transmission system that operates in multiple wavelength bands. Discrete amplifiers can be used in the C, L, S bands, and combinations thereof. A distributed Raman amplifier or hybrid amplifier can be used for the S+ band.

Figure 32A:
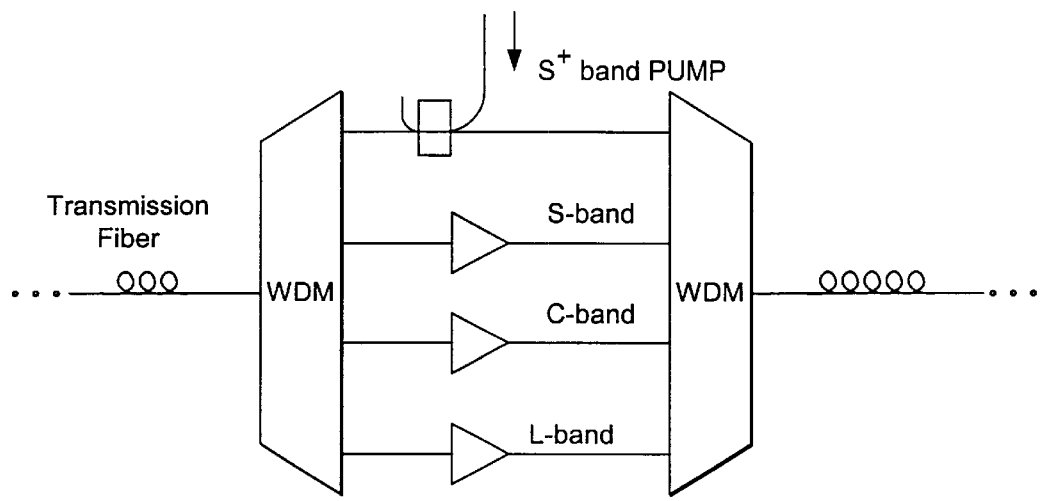
FIG. 32(a) is a schematic diagram of an embodiment of a multi-band amplifier module using a single WDM to split or combine the bands and distributed Raman amplification in the S+ band.
Figure 32B:
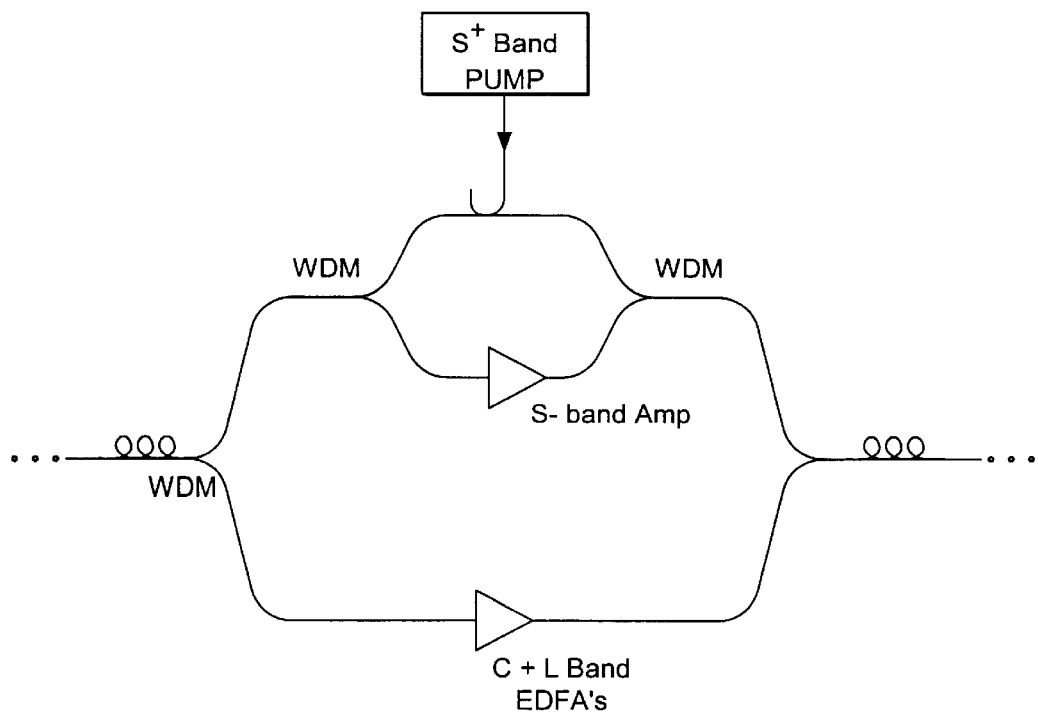
FIG. 32(b) is a schematic diagram of an embodiment of a multi-band amplifier module using multiple WDM's to split or combine the bands and distributed Raman amplification in the S+ band.

In FIGS. 32(a) and 32(b) a pump is introduced in parallel with these discrete amplifiers to implement various embodiments of a distributed Raman amplifier in the S+ band. In FIG. 32(a) a single WDM is used to split up the multiple bands while in FIG. 32(b) a serial combination of WDM's is used to split and combine the bands.

Figure 33A:
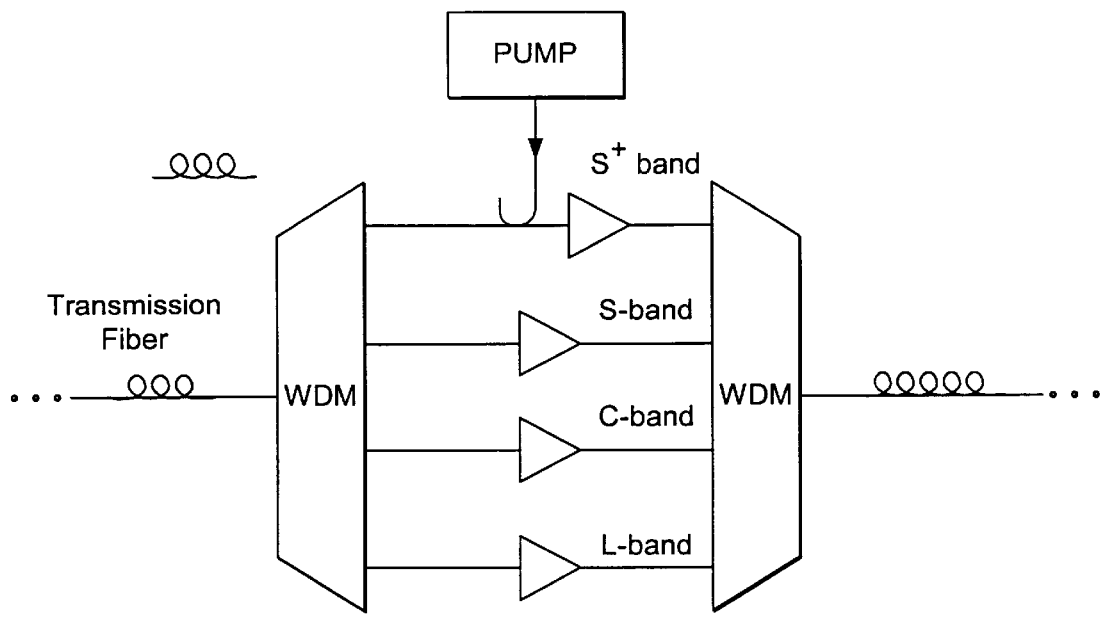
FIG. 33(a) is a schematic diagram of an embodiment of a multi-band amplifier module using a single WDM to split or combine the bands and hybrid amplification in the S+ band.
Figure 33B:
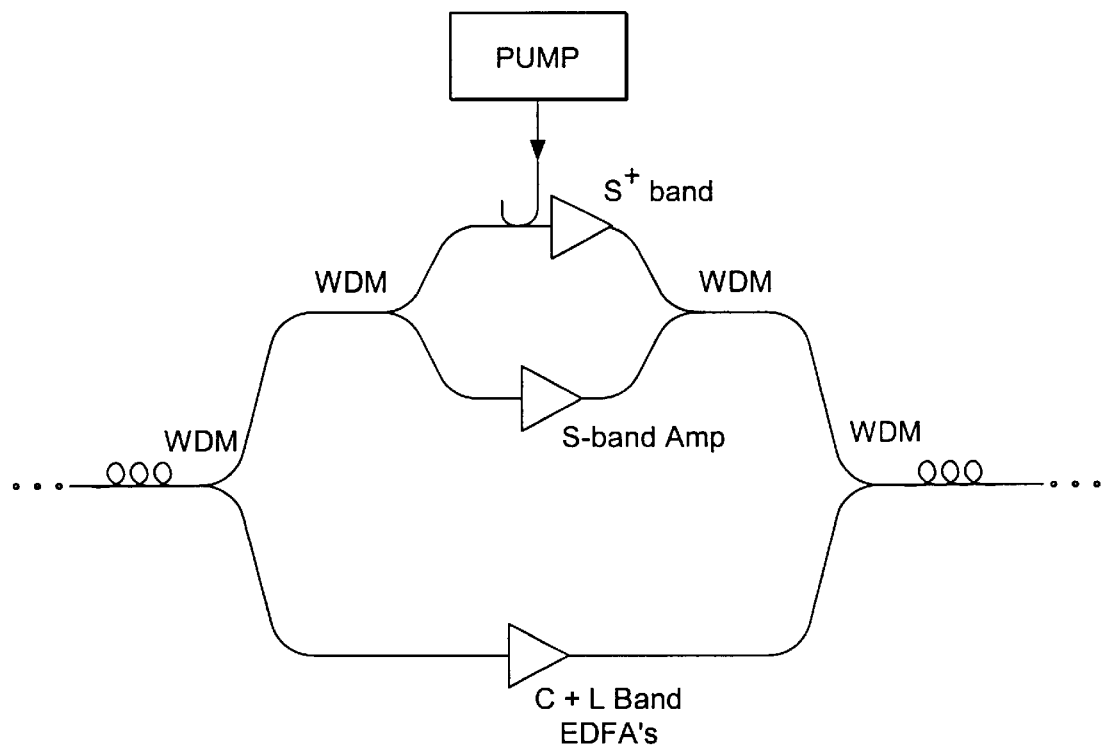
FIG. 33(b) is a schematic diagram of an embodiment of a multi-band amplifier module of the present invention using multiple WDM's to split or combine the bands and hybrid amplification in the S+ band.

In FIGS. 33(a) and 33(b) a pump is introduced in parallel with these discrete amplifiers to implement embodiments of a hybrid Raman amplifier in the S+ band. In FIG. 33(a) a single WDM is used to split up the multiple bands while in FIG. 33(b) a serial combination of WDM's is used to split and combine the bands.

In another embodiment, a broadband fiber transmission system is provided with low noise hybrid optical amplifiers to compensate for loss at wavelength of 1480 nm or less or that have a fiber loss of 0.03 dB/km or more above the minimum loss of the fiber. One embodiment provides a broadband fiber transmission system with low noise distributed optical amplifiers to compensate for loss at wavelength of 1480 nm or less or that have a fiber loss of 0.03 dB/km or more above the minimum loss of the fiber. Additionally, another embodiment is a broadband fiber transmission system with low noise discrete optical amplifiers to compensate for loss at wavelength of 1480 nm or less or that have a fiber loss of 0.03 dB/km or more above the minimum loss of the fiber. A further embodiment is a broadband fiber transmission system with low noise hybrid optical amplifiers to compensate for loss at wavelengths of 1400 to 1480 nm.

DRA's can improve the NF of an optical amplifier in some embodiments. For maximum fiber capacity, hybrid amplifiers can be used in the shortest wavelength bands in some embodiments, where the fiber loss is rising. For example, at wavelengths shorter than 1480 nm where the loss is at least 0.03 dB/km higher than at the loss minimum, hybrid amplifiers can be valuable. Discrete amplifiers in the C-, L- and S-bands and hybrid amplifiers in the S+ or shorter wavelength bands, can expand the fiber bandwidth beyond 120 nm.

Some embodiments include standard dispersion fiber, i.e., fibers with zero dispersion wavelength around 1310 nm. The zero dispersion wavelength can fall in the S- or $S^+$-bands in some embodiments. For example, this is true for so-called non-zero-dispersion-shifted fiber (NZ-DSF). In these fibers, it can be difficult to run multi-wavelength WDM channels due to cross-talk from four-wave mixing. Four-wave-mixing can require phase matching, and the phase matching can be easier to satisfy in the neighborhood of the zero dispersion wavelength. One embodiment is a broadband fiber transmission system with non-zero dispersion fiber that has zero dispersion wavelengths less than 1540 nm or greater than 1560 nm that uses optical amplifiers to compensate for loss.

WDM can maximize capacity in any given band in some embodiments. Hybrid amplifiers can be useful in the vicinity of the zero dispersion wavelength in some embodiments. NZ-DSF fibers can have a zero dispersion wavelength either <1540 nm or >1560 nm in some embodiments. For operation near the zero dispersion wavelength, e.g., $|\lambda-\lambda_o|<25$ nm, the four-wave-mixing penalty can be avoided by using hybrid optical amplifiers in one embodiment. Since the effective NF of hybrid amplifiers can be lower than for discrete amplifiers, the power levels for the signals can be reduced to the point that four-wave-mixing can no longer be a limitation, in another embodiment.

Figure 34B:
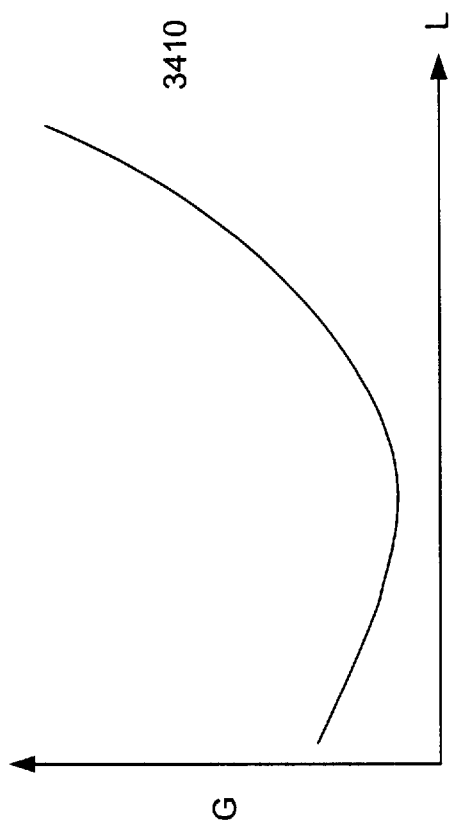
FIG. 34(b) is another graph of gain versus length for an amplifier.
Figure 34A:
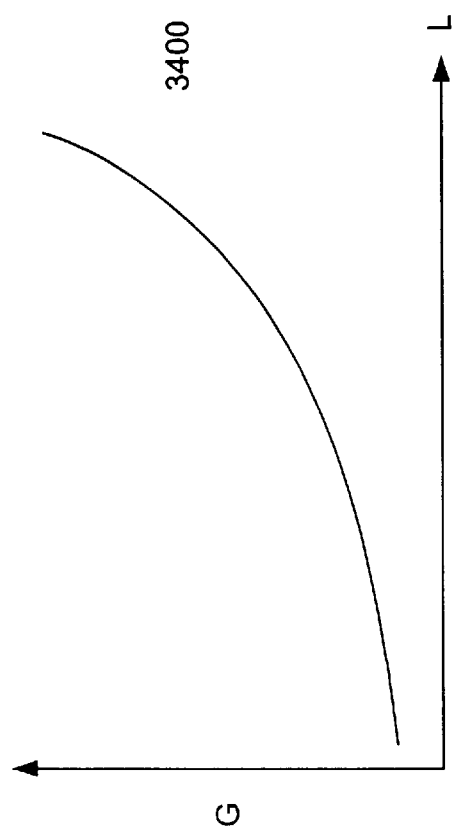
FIG. 34(a) is a graph of gain versus length for an amplifier.

DRA's can address noise figure problems. For example, loss at input degrades the NF of amplifiers. Counter-propagating DRA in one embodiment has low gain at the input, as shown in FIG. 34(a), a graph of gain versus length for an amplifier. NF can be improved by raising gain at beginning in some embodiments, as shown in FIG. 34(b), another graph of gain versus length for an amplifier. A counter-propagating pump can isolate pump fluctuations from the signal in some embodiments.

Figure 35:
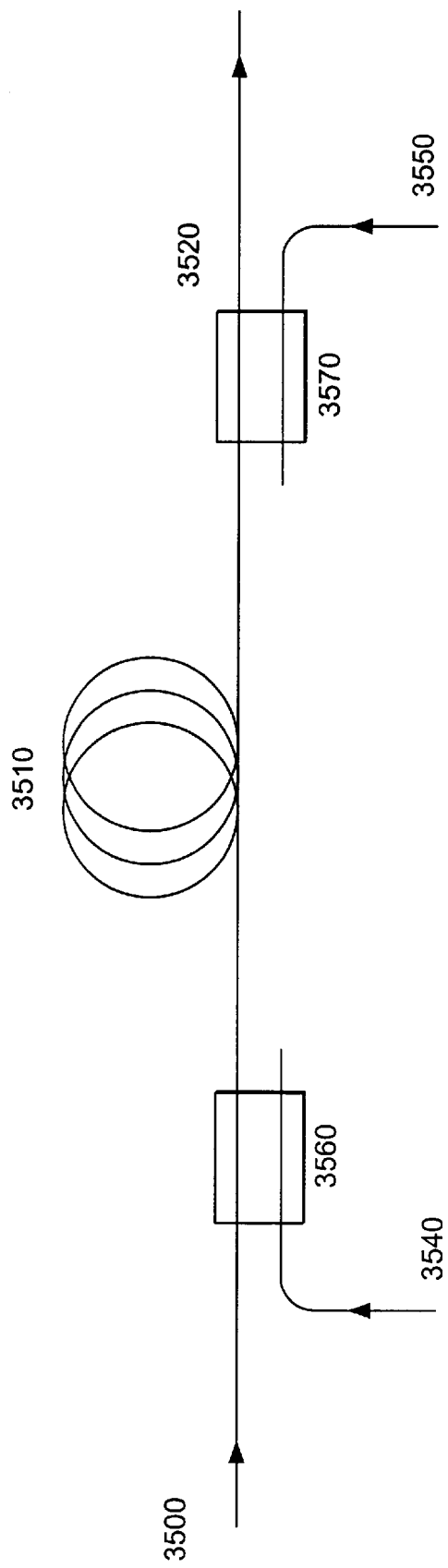
FIG. 35 is a schematic diagram of an embodiment of a Raman amplifier.

FIG. 35 is a schematic diagram of an embodiment of an improved noise figure (NF) Raman amplifier. A WDM 3560 has a signal input port 3500 and is coupled to a co-propagating pump 3540. Distributed or Raman gain fiber 3510 couples the WDM 3560 and a WDM 3570. The WDM 3570 has a signal output port 3520 and is coupled to a counter-propagating pump 3550. The counter-propagating pump frequency can be 1 Raman order (~13.2 THz) higher than the signal frequency in some embodiments, which can maximize the counter-propagating pump to signal gain. The co-propagating pump frequency can be 2 Raman orders (~26.4 THz) higher than the signal frequency, which can maximize the co-propagating to counter-propagating pump gain in some embodiments, and minimizes co-propagating pump to signal gain.

Figure 36:
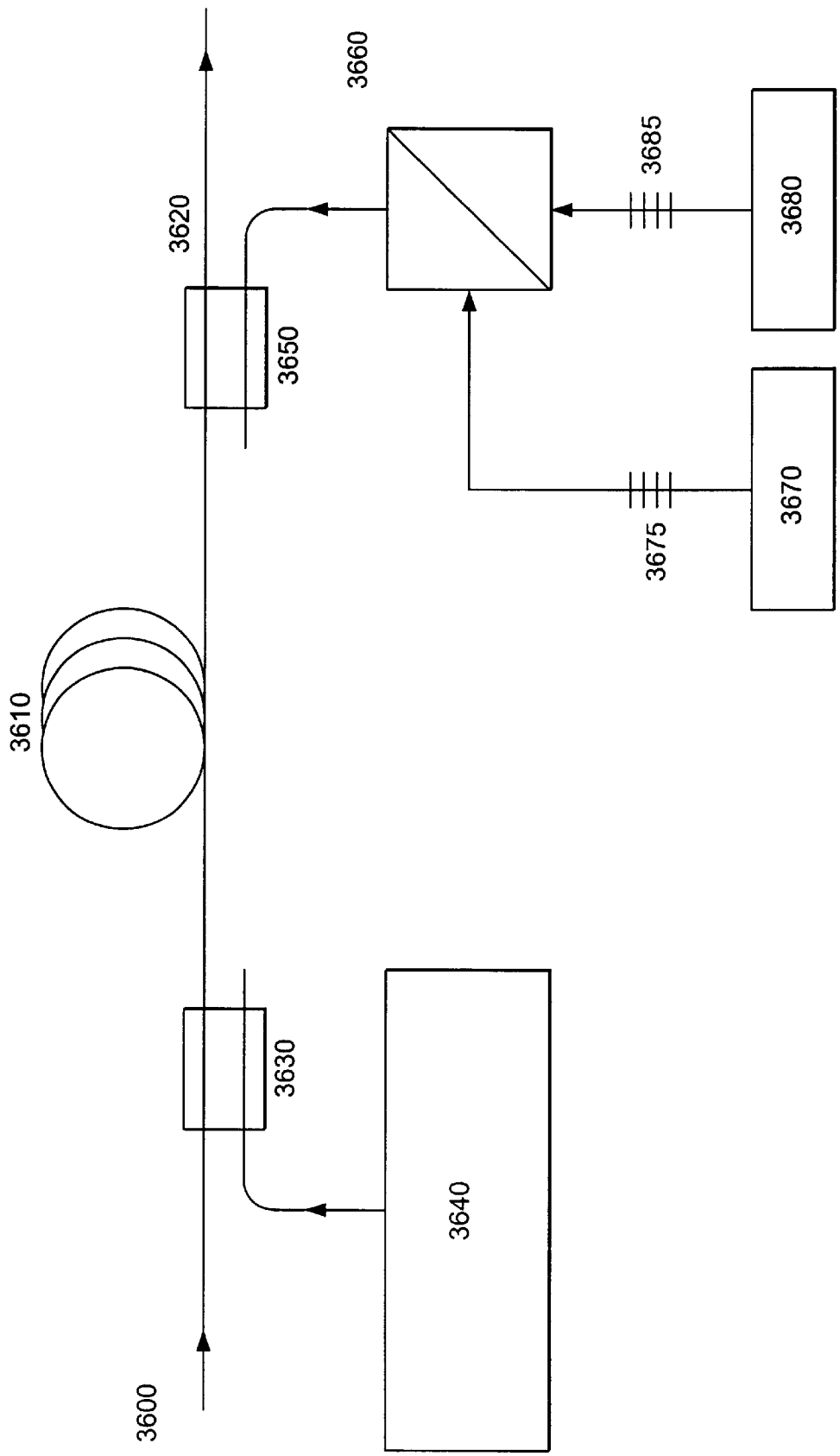
FIG. 36 is a schematic diagram of an embodiment of a DRA.

FIG. 36 is a schematic diagram of an embodiment of a DRA, such as for verification. A WDM 3630 has a signal input port 3600 and is coupled to 3640, an exemplary Yb fiber laser pumping a cascaded Raman wavelength shifter with output at 1311 nm. A 72 km Lucent true wave fiber 3610 couples the WDM 3630 and a WDM 3650. The WDM 3650 has a signal output port 3620 and a polarization beam combiner 3660. The combiner 3660 is coupled by gratings 3675 and 3685 to 1395 nm laser diodes 3670 and 3680. In experiment 1, both 1395 nm laser diodes are on (290 mW launched), and the 1311 nm pump is off (differential gain= 10.5 dB @ 1490 nm). In experiment 2, one 1395 nm laser diode is on (145 mW launched), and the 1311 nm pump power is set so that the differential gain is 10.5 dB.

Figure 37:
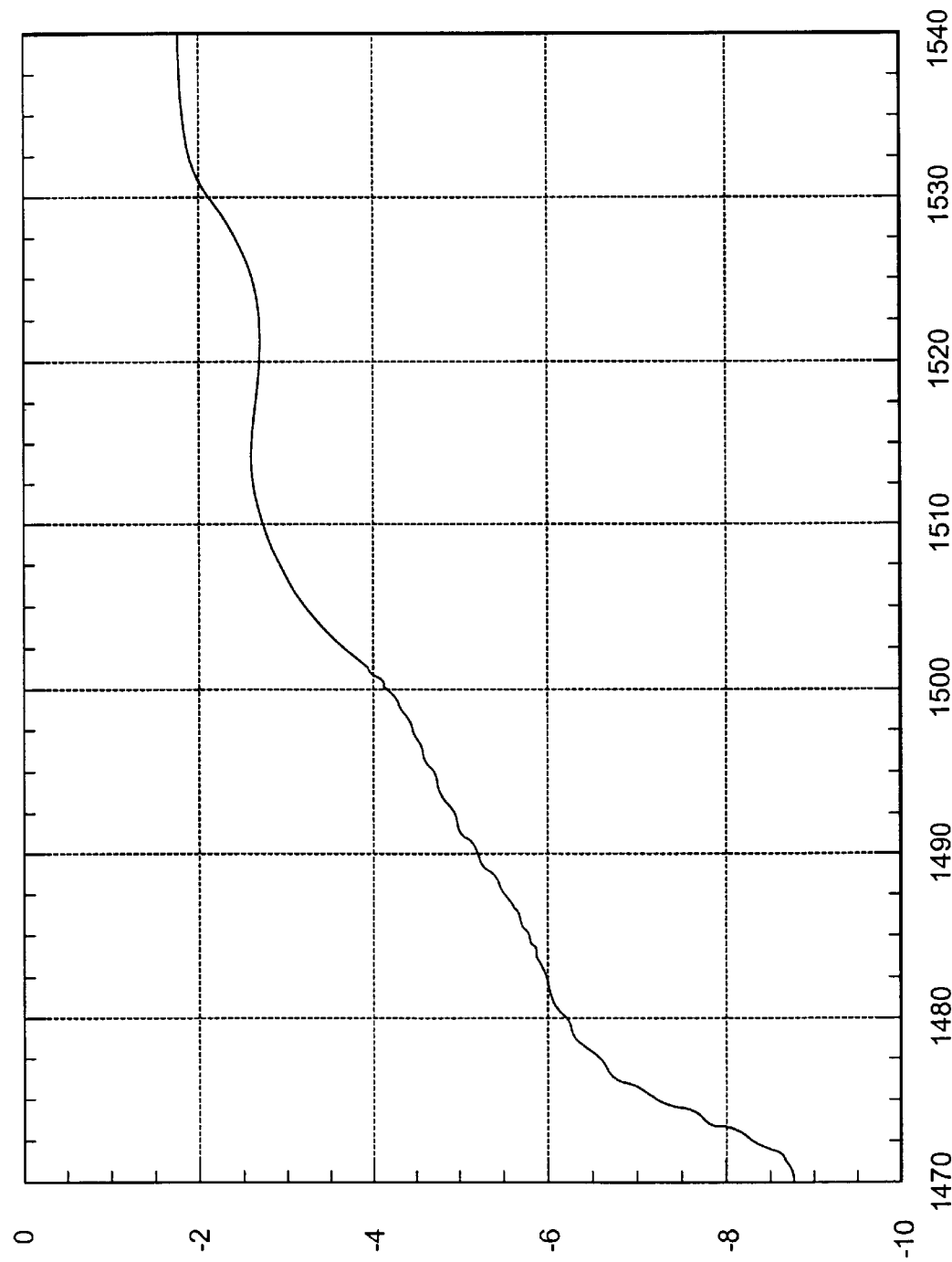
FIGS. 37 and 38 are graphs of optical noise figure, such as for the embodiment of FIG. 36.
Figure 38:
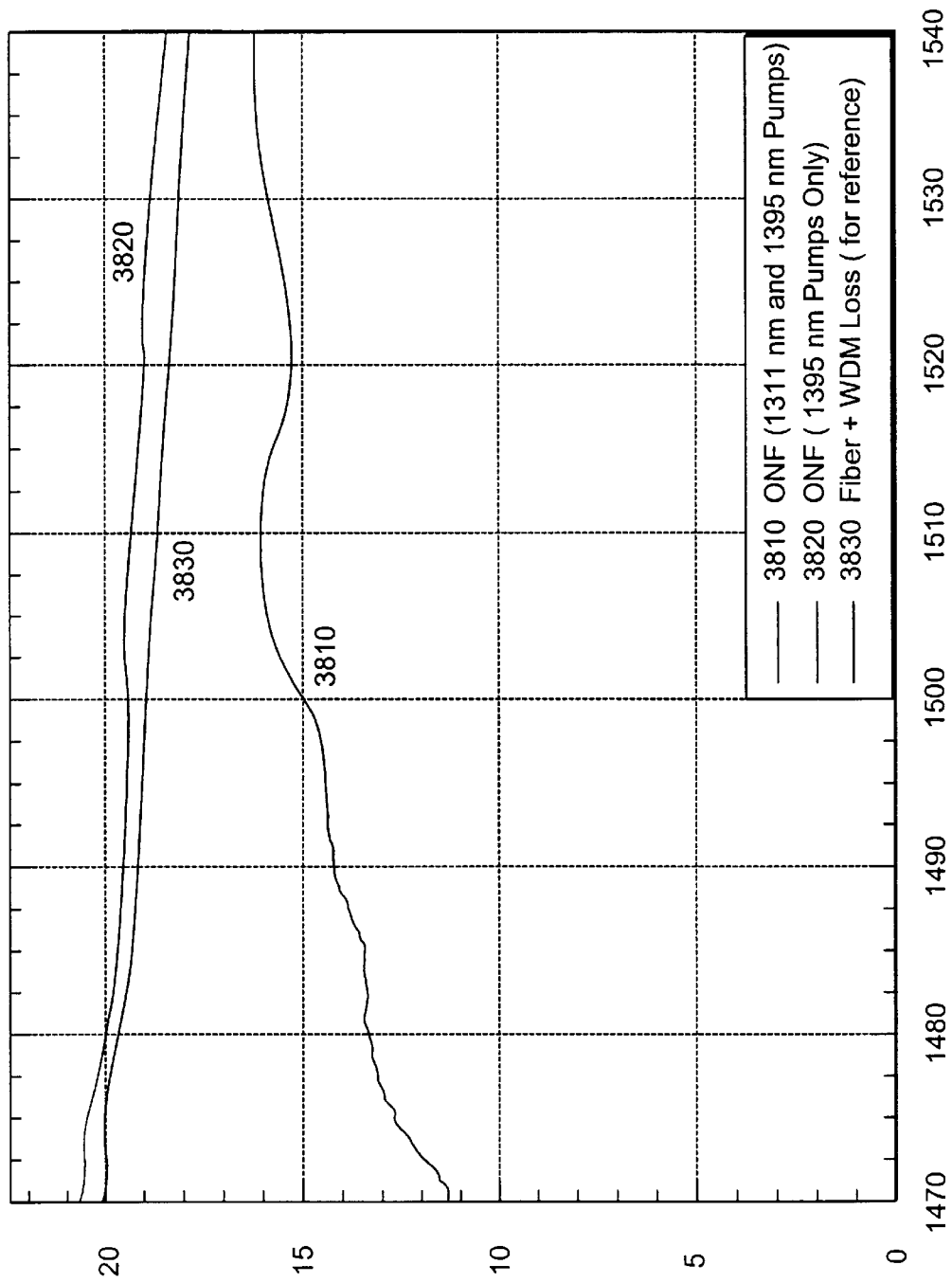

FIGS. 37 and 38 are graphs of optical noise figure, such as for the embodiment of FIG. 36. FIG. 37 shows the results of experiment 2 versus experiment 1, in terms of relative optical noise figure (dB) versus signal wavelength (nm). FIG. 38 shows optical noise figure (dB) versus signal wavelength (nm) for multiple cases: 3810 ONF (1311 nm and 1395 nm Pumps); 3820 ONF (1395 nm Pumps Only); and 3830 Fiber+WDM Loss (for reference).

Other experimental results were that the Electrical Noise Figure (ENF) matched the ONF for the 1395 nm counter-propagating pump case; when the co-propagating 1311 nm pump was added, the ENF was observed to be 10 dB above the ONF for 1490 nm signals (at measured noise frequencies >150 MHz). The 1311 nm pump noise was about 50 dB above shot noise when attenuated to 0.6 mW. A direct transfer of this noise level to the signal would have resulted in an ENF of about 36 dB above the ONF—hence, about 26 dB isolation by using a dual pumping scheme. Relatively weak co-propagating signal gain and pump-signal walk-off can greatly reduce the magnitude of pump-noise to signal-noise coupling in some embodiments.

NF of DRA can be improved; an improved system noise figure of over 5 dB ONF improvement can be demonstrated at the Raman gain peak of the 1395 nm counter-propagating pumps (about 1486 nm) in some embodiments. Distributed or discrete Raman amplifiers can be enhanced. Co-propagating pump noise can be greatly suppressed. About 26 dB isolation from co-prop pump can be demonstrated in one embodiment. Signal gain can come from the counter-propagating pump. A large co-propagating pump and signal wavelength separation (about 2 Raman orders) can lead to substantial pump-signal walk off in some embodiments. The noise figure improvement at C and L-Band wavelengths can be measured, and the performance of other distributed fiber types evaluated.

Figure 39:
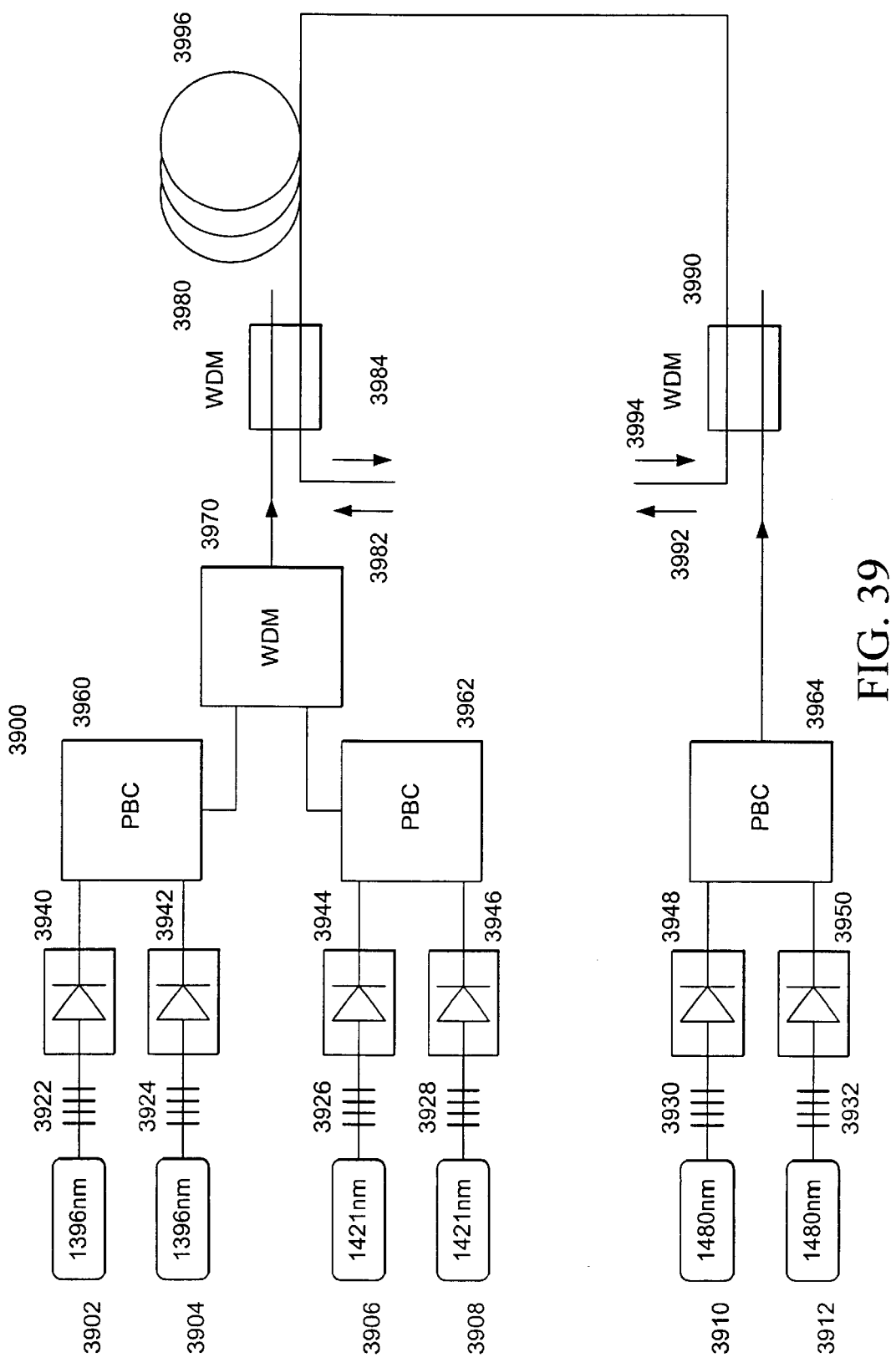
FIG. 39 is a schematic diagram of an embodiment of a tri-band DRA.
Figure 40:
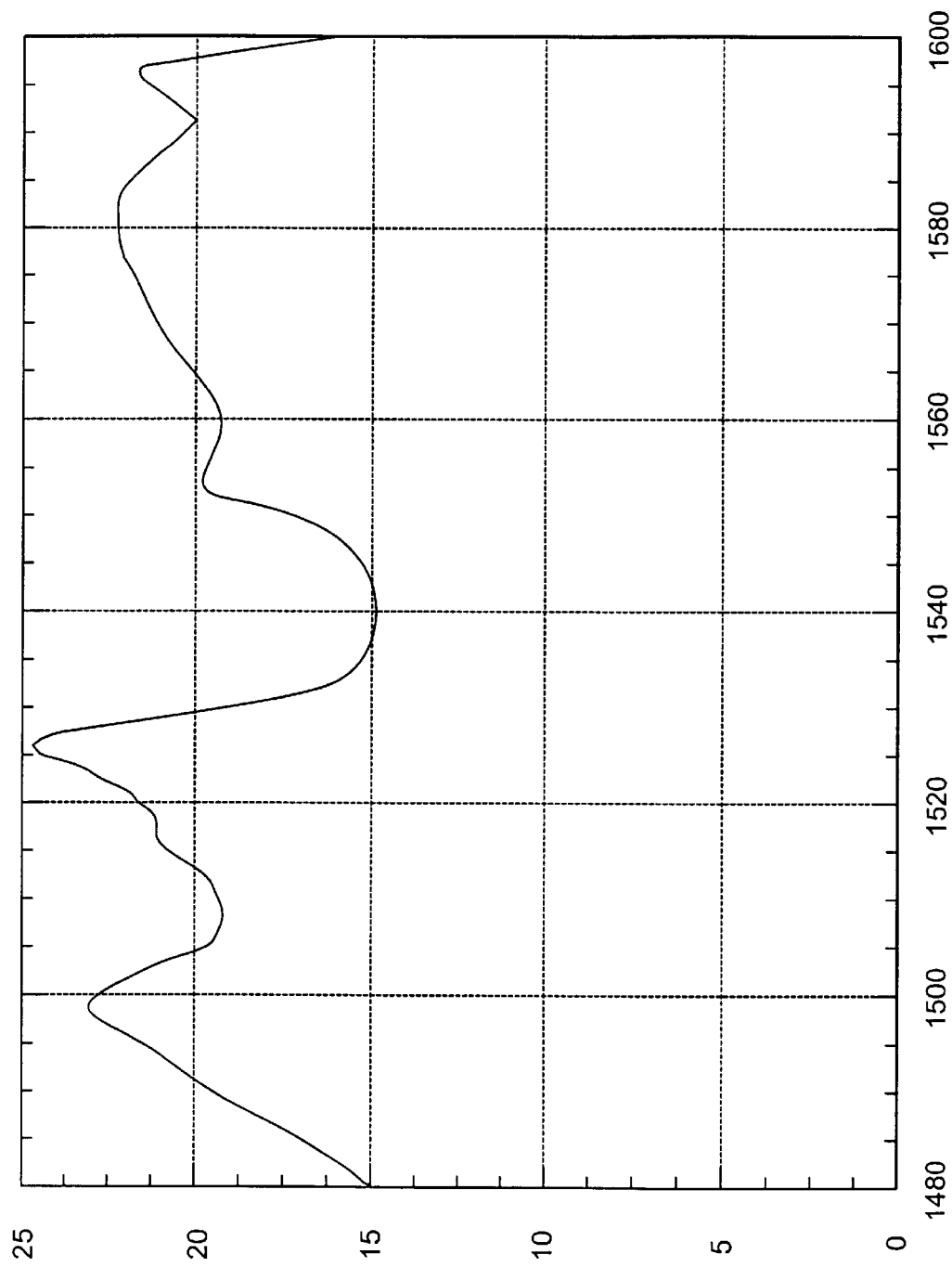
FIG. 40 is a graph of span Raman gain (dB) versus wavelength (nm).
Figure 41:
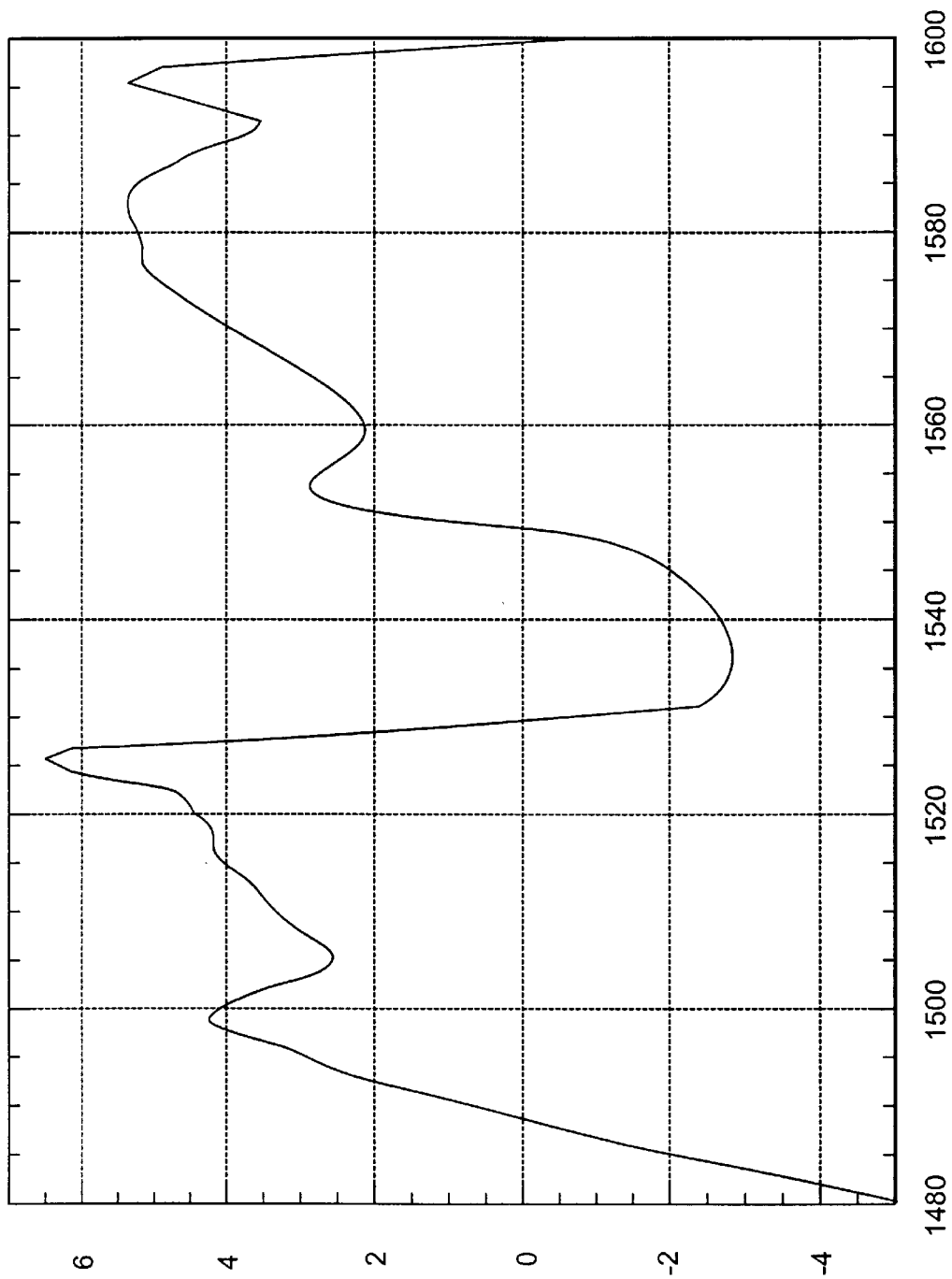
FIG. 41 is a graph of total gain or loss (dB) versus wavelength (nm).
Figure 42:
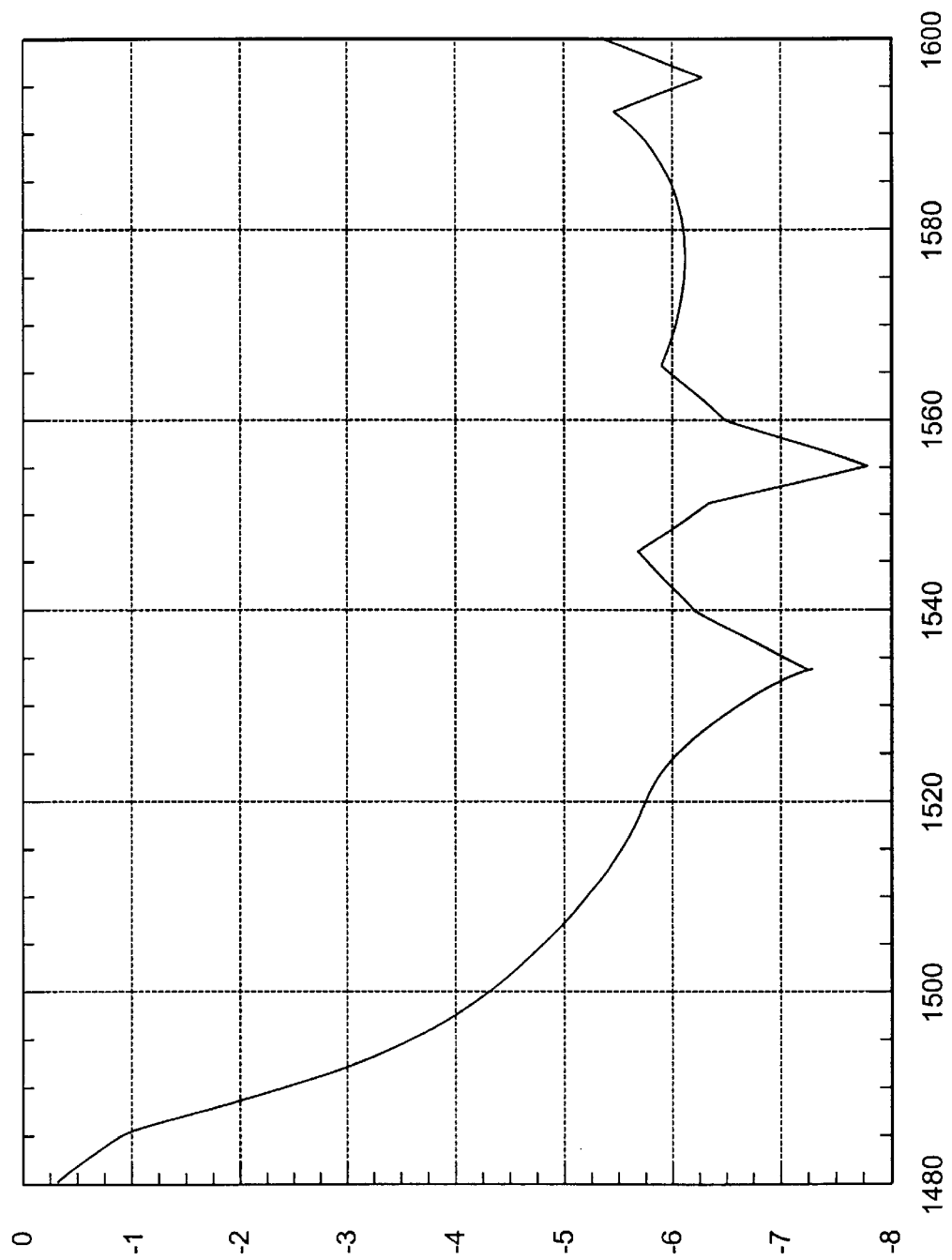
FIG. 42 is a graph of effective NF (dB) versus wavelength (nm).
Figure 43:
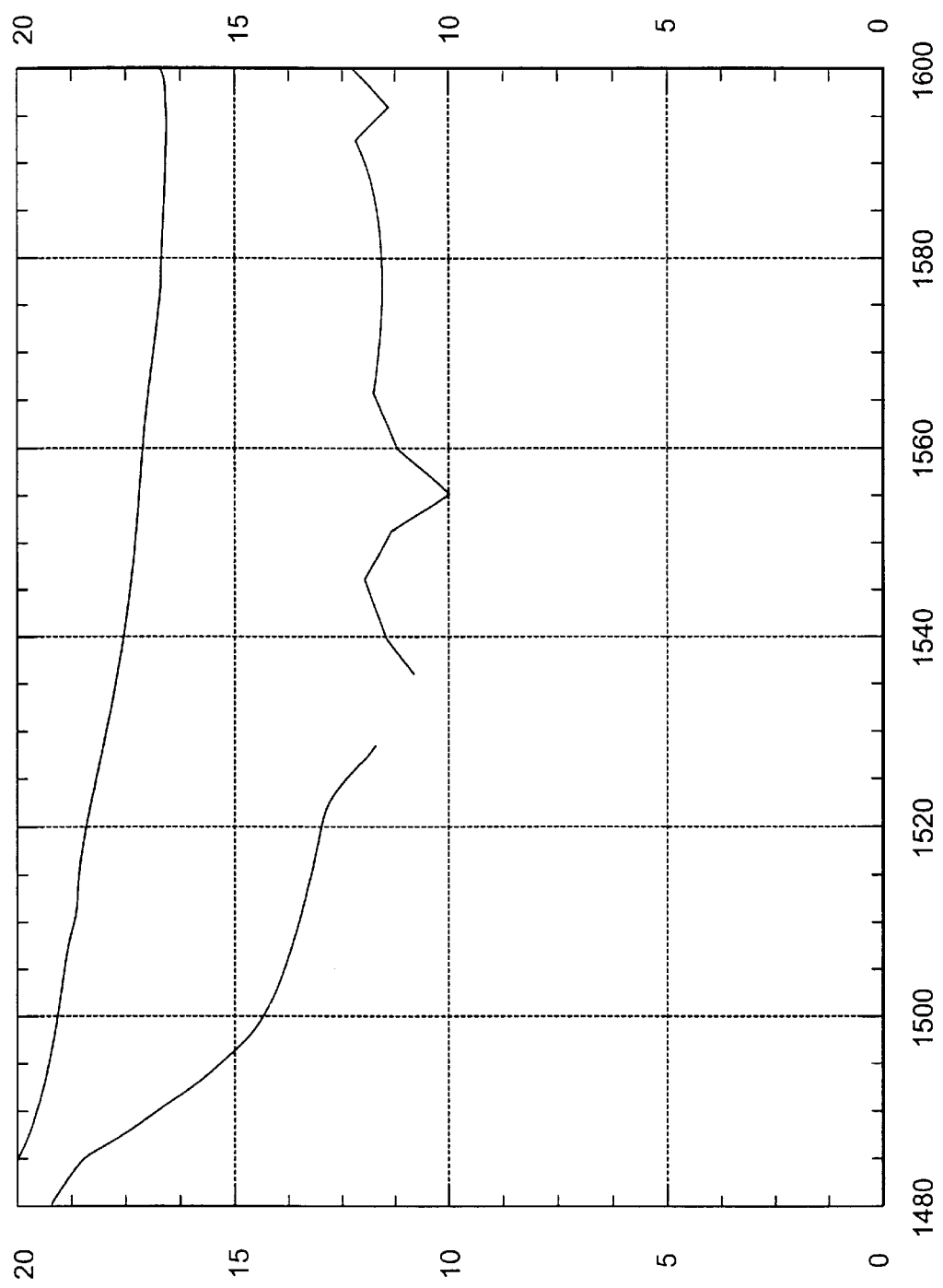
FIG. 43 is a graph of loss and DRA NF (dB) versus wavelength (nm).
Figure 44:
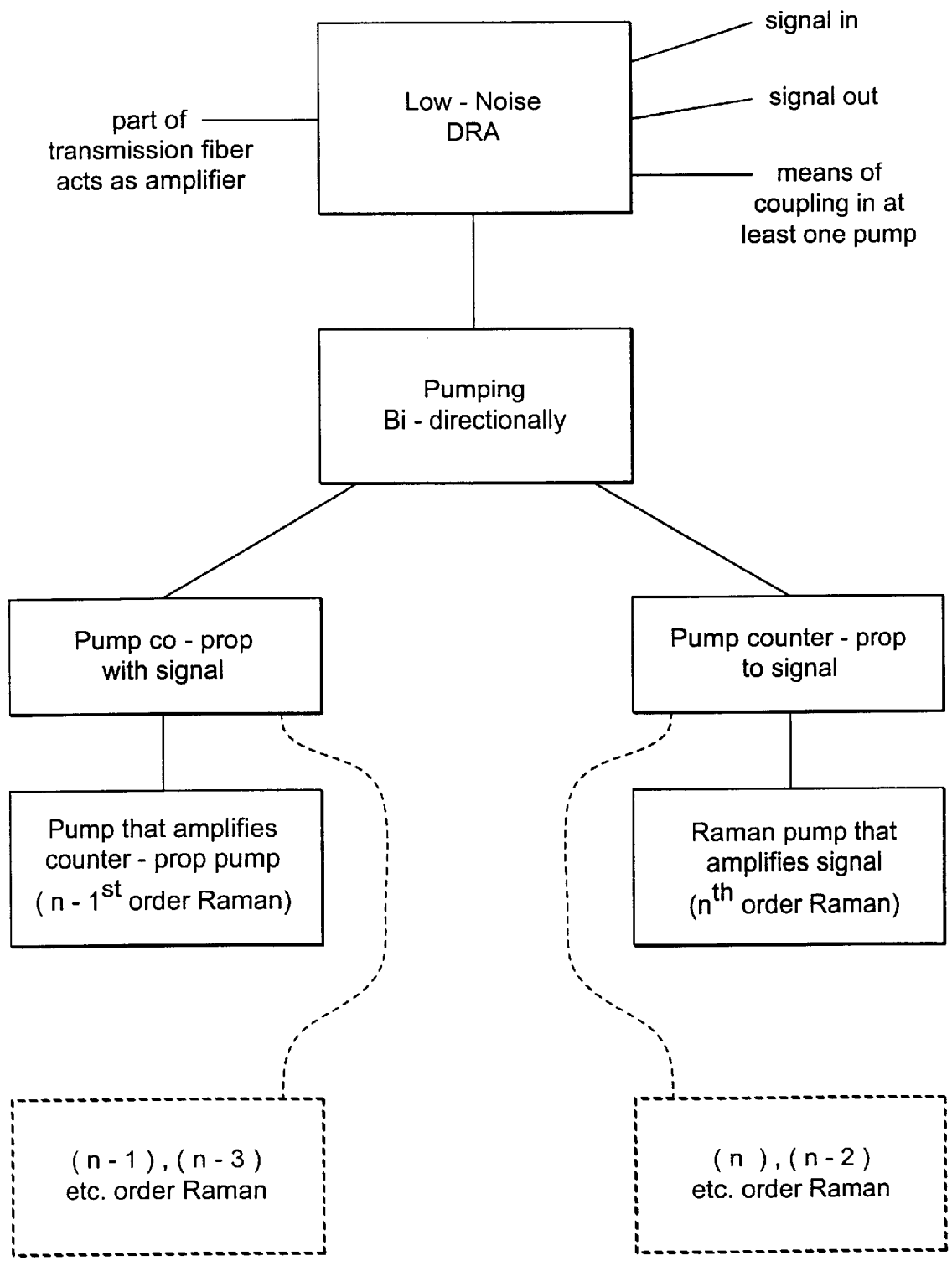
FIG. 44 is a block chart of various embodiments of DRAs.
Figure 45:
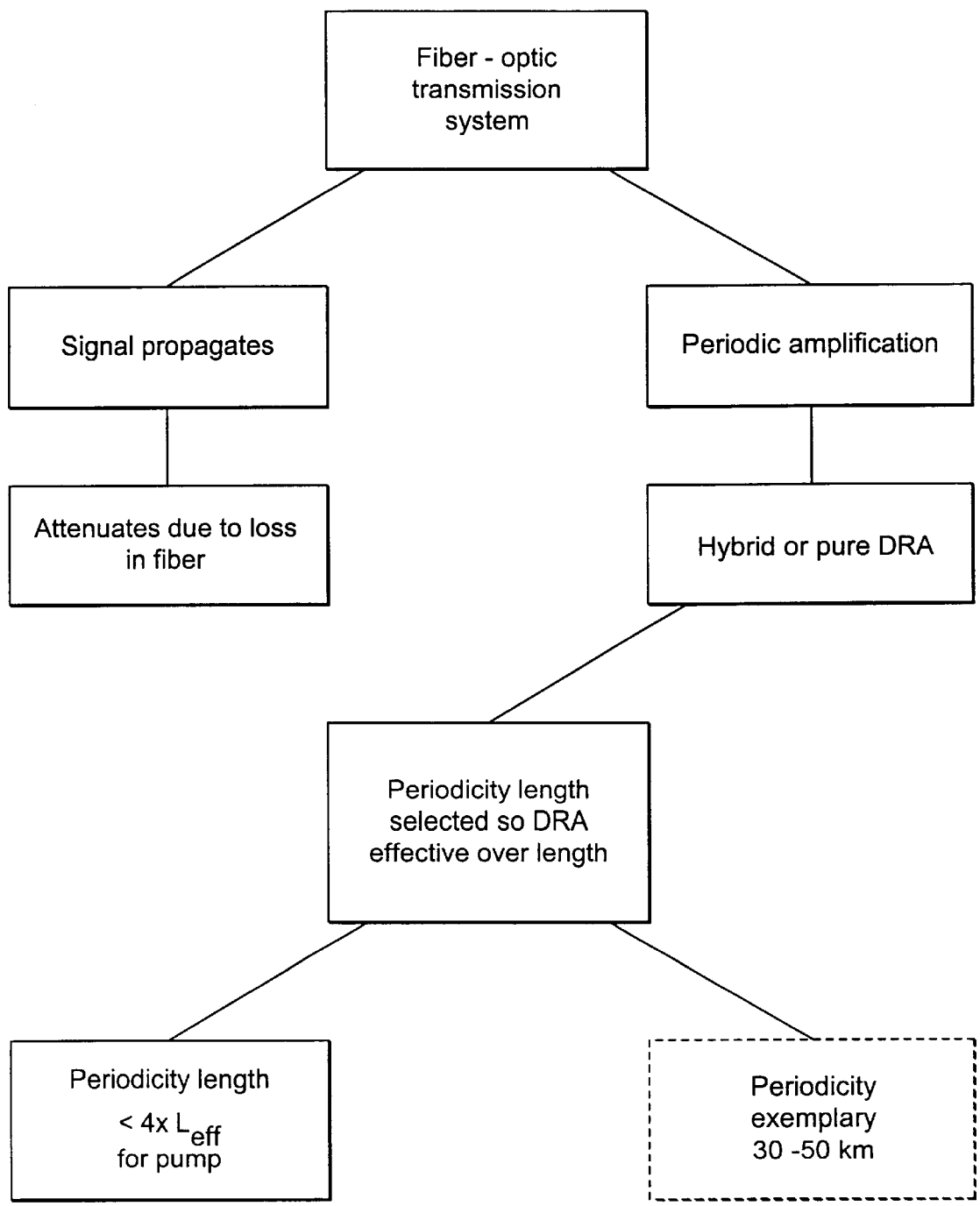
FIG. 45 is another block chart of various embodiments of DRAs.
Figure 46:
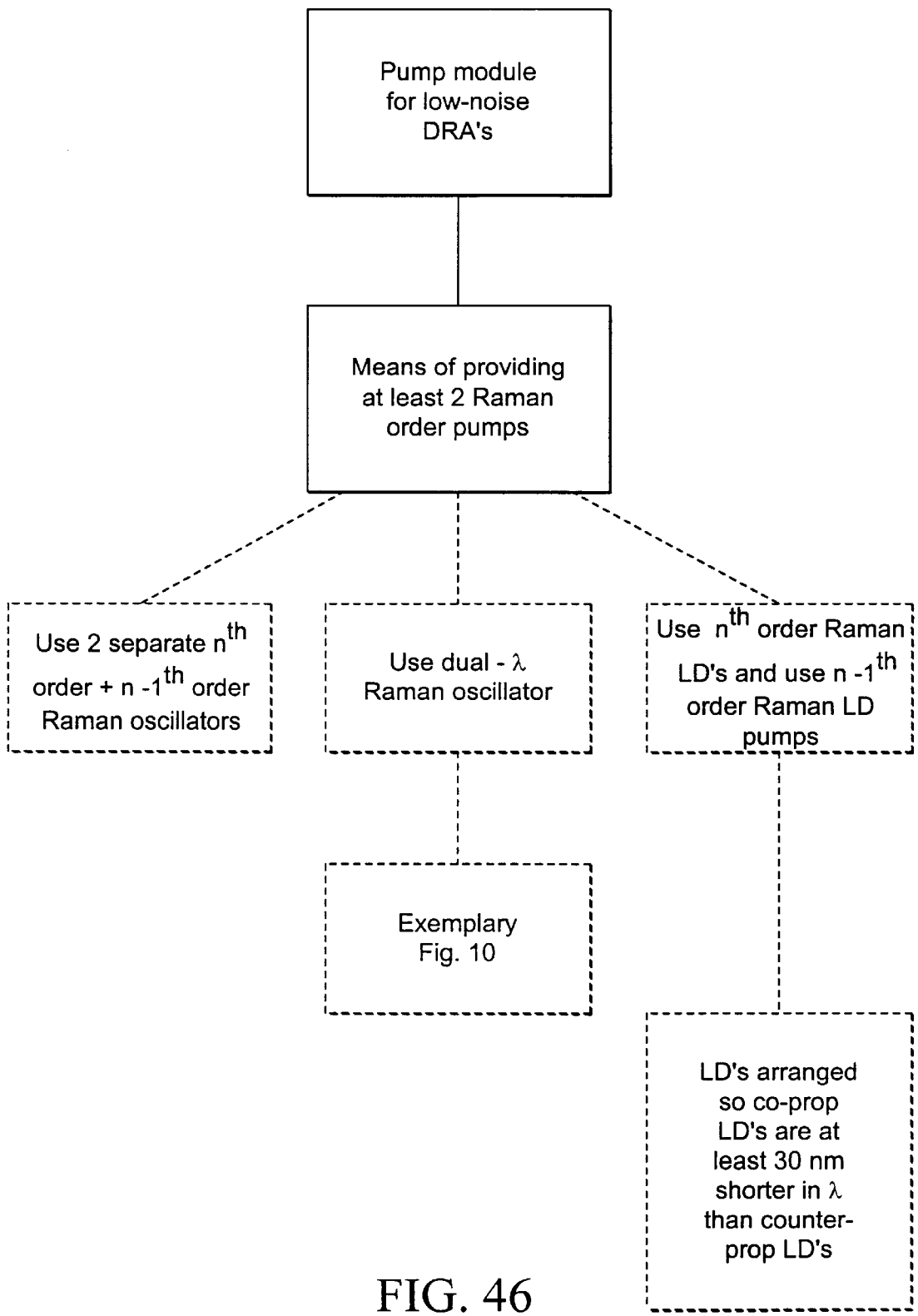
FIG. 46 is a block chart of various embodiments of pump configurations.
Figure 47:
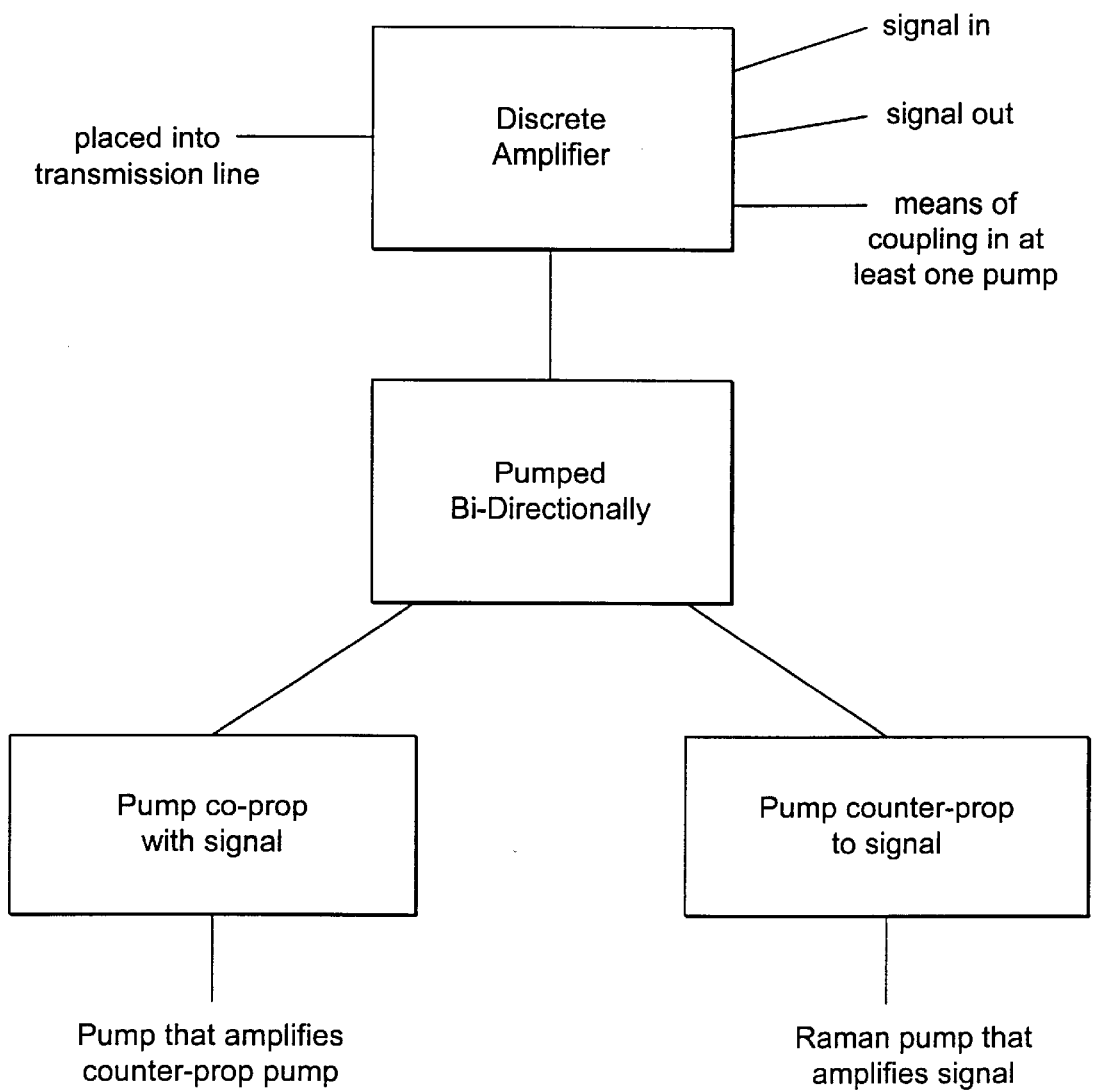
FIG. 47 is a block chart of various embodiments of discrete amplifiers.
Figure 48:
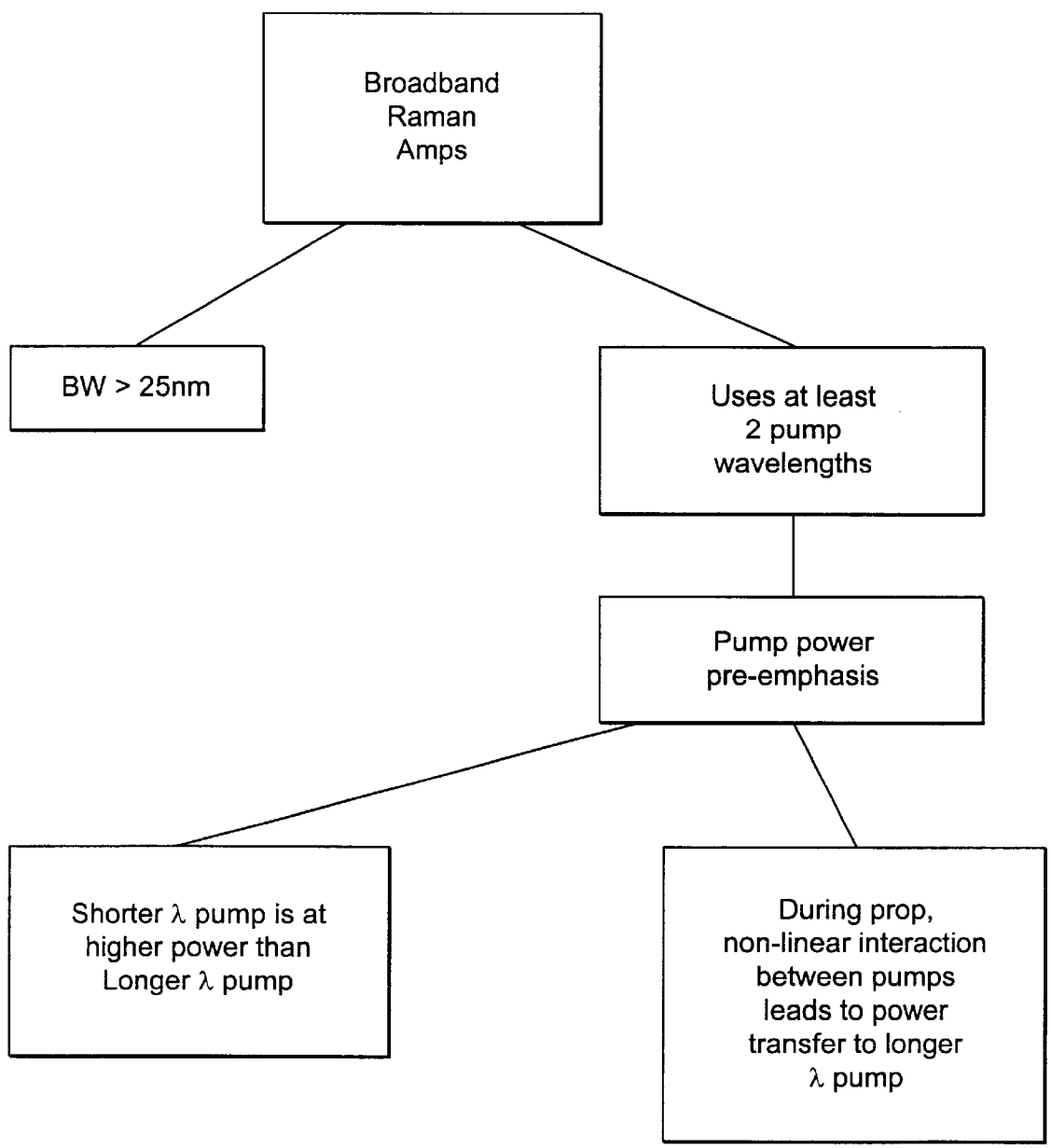
FIG. 48 is a block chart of various embodiments of broadband DRA's.
Figure 50A:
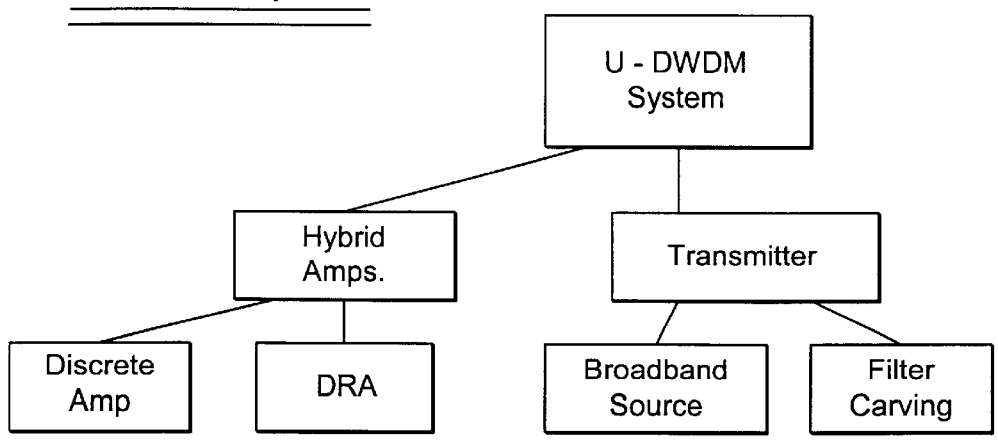
FIG. 50 is a block chart of various embodiments of U-DWDM systems.
Figure 50B:
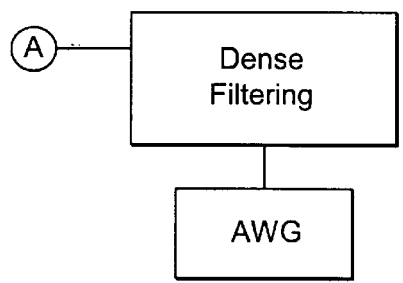
Figure 50C:
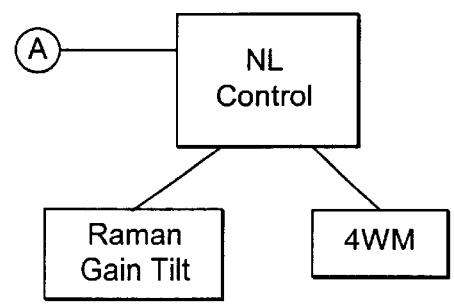
Figure 50D:
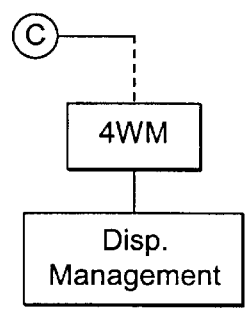
Figure 50E:
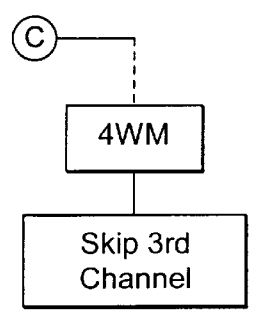
Figure 51:
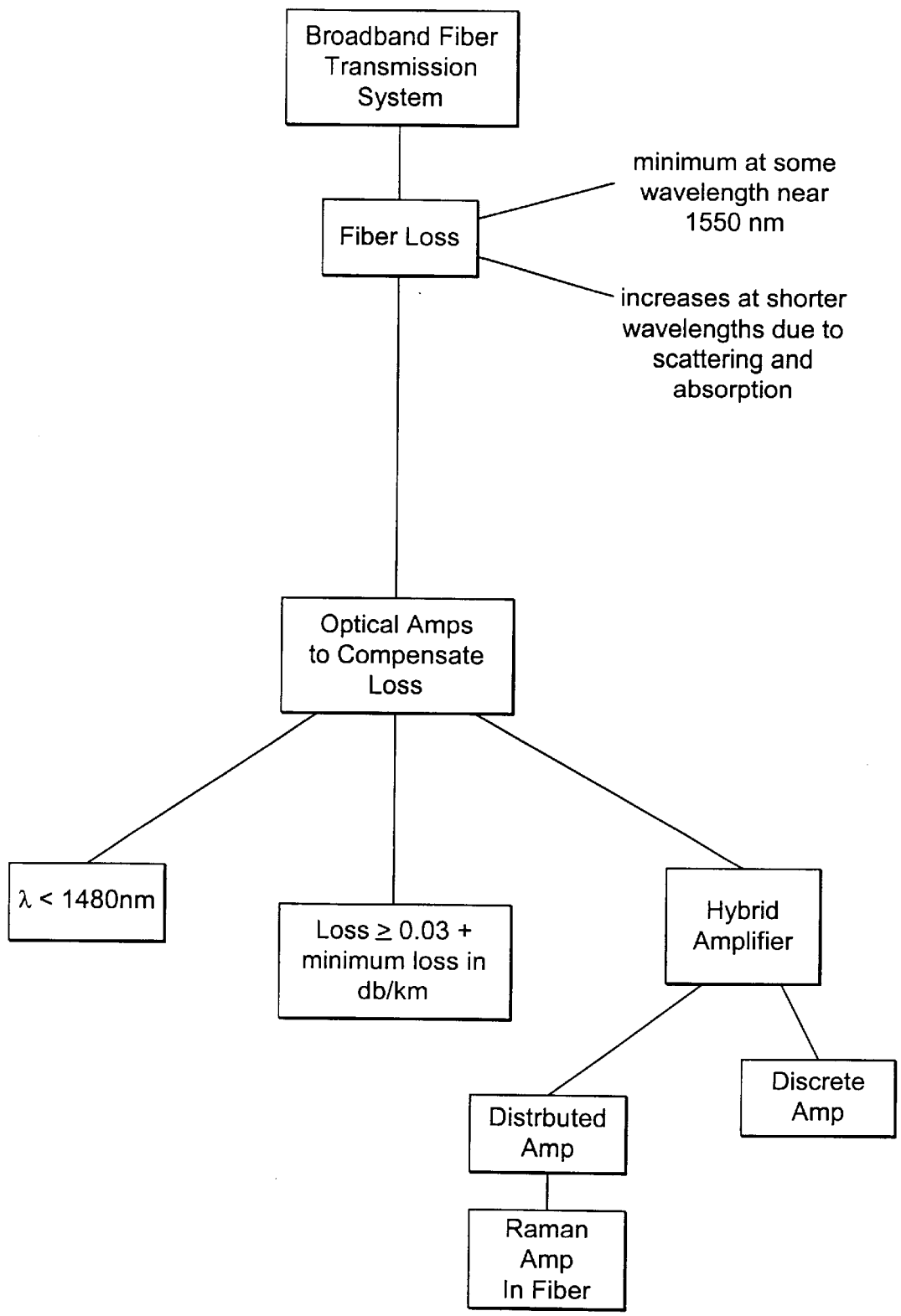
FIG. 51 is a block chart of various embodiments of uses of amplifiers.
Figure 52:
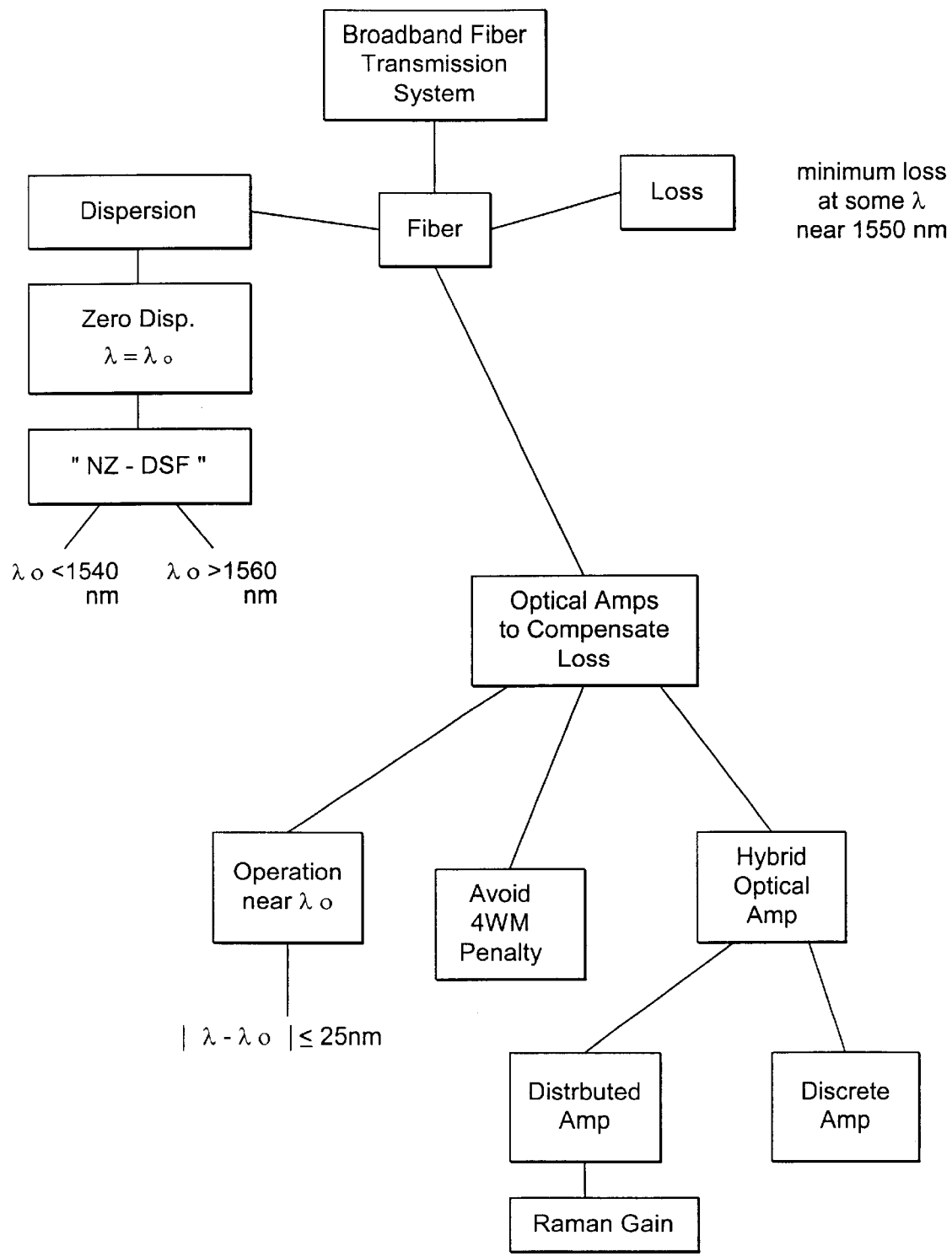
FIG. 52 is another block chart of various embodiments of uses of amplifiers.

FIG. 39 is a schematic diagram of an embodiment of a tri-band DRA 3900. A fiber span 3996 is coupled to a WDM 3980 and a WDM 3990. The WDM 3980 has C and L band input 3982 and S band output 3984. The WDM 3990 has C and L band output 3992 and S band input 3994. The WDM 3980 is coupled to a WDM 3970. The WDM 3970 is coupled to a PBC 3960 and a PBC 3962. The WDM 3990 is coupled to a PBC 3964. The PBC 3960 is coupled to 1396 nm laser diode 3902 via Bragg grating 3922 and isolator 3940, and to 1396 nm laser diode 3904 via Bragg grating 3924 and isolator 3942. The PBC 3962 is coupled to 1421 nm laser diode 3906 via Bragg grating 3926 and isolator 3944, and to 1421 nm laser diode 3908 via Bragg grating 3928 and isolator 3946. The PBC 3964 is coupled to 1480 nm laser diode 3910 via Bragg grating 3930 and isolator 3948, and to 1480 nm laser diode 3912 via Bragg grating 3932 and isolator 3950.

One or more of the following can characterize some embodiments of tri-band DRAs: over 100 nm of bandwidth covering the S, C, and L bands; using both fiber ends to reduces pump interaction for relative ease in maintaining gain flatness with varying signal power; improved optical noise figure of about 3 dB over single ended DRA designs, as Raman gain extends from both fiber ends instead of just one; signal gain provided by counter-propagating pumps for each band, reducing requirements on pump laser amplitude noise to achieve an electrical noise figure of about the optical noise figure; and a large walk-off of the C and L band co-propagating gain.

One embodiment of a Raman amplifier assembly comprises a Raman amplifier, a pump source, and a second pump source. The Raman amplifier can be configured to receive a signal of at least one wavelength from a signal source. The signal can travel in an upstream direction in the Raman amplifier. The Raman amplifier can be a distributed Raman amplifier. The distributed Raman amplifier can include a signal transmission line. At least a portion of the signal transmission line can incorporate a distributed gain medium. The Raman amplifier can be a discrete Raman amplifier that includes a distributed gain medium. The distributed gain medium can be coupled to a signal transmission line. The first pump source can be coupled to the Raman amplifier. The first pump source can be a laser diode source, or include a plurality of laser diodes. The first pump source can produce an output in the range of 1380 to 1530 nm, or in the range of 1450 to 1480 nm. The first pump source can produce a first pump beam. The first pump beam can travel in a downstream direction and can counter-propagate relative to the signal. The second pump source can be coupled to the Raman amplifier. The second pump source can be a laser diode source, or include a plurality of laser diodes. The second pump source can produce an output in the range of 1300 to 1430 nm, or in the range of 1365 to 1390 nm. The second pump source can produce a second pump beam. The second pump beam can pump the first pump beam. At least one wavelength of the second pump beam can be shorter than at least one wavelength of the first pump beam. The second pump beam can provide more gain to the first pump beam than to the signal. The second pump beam can travel in the upstream direction. The second pump source can have an average relative intensity noise of less than −80 dB/Hz. Exemplary ranges for average relative intensity noise of less than −80 dB/Hz can be 1–10 GHz. Other embodiments of the second pump source can have average relative intensity noise from 100 MHz to 1 GHz less than −90 dB/Hz, or from 0–100 MHz less than −100 dB/Hz. Various embodiments can comprise a WDM coupled to the Raman amplifier. The WDM can be coupled to the first pump source and/or the second pump source. Various embodiments comprise a polarization beam combiner. The polarization beam combiner can be coupled to the plurality of laser diodes.

One embodiment of a multi-stage Raman amplifier apparatus comprises a first Raman amplifier, a first pump source, a second pump source, a second Raman amplifier, and a third pump source. The first Raman amplifier can be a low-noise preamplifier. The first Raman amplifier can be configured to receive a signal of at least one wavelength from a signal source. The signal can travel in an upstream direction in the first Raman amplifier. The second Raman amplifier can be a power amplifier. The first pump source can be coupled to the first Raman amplifier. The first pump source can produce a first pump beam. The first pump beam can travel in a downstream direction that is counter-propagating relative to the signal. The second pump source can be coupled to the first Raman amplifier. The second pump source can have an average relative intensity noise of, for example, less than −80 dB/Hz, less than −90 dB/Hz, or less than −100 dB/Hz. Exemplary ranges for average relative intensity noise of less than −80 dB/Hz can be from 1–10 GHz. Exemplary ranges for average relative intensity noise of less than −90 dB/Hz can be from 100 MHz to 1 GHz. Exemplary ranges for average relative intensity noise of less than −100 dB/Hz can be from 0–100 MHz. The second pump source can produce a second pump beam. The second pump beam can travel in the upstream direction. The second pump beam can pump the first pump beam. The third pump source can be coupled to the second Raman amplifier. The third pump source can produce a third pump beam. The third pump beam can travel in the downstream direction. various embodiments can comprise a fourth pump source. The fourth pump source can be coupled to the second Raman amplifier. The fourth pump source can produce a fourth pump beam that travels in the upstream direction. Various embodiments can comprise an isolator. The isolator can be coupled to the second Raman amplifier. The isolator can be positioned between the first and second Raman amplifiers. An embodiment may comprise a second isolator coupled to a pump shunt. Various embodiments can comprise a pump shunt coupled to the first and second Raman amplifiers.

One embodiment of a Raman amplifier assembly comprises an optical transmission line, a first pump source, and a second pump source. The optical transmission line includes a first port and a second port. At least a portion of the optical transmission line can produce Raman gain. A length of the optical transmission line can be at least 40 kilometers, or at least 80 kilometers. The first pump source can be a laser diode source. The first pump source can produce a first pump beam. The first pump beam can be in the wavelength range of 1430 to 1530 nm, or in the range of 1450 to 1510 nm. The first pump beam can provide gain to at least a portion of the second signal of multiple wavelengths. The first pump beam can extract optical energy from the second pump beam. The first pump beam and a first signal of multiple wavelengths can enter the first port and can travel in a downstream direction from the first port to the second port. The first signal of multiple wavelengths can be in the range of 1430 to 1530 nm, or in the range of 1480 to 1530 nm. The second pump source can be a laser diode source. The second pump source can produce a second pump beam. The second pump beam can be in the wavelength range of 1350 to 1480 nm, or in the range of 1380 to 1440 nm. The second pump beam and a second signal of multiple wavelengths can enter the second port and can travel in an upstream direction from the second port to the first port. The second signal of multiple wavelengths can be in the range of 1525 to 1630 nm, or in the range of 1525 to 1610 nm. At least a portion of the second pump beam can pump the first pump beam. At least a portion of the first signal of multiple wavelengths can have shorter wavelengths than the second signal of multiple wavelengths. Various embodiments can comprise a first WDM and a second WDM. The first WDM can be coupled to the first port. The second WDM can be coupled to the second port. Various embodiments further comprise at least a first polarization beam combiner and a second polarization beam combiner. The first polarization beam combiner can be coupled to the first WDM. The second polarization beam combiner can be coupled to the second WDM.

One embodiment of a Raman amplifier assembly can comprise a Raman amplifier, a first pump source, and a second pump source. The Raman amplifier can be configured to receive a signal of at least one wavelength from a signal source. The signal can travel in an upstream direction in the Raman amplifier. The Raman amplifier can be a distributed Raman amplifier. The distributed Raman amplifier can include a signal transmission line. At least a portion of the signal transmission line can incorporate a distributed gain medium. The Raman amplifier can be a discrete Raman amplifier. The discrete Raman amplifier can include a distributed gain medium. The distributed gain medium can be coupled to a signal transmission line. The first pump source can be a laser diode source. The first pump source can be coupled to the Raman amplifier. The first pump source can produce a first pump beam. The first pump beam can travel in a downstream direction and can counter-propagate relative to the signal. The second pump source can be a laser diode source. The second pump source can be coupled to the Raman amplifier. The second pump source can produce a second pump beam. The second pump beam can pump the first pump beam. The second pump beam can provide more gain to the first pump beam than to the signal. The second pump beam can travel in the upstream direction. The wavelengths of the second pump beam can have one or more relationships with the wavelengths of the first pump beam, such as being at least 20 nm shorter, at least 40 nm shorter, no more than 120 nm shorter, and/or no more than 100 nm shorter. The second pump source can have an average relative intensity noise of, for example, less than −80 dB/Hz, less than −90 dB/Hz, or less than −100 dB/Hz. The average relative intensity noise from 1–10 GHz can be less than −80 dB/Hz. The average relative intensity noise from 100 MHz to 1 GHz can be less than −90 dB/Hz. The average relative intensity noise from 0–100 MHz can be less than −100 dB/Hz. The second pump beam can have at least one wavelength that is shorter than at least one wavelength of the first pump beam.

One embodiment of a method of broadband amplification comprises providing a Raman amplifier assembly including an optical transmission line with a first port and a second port, at least a portion of the optical transmission line producing Raman gain; pumping the Raman amplifier assembly with at least a first pump beam and a second pump beam, at least a portion of the second pump beam pumping the first pump beam; introducing a first signal of multiple wavelengths into the first port and a second signal of multiple wavelengths into the second port; and amplifying the first and second signals of multiple wavelengths. At least a portion of the first signal of multiple wavelengths can have shorter wavelengths than the second signal of multiple wavelengths. The first pump beam and the first signal of multiple wavelengths can enter the first port and can travel in a downstream direction from the first port to the second port. The second pump beam and the second signal of multiple wavelengths can enter the second port and can travel in an upstream direction from the second port to the first port. The first pump beam can be in the wavelength range of 1430 to 1530 nm, or 1450 to 1510 nm, and the second pump beam can be in the wavelength range of 1350 to 1480 nm, or 1380 to 1440 nm. The first signal of multiple wavelengths can be in the range of 1430 to 1530 nm, or 1480 to 1530 nm, and the second signal of multiple wavelengths can be in the range of 1525 to 1630 nm, or 1525 to 1610 nm.

One embodiment of a method of broadband amplification comprises providing a first pump source, a second pump source with an average relative intensity noise of less than −80 dB/Hz and a Raman amplifier assembly including an optical transmission line with a first port and a second port, at least a portion of the optical transmission line producing Raman gain; pumping the Raman amplifier assembly at the first port with at least a first pump beam and at the second port with a second pump beam, the second pump beam having at least one wavelength that is shorter than at least one wavelength of the first pump beam; introducing a signal of one or more wavelengths into the second port; and amplifying the signal. At least a portion of the second pump beam can pump the first pump beam. The first pump beam can be in the wavelength range of 1430 to 1530 nm, or 1450 to 1510 nm, and the second pump beam can be in the wavelength range of 1350 to 1480 nm, or 1380 to 1440 nm.

One embodiment of a Raman amplifier assembly can comprise a Raman amplifier, a first pump source, and a second pump source. The Raman amplifier can be configured to receive a signal of at least one wavelength from a signal source. The signal can travel in an upstream direction in the Raman amplifier. Polarization dependence of a signal gain of the signal can be less than 2 dB. The first pump source can be depolarized by polarization scrambling. The first pump source can be depolarized by polarization multiplexing of at least two pump sources. The first pump source can be coupled to the Raman amplifier. The first pump source can produce a first pump beam that can travel in a downstream direction and can counter-propagate relative to the signal. The first pump source can be substantially depolarized. The second pump source can be coupled to the Raman amplifier. The second pump source can be substantially depolarized. The second pump source can produce a second pump beam that travels in the upstream direction and can pump the first pump beam. The second pump beam can provide at least 5% of the gain to at least a portion of the signal, at least 5% of the gain to a majority of wavelengths of the signal, at least 10% of the gain to a majority of wavelengths of the signal, and/or at least 50% of the gain to at least a portion of the signal.

While embodiments of the invention have been illustrated and described, it is not intended that these embodiments illustrate and describe all possible forms of the invention. A signal may comprise one or more signals. In one embodiment, each of the one or more signals may be characterized by a wavelength or wavelength range distinct from other signal wavelengths or other signal wavelength ranges, such as in wavelength division multiplexing. A signal traveling in a direction, such as downstream or upstream, includes a signal traveling substantially in the direction, and/or where a majority of the power of the signal is initially traveling in the direction and/or traveling in the direction. A signal traveling in a direction, such as upstream or downstream, may be accompanied by a scattered beam traveling in another direction, such as the opposite direction, due to linear and/or nonlinear mechanisms such as Rayleigh scattering and/or Brillouin scattering. Rather, the words used in the specification are words of description rather than limitation, and it is understood that various changes may be made without departing from the spirit and scope of the invention.

What is claimed is:

1. A Raman amplifier assembly, comprising:
   a first pump source operable to produce a first pump beam comprising multiple wavelengths, the first pump beam entering a first port of an optical transmission line and traveling in a downstream direction from the first port to a second port of the optical transmission line; and
   a second pump source operable to produce a second pump beam, the second pump beam and a signal comprising multiple wavelengths entering the second port and traveling in an upstream direction from the second port toward the first port, the second pump source having an average relative noise intensity of less than −80 dB/Hz. wherein at least a portion of the second pump beam pumps the first pump beam, and wherein at least some of the shorter wavelengths of the first pump beam comprise a higher energy than at least some of the longer wavelengths of the first pump beam.

2. The assembly of claim 1, further comprising:
   a first WDM coupled to the first port; and
   a second WDM coupled to the second port.

3. The apparatus of claim 2, further comprising:
   at least a first polarization beam combiner coupled to the first WDM and a second polarization beam combiner coupled to the second WDM.

4. The assembly of claim 1, wherein the first pump beam is in the wavelength range of 1430 to 1530 nm and the second pump beam is in the wavelength range of 1350 to 1480 nm.

5. The assembly of claim 1, wherein the first pump beam is in the wavelength range of 1450 to 1510 rim and the second pump beam is in the wavelength range of 1380 to 1440 rim.

6. A The apparatus of claim 1, wherein the first pump beam provides gain to at least a portion of the signal of multiple wavelengths and extracts optical energy from the second pump beam.

7. The apparatus of claim 1, wherein a length of the optical transmission line is at least 40 kilometers.

8. The apparatus of claim 1, wherein a length of the optical transmission line is at least 80 kilometers.

9. The apparatus of claim 1, wherein the first and second pump sources are laser diode sources.

10. The apparatus of claim 1, wherein at least a portion of the optical transmission line comprises a Raman gain fiber, wherein at least a portion of the Raman gain fiber comprises a non-linear gain coefficient ($\gamma$) of greater than 3 $W^{-1}$ $km^{-1}$.

11. A Raman amplifier assembly, comprising:
    a Raman amplifier comprising a Raman gain fiber, at least a portion of the Raman gain fiber comprising a non-linear gain coefficient ($\gamma$) of greater than 3 $W^{-1}$ $km^{-1}$;
    a first pump source coupled to the Raman amplifier and operable to produce a first pump beam, the first pump beam traversing the Raman amplifier substantially complementary to a signal received by the Raman amplifier; and
    a second pump source coupled to the Raman amplifier and operable to produce a second pump beam, the second pump beam traversing the Raman amplifier substantially complementary to the first pump beam, the second pump source having an average relative intensity noise of less than −80 dB/Hz, wherein at least one wavelength of the second pump beam comprises a shorter wavelength than at least one wavelength of the first pump beam.

12. The assembly of claim 11, wherein the second pump beam pumps the first pump beam.

13. The assembly of claim 11, wherein the average relative intensity noise from 1–10 GHz is less than −80 dB/Hz.

14. The assembly of claim 11, wherein the average relative intensity noise from 100 MHz to 1 GHz is less than −90 dB/Hz.

15. The assembly of claim 11, wherein the average relative intensity noise from 0–100 MHz is less than −100 dB/Hz.

16. The assembly of claim 11, wherein the wavelengths of the second pump beam are at least 20 nm shorter than the wavelengths of the first pump beam.

17. The assembly of claim 11, wherein the wavelengths of the second pump beam are at least 40 nm shorter than the wavelengths of the first pump beam.

18. The assembly of claim 11, wherein the wavelengths of the second pump beam are no more than 120 nm shorter than the wavelengths of the first pump beam.

19. The assembly of claim 11, wherein the wavelengths of the second pump beam are no more than 100 nm shorter than the wavelengths of the first pump beam.

20. The assembly of claim 11, wherein the second pump beam provides more gain to the first pump beam than to the signal.

21. The assembly of claim 11, wherein the first and second pump sources are laser diode sources.

22. The assembly of claim 11, wherein the Raman amplifier is a distributed Raman amplifier that comprises a signal transmission line, wherein at least a portion of the signal transmission line incorporates therein a distributed gain medium.

23. The assembly of claim 11, wherein the Raman amplifier is a discrete Raman amplifier that comprises a distributed gain medium that is coupled to a signal transmission line.

24. The assembly of claim 11, wherein the at least a portion of the Raman gain fiber comprises a non-linear gain coefficient coefficient ($\gamma$) of greater than 3 $W^{-1}$ $km^{-1}$.

25. The assembly of claim 11, wherein the at least a portion of the Raman gain fiber comprises a dispersion compensating fiber.

26. The assembly of claim 11, wherein the at least a portion of the Raman gain fiber comprises a high-non-linearity gain fiber.

27. A method of broadband amplification, comprising:
introducing to a Raman amplifier assembly at least a first pump beam and a second pump beam, at least a portion of the second pump beam pumping the first pump beam, wherein at least one of the first pump beam and the second pump beam is generated by a pump source comprising an average relative noise intensity of less than −80 dB/Hz;
introducing a first signal of multiple wavelengths into a first port of an optical transmission line and a second signal of multiple wavelengths into a second port of the optical transmission line, at least one of the multiple wavelength signals of the first signal comprises a shorter wavelength than the wavelengths of the second signal; and
amplifying at least some of the first and second signals of multiple wavelengths.

28. The method of claim 27, wherein at least a portion of the first signal of multiple wavelengths has shorter wavelengths than the second signal of multiple wavelengths.

29. The method of claim 27, wherein the first pump beam and the first signal of multiple wavelengths enter the first port and travel in a downstream direction from the first port to the second port.

30. The method of claim 27, wherein the second pump beam and the second signal of multiple wavelengths enter the second port and travel in an upstream direction from the second port to the first port.

31. The method of claim 27, wherein the first pump beam is in the wavelength range of 1430 to 1530 nm and the second pump beam is in the wavelength range of 1350 to 1480 nm.

32. The method of claim 27, wherein the first pump beam is in the wavelength range of 1450 to 1510 nm and the second pump beam is in the wavelength range of 1380 to 1440 nm.

33. The method of claim 27, wherein the first signal of multiple wavelengths is in the range of 1430 to 1530 nm and the second signal of multiple wavelengths is in the range of 1525 to 1630 nm.

34. The method of claim 29, wherein the first signal of multiple wavelengths is in the range of 1480 to 1530 nm and the second signal of multiple wavelengths is in the range of 1525 to 1610 nm.

35. A method of broadband amplification, comprising:
introducing to a Raman amplifier assembly at a first port of an optical transmission line with at least a first pump beam and introducing to a second port of the Raman amplifier assembly a second pump beam, wherein at least one wavelength of the second pump beam comprises a shorter wavelength than at least one wavelength of the first pump beam, wherein the Raman amplifier assembly comprises a Raman gain fiber, and wherein at least a portion of the Raman gain fiber comprises a non-linear gain coefficient ($\gamma$) of greater than 3 $W^{-1}$ $km^{-1}$;
introducing a signal of at least one wavelength into the second port; and
amplifying at least a portion of the signal.

36. The method of claim 35, wherein at least a portion of the second pump beam pumps the first pump beam.

37. The method of claim 35, wherein the first pump beam is in the wavelength range of 1430 to 1530 nm and the second pump beam is in the wavelength range of 1350 to 1480 nm.

38. The method of claim 35, wherein the first pump beam is in the wavelength range of 1450 to 1510 nm and the second pump beam is in the wavelength range of 1380 to 1440 nm.

39. A Raman amplifier assembly, comprising:
a Raman amplifier comprising a Raman gain fiber, at least a portion of the Raman gain fiber comprising a non-linear gain coefficient ($\gamma$) of greater than 3 $W^{-1}$ $km^{-1}$;
a first pump source coupled to the Raman amplifier and operable to produce a first pump beam, the first pump beam traversing the Raman amplifier substantially complementary to a signal received by the Raman amplifier; and
a second pump source coupled to the Raman amplifier and operable to produce a second pump beam, the second pump beam traversing the Raman amplifier substantially complementary to the first pump beam, wherein the second pump beam pumps the first pump beam, and wherein the second pump beam provides at least five percent (5%) of the gain to at least a portion of the signal received by the Raman amplifier.

40. The assembly of claim 39, wherein the first pump source is substantially depolarized.

41. The assembly of claim 39, wherein polarization dependence of a signal gain of the signal is less than 2 dB.

42. The assembly of claim 39, wherein the first pump source is depolarized by polarization scrambling.

43. The assembly of claim 39, wherein the first pump source is depolarized by polarization multiplexing of at least two pump sources.

44. The assembly of claim 39, wherein the second pump source is substantially depolarized.

45. The assembly of claim 39, wherein the second pump beam provides at least 5% of the gain to a majority of wavelengths of the signal.

46. The assembly of claim 39, wherein the second pump beam provides at least 10% of the gain to a majority of wavelengths of the signal.

47. The assembly of claim 39, wherein the second pump beam provides at least 50% of the gain to at least a portion of the signal.

48. The method of claim 35, wherein at least one of the first pump beam and the second pump beam is generated by a pump source comprising an average relative noise intensity of less than −80 dB/Hz.

49. The method of claim 27, wherein the first pump beam comprises multiple wavelengths and wherein at least some of the shorter wavelengths of the first pump beam comprise a higher energy than at least some of the longer wavelengths of the first pump beam.

* * * * *